United States Patent
Samuelsson et al.

(10) Patent No.: US 12,143,631 B2
(45) Date of Patent: Nov. 12, 2024

(54) SYSTEMS AND METHODS FOR PERFORMING AN ADAPTIVE RESOLUTION CHANGE IN VIDEO CODING

(71) Applicant: Sharp Kabushiki Kaisha, Sakai (JP)

(72) Inventors: Jonatan Samuelsson, Vancouver, WA (US); Sachin G. Deshpande, Vancouver, WA (US); Christopher Andrew Segall, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 191 days.

(21) Appl. No.: 17/622,079

(22) PCT Filed: Jun. 22, 2020

(86) PCT No.: PCT/JP2020/024336
§ 371 (c)(1),
(2) Date: Dec. 22, 2021

(87) PCT Pub. No.: WO2020/262286
PCT Pub. Date: Dec. 30, 2020

(65) Prior Publication Data
US 2022/0272378 A1    Aug. 25, 2022

Related U.S. Application Data

(60) Provisional application No. 62/907,612, filed on Sep. 28, 2019, provisional application No. 62/893,791, filed on Aug. 29, 2019, provisional application No. 62/865,841, filed on Jun. 24, 2019, provisional application No. 62/865,295, filed on Jun. 23, 2019.

(51) Int. Cl.
| | | |
|---|---|---|
| H04N 19/59 | (2014.01) | |
| H04N 19/117 | (2014.01) | |
| H04N 19/132 | (2014.01) | |
| H04N 19/80 | (2014.01) | |

(52) U.S. Cl.
CPC ........... *H04N 19/59* (2014.11); *H04N 19/117* (2014.11); *H04N 19/132* (2014.11); *H04N 19/80* (2014.11)

(58) Field of Classification Search
CPC ..... H04N 19/80; H04N 19/117; H04N 19/132
See application file for complete search history.

(56) References Cited

U.S. PATENT DOCUMENTS

2015/0201204 A1*  7/2015  Chen .............. H04N 19/30
                                    375/240.02
2018/0278940 A1*  9/2018  Park .............. H04N 19/109

OTHER PUBLICATIONS

Official Communication issued in International Patent Application No. PCT/JP2020/024336, mailed on Aug. 11, 2020.
(Continued)

*Primary Examiner* — On S Mung
(74) *Attorney, Agent, or Firm* — Keating & Bennett, LLP

(57) ABSTRACT

This disclosure relates to video coding and more particularly to techniques for an adaptive resolution change. According to an aspect of an invention, a motion compensation interpolation filter is selected based on a value of a scaling factor, wherein the motion compensation interpolation filter is specified by 16 fractional sample positions and 8 interpolation filter coefficients corresponding to each of the fractional sample position.

3 Claims, 8 Drawing Sheets

(56) References Cited

OTHER PUBLICATIONS

International Telecommunication Union, "Series H: Audiovisual and Multimedia Systems Infrastructure of audiovisual services—Coding of moving video, High efficiency video coding", ITU-T H.265, Dec. 2016, 662 pages.
Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, JVET-G1001-v1, Jul. 13-21, 2017, 51 pages.
Bross, "Working Draft 1 of Versatile Video Coding", Joint Video Experts Team (JVET) of ITU-T SG 16 WP 3 and ISO/IEC JTC 1/SC 29/WG 11, JVET-J1001-v2, Apr. 10-20, 2018, 40 pages.
Bross et al., "Versatile Video Coding (Draft 5)", Joint Video Experts Team (JVET) of ITU-T SG 16 WP 3 and ISO/IEC JTC 1/SC 29/WG 11, JVET-N1001-v8, Mar. 19-27, 2019, 400 pages.
Bross et al., "Versatile Video Coding (Draft 6)", Joint Video Experts Team (JVET) of ITU-T SG 16 WP 3 and ISO/IEC JTC 1/SC 29/WG 11, JVET-O2001-vE, Jul. 3-12, 2019, 455 pages.
Chen et al., "AHG 19: Adaptive Resolution Change", Joint Video Experts Team (JVET) of ITU-T SG 16 WP 3 and ISO/IEC JTC 1/SC 29/WG 11, JVET-N0279, Mar. 19-27, 2019, pp. 1-6.
Bross et al., "Versatile Video Coding (Draft 4)", Joint Video Experts Team (JVET) of ITU-T SG 16 WP 3 and ISO/IEC JTC 1/SC 29/WG 11, JVET-M1001-v7, Jan. 9-18, 2019, 299 pages.
Hendry et al., "AHG19: Adaptive resolution change (ARC) support in VVC" Joint Video Experts Team (JVET) of ITU-T SG 16 WP 3 and ISO/IEC JTC 1/SC 29/WG 11, JVET-N0118-v3, pp. 1-8.

* cited by examiner

SYSTEMS AND METHODS FOR PERFORMING AN ADAPTIVE RESOLUTION CHANGE IN VIDEO CODING

TECHNICAL FIELD

This disclosure relates to video coding and more particularly to techniques for an adaptive resolution change.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Re7777777777777c. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the 10th Meeting of ISO/IEC JTC1/SC29/WG11 16-20 Apr. 2018, San Diego, Calif. From the multiple descriptions of video coding tools, a resulting initial draft text of a video coding specification is described in "Versatile Video Coding (Draft 1)," 10th Meeting of ISO/IEC JTC1/SC29/WG11 16-20 Apr. 2018, San Diego, Calif., document JVET-J1001-v2, which is incorporated by reference herein, and referred to as JVET-J1001. The current development of a next generation video coding standard by the VCEG and MPEG is referred to as the Versatile Video Coding (VVC) project. "Versatile Video Coding (Draft 5)," 14th Meeting of ISO/IEC JTC1/SC29/WG11 19-27 Mar. 2019, Geneva, CH, document JVET-N1001-v8, which is incorporated by reference herein, and referred to as JVET-N1001, represents an iteration of the draft text of a video coding specification corresponding to the VVC project. "Versatile Video Coding (Draft 6)," 15th Meeting of ISO/IEC JTC1/SC29/WG11 3-12 Jul. 2019, Gothenburg, SE, document JVET-O2001-vE, which is incorporated by reference herein, and referred to as JVET-O2001, represents the current iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream

SUMMARY OF INVENTION

In one example, a method of video decoding, the method comprising: determining a scaling factor corresponding to down sampling between a reference picture and a current picture; and wherein the motion compensation interpolation filter is specified by 16 fractional sample positions and 8 interpolation filter coefficients corresponding to each of the fractional sample position.

In one example, a device for coding video data, the device comprising one or more processors configured to: determine a scaling factor corresponding to down sampling between a reference picture and a current picture; and select a motion compensation interpolation filter based on a value of the scaling factor, wherein the motion compensation interpolation filter is specified by 16 fractional sample positions and 8 interpolation filter coefficients corresponding to each of the fractional sample position.

DESCRIPTION OF EMBODIMENTS

Figure 1:
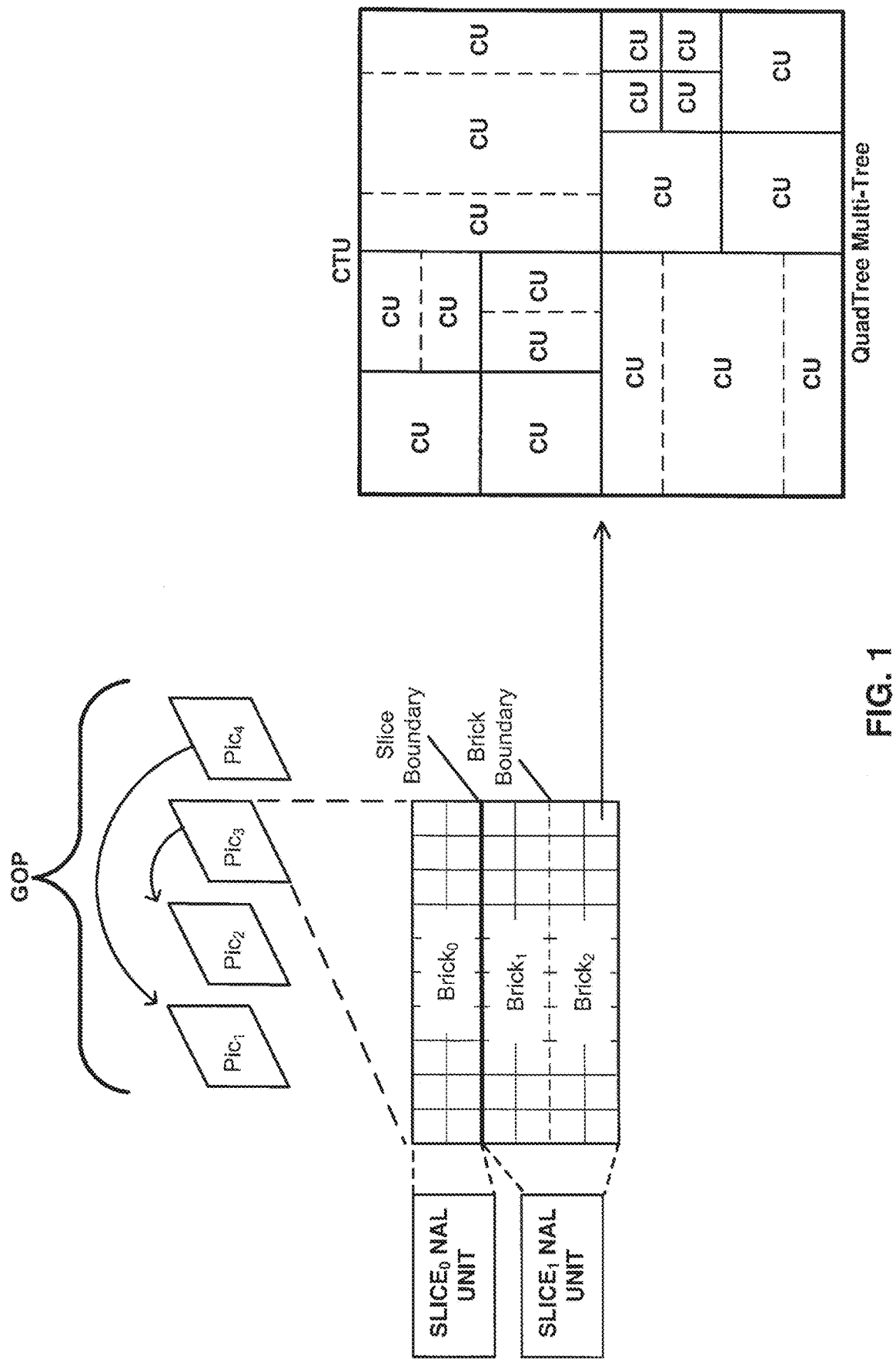
FIG. 1 is a conceptual diagram illustrating an example of a group of pictures coded according to a quad tree multi-tree partitioning in accordance with one or more techniques of this disclosure.

In general, this disclosure describes various techniques for coding video data. In particular, this disclosure describes techniques for performing an adaptive resolution change. It should be noted that although techniques of this disclosure are described with respect to ITU-T H.264, ITU-T H.265, JEM, JVET-N1001, and JVET-O2001 the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, JVET-N1001, and JVET-O2001. Thus, reference to ITU-T H.264, ITU-T H.265, JEM, JVET-N1001, and/or JVET-O2001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method comprises determining an adaptive resolution scaling factor and determining a motion compensation interpolation filter based on the adaptive resolution scaling factor.

In one example, a device comprises one or more processors configured to determine an adaptive resolution scaling factor and determine a motion compensation interpolation filter based on the adaptive resolution scaling factor.

In one example, a non-transitory computer-readable storage medium comprises instructions stored thereon that, when executed, cause one or more processors of a device to determine an adaptive resolution scaling factor and determine a motion compensation interpolation filter based on the adaptive resolution scaling factor.

In one example, an apparatus comprises means for determining an adaptive resolution scaling factor and means for determining a motion compensation interpolation filter based on the adaptive resolution scaling factor.

The details of one or more examples are set forth in the accompanying drawings and the description below. Other features, objects, and advantages will be apparent from the description and drawings, and from the claims.

Video content includes video sequences comprised of a series of frames (or pictures). A series of frames may also be referred to as a group of pictures (GOP). Each video frame or picture may be divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level. In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may be halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-N1001 and JVET-O2001, CTUs are partitioned according a quadtree plus multi-type tree (QTMT or QT+MTT) structure. The QTMT in JVET-N1001 and JVET-O2001 is similar to the QTBT in JEM. However, in JVET-N1001 and JVET-O2001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge. Referring again to FIG. 1, FIG. 1 illustrates an example of a CTU being partitioned into quadtree leaf nodes and quadtree leaf nodes being further partitioned according to a BT split or a TT split. That is, in FIG. 1 dashed lines indicate additional binary and ternary splits in a quadtree.

As described above, each video frame or picture may divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

With respect to JVET-N1001 and JVET-O2001, slices are required to consist of an integer number of bricks instead of only being required to consist of an integer number of CTUs. In JVET-N1001 and JVET-O2001, a brick is a rectangular region of CTU rows within a particular tile in a picture. Further, in JVET-N1001 and JVET-O2001, a tile may be partitioned into multiple bricks, each of which consisting of one or more CTU rows within the tile. A tile that is not partitioned into multiple bricks is also referred to as a brick. However, a brick that is a true subset of a tile is not referred to as a tile. As such, a slice including a set of CTUs which do not form a rectangular region of a picture may or may not be supported in some video coding techniques. Further, it should be noted that in some cases, a slice may be required to consist of an integer number of complete tiles and in this case is referred to as a tile group. The techniques described herein may applicable to bricks, slices, tiles, and/or tile groups. FIG. 1 is a conceptual diagram illustrating an example of a group of pictures including slices. In the example illustrated in FIG. 1, $Pic_3$ is illustrated as including two slices (i.e., $Slice_0$ and $Slice_1$). In the example illustrated in FIG. 1, $Slice_0$ includes one brick, i.e., $Brick_0$ and $Slice_1$ includes two bricks, i.e., $Brick_1$ and $Brick_2$. It should be noted that in some cases, $Slice_0$ and $Slice_1$ may meet the requirements of and be classified as tiles and/or tile groups.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 1, $Pic_3$ is illustrated as referencing $Pic_2$. Similarly, $Pic_4$ is illustrated as referencing $Pic_1$. With respect to FIG. 1 assuming the picture number corresponds to the decoding order the DPB would be populated as follows: after decoding $Pic_1$, the DPB would include $\{Pic_1\}$; at the onset of decoding $Pic_2$, the DPB would include $\{Pic_1\}$; after decoding $Pic_2$, the DPB would include $\{Pic_1, Pic_2\}$; at the onset of decoding $Pic_3$, the DPB would include $\{Pic_1, Pic_2\}$. $Pic_3$ would then be decoded with reference to $Pic_2$ and after decoding $Pic_3$, the DPB would include $\{Pic_1, Pic_2, Pic_3\}$. At the onset of decoding $Pic_4$, pictures $Pic_2$ and $Pic_3$ would be marked for removal from the DPB, as they are not needed for decoding $Pic_4$ (or any subsequent pictures, not shown) and assuming $Pic_2$ and $Pic_3$ have been output, the DPB would be updated to include $\{Pic_1\}$. $Pic_4$ would then be decoded with referencing $Pic_1$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265, JVET-N1001, and JVET-O2001, a CU is associated with a transform unit (TU) structure having its root at the CU level. That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

Figure 2A:
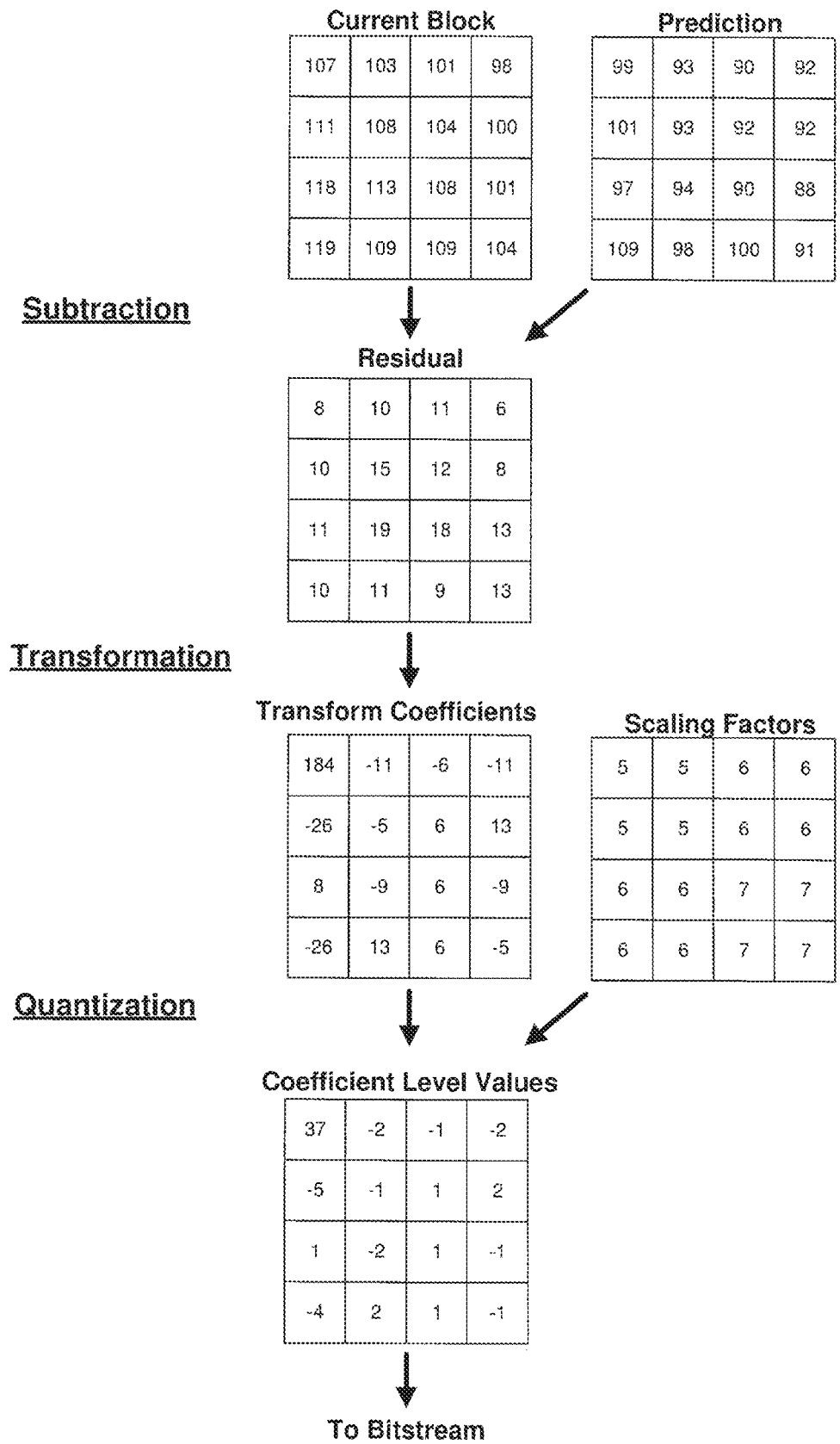
FIG. 2A is a conceptual diagram illustrating example of coding a block of video data in accordance with one or more techniques of this disclosure.
Figure 2B:
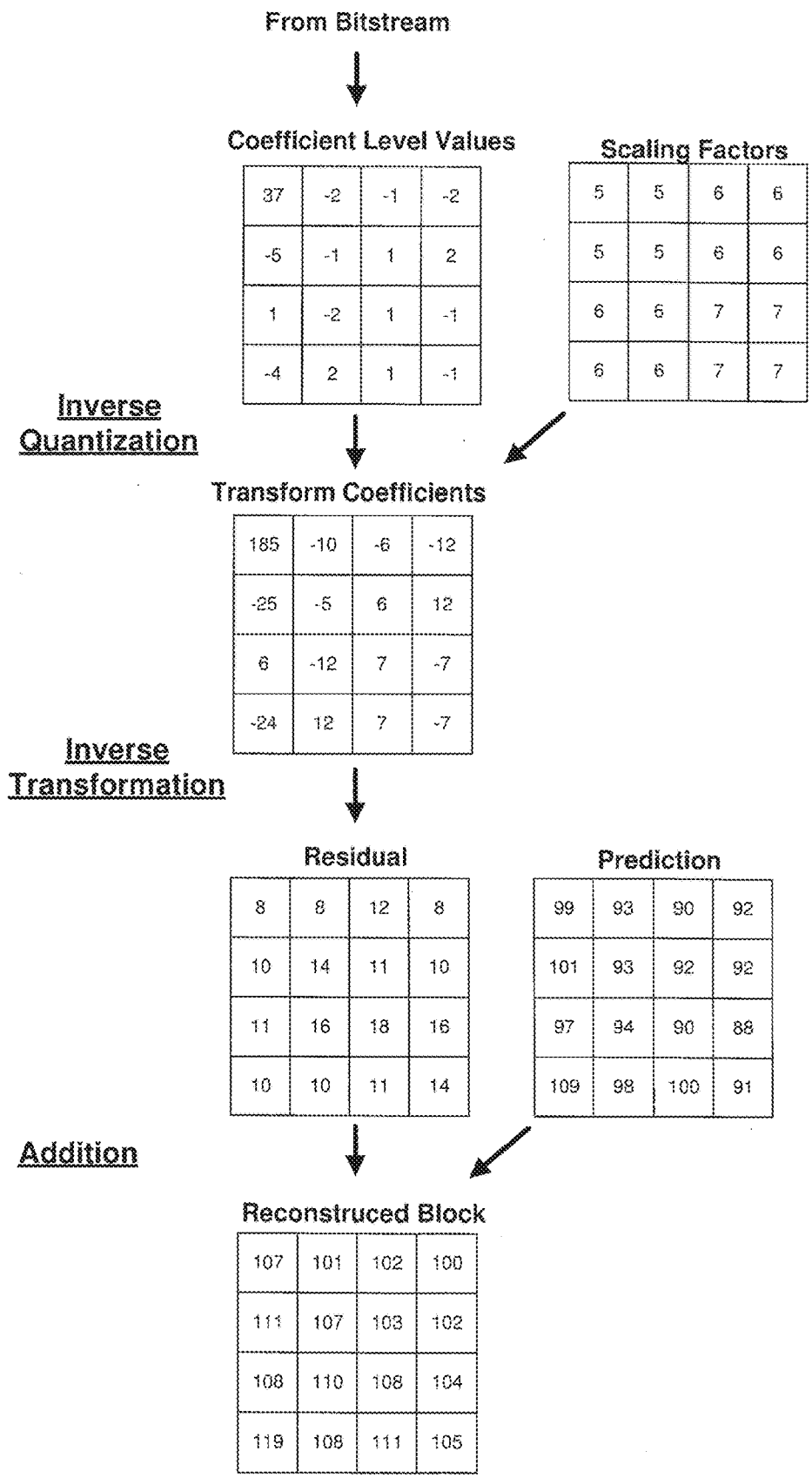
FIG. 2B is a conceptual diagram illustrating example of coding a block of video data in accordance with one or more techniques of this disclosure.

FIGS. 2A-2B are conceptual diagrams illustrating examples of coding a block of video data. As illustrated in FIG. 2A, a current block of video data (e.g., a CB corresponding to a video component) is encoded by generating a residual by subtracting a set of prediction values from the current block of video data, performing a transformation on the residual, and quantizing the transform coefficients to generate level values. As illustrated in FIG. 2B, the current block of video data is decoded by performing inverse quantization on level values, performing an inverse transform, and adding a set of prediction values to the resulting residual. It should be noted that in the examples in FIGS. 2A-2B, the sample values of the reconstructed block differs from the sample values of the current video block that is encoded. In this manner, coding may said to be lossy. However, the difference in sample values may be considered acceptable or imperceptible to a viewer of the reconstructed video.

Further, as illustrated in FIGS. 2A-2B, coefficient level values are generated using an array of scaling factors. In ITU-T H.265, an array of scaling factors is generated by selecting a scaling matrix and multiplying each entry in the scaling matrix by a quantization scaling factor. In ITU-T H.265, a scaling matrix is selected based in part on a prediction mode and a color component, where scaling matrices of the following sizes are defined: 4×4, 8×8, 16×16, and 32×32. It should be noted that in some examples, a scaling matrix may provide the same value for each entry (i.e., all coefficients are scaled according to a single value). In ITU-T H.265, the value of a quantization scaling factor, may be determined by a quantization parameter, QP. In ITU-T H.265, for a bitdepth of 8-bits, the QP can take 52 values from 0 to 51 and a change of 1 for QP generally corresponds to a change in the value of the quantization scaling factor by approximately 12%. Further, in ITU-T H.265, a QP value for a set of transform coefficients may be derived using a predictive quantization parameter value (which may be referred to as a predictive QP value or a QP predictive value) and an optionally signaled quantization parameter delta value (which may be referred to as a QP delta value or a delta QP value). In ITU-T H.265, a quantization parameter may be updated for each CU and a respective quantization parameter may be derived for each of the luma and chroma channels. Referring again to FIG. 2A, quantized transform coefficients are coded into a bitstream. Quantized transform coefficients and syntax elements (e.g., syntax elements indicating a coding structure for a video block) may be entropy coded according to an entropy coding technique.

Figure 3:
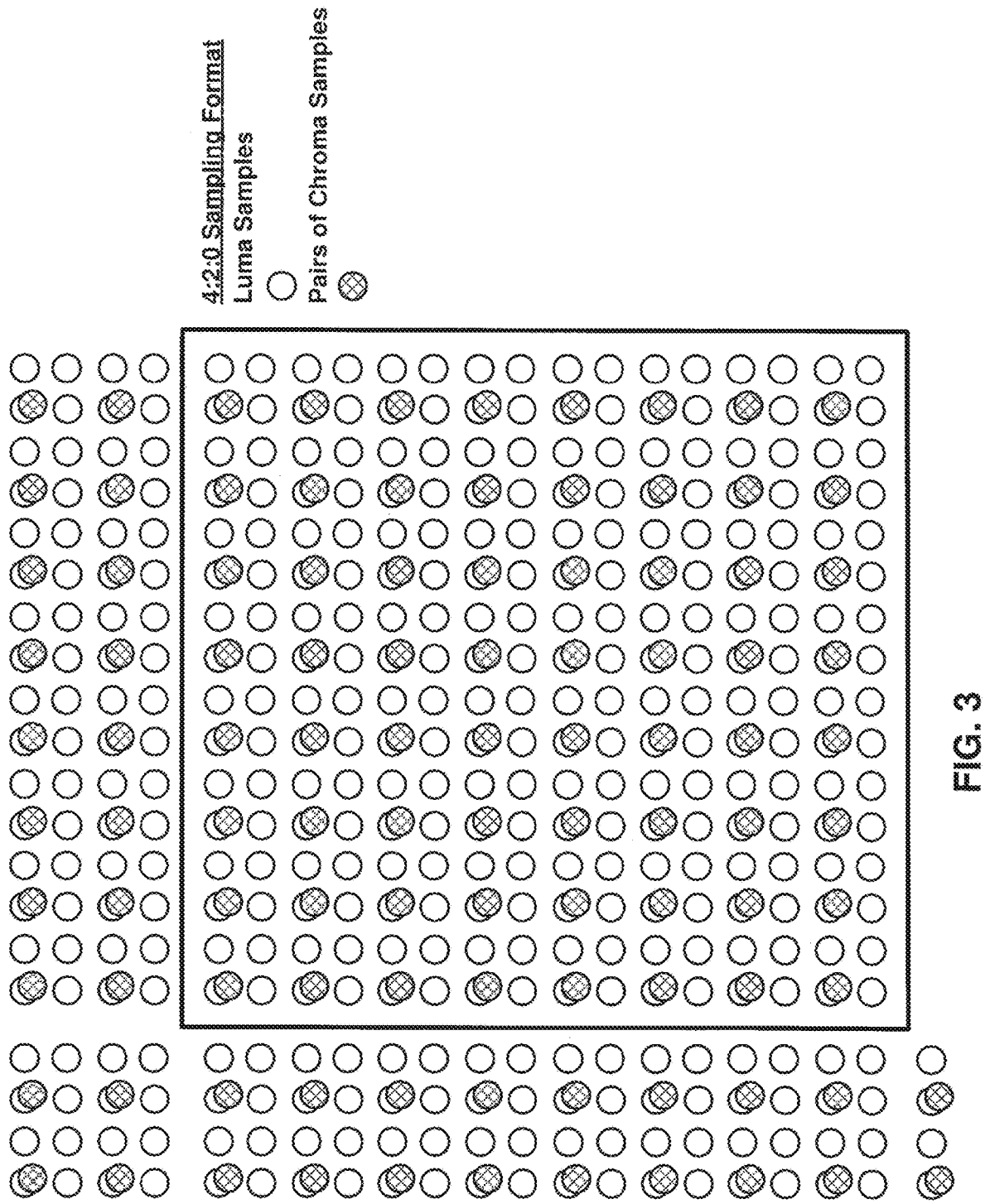
FIG. 3 is a conceptual diagram illustrating an example of a video component sampling format that may be utilized in accordance with one or more techniques of this disclosure.

A video sampling format, which may also be referred to as a chroma format, may define the number of chroma samples included in a CU with respect to the number of luma samples included in a CU. For example, for the 4:2:0 sampling format, the sampling rate for the luma component is twice that of the chroma components for both the horizontal and vertical directions. As a result, for a CU formatted according to the 4:2:0 format, the width and height of an array of samples for the luma component are twice that of each array of samples for the chroma components. FIG. 3 is a conceptual diagram illustrating an example of a coding unit formatted according to a 4:2:0 sample format. FIG. 3 illustrates the relative position of chroma samples with respect to luma samples within a CU. As described above, a CU is typically defined according to the number of horizontal and vertical luma samples. Thus, as illustrated in FIG. 3, a 16×16 CU formatted according to the 4:2:0 sample format includes 16×16 samples of luma components and 8×8 samples for each chroma component. Further, in the example illustrated in FIG. 2, the relative position of chroma samples with respect to luma samples for video blocks neighboring the 16×16 CU are illustrated. For a CU formatted according to the 4:2:2 format, the width of an array of samples for the luma component is twice that of the width of an array of samples for each chroma component, but the height of the array of samples for the luma component is equal to the height of an array of samples for each chroma component. Further, for a CU formatted according to the 4:4:4 format, an array of samples for the luma component has the same width and height as an array of samples for each chroma component.

With respect to the equations used herein, the following arithmetic operators may be used:

+ Addition
− Subtraction
Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

x % y Modulus. Remainder of x divided by y, defined only for integers x and y with x>=0 and y>0.

Further, the following logical operators may be used:
x && y Boolean logical "and" of x and y
x||y Boolean logical "or" of x and y
! Boolean logical "not"
x ? y:z If x is TRUE or not equal to 0, evaluates to the value of y; otherwise, evaluates to the value of z.

Further, the following relational operators may be used:
> Greater than
>= Greater than or equal to
< Less than
<= Less than or equal to
== Equal to
!= Not equal to Further, the following bit-wise operators may be used:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
∧ A Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

Further, the following assignment operators may be used:
= Assignment operator
++ Increment, i.e., x++ is equivalent to x=x+1; when used in an array index, evaluates to the value of the variable prior to the increment operation.
— Decrement, i.e., x— is equivalent to x=x−1; when used in an array index, evaluates to the value of the variable prior to the decrement operation.
+= Increment by amount specified, i.e., x+=3 is equivalent to x=x+3, and x+=(−3) is equivalent to x=x+(−3).
−= Decrement by amount specified, i.e., x−=3 is equivalent to x=x−3, and x−=(−3) is equivalent to x=x−(−3).

Further, the following defined mathematical functions may be used:

$$\text{Abs}(x) = \begin{cases} x & ; \ x >= 0 \\ -x & ; \ x < 0 \end{cases}$$

Floor(x) the largest integer less than or equal to x.
Log 2(x) the base-2 logarithm of x.

$$\text{Min}(x, y) = \begin{cases} x & ; \ x <= y \\ y & ; \ x > y \end{cases}$$

$$\text{Max}(x, y) = \begin{cases} x & ; \ x >= y \\ y & ; \ x < y \end{cases}$$

Further, it should be noted that in the syntax descriptors used herein, the following descriptors may be applied:
b(8): byte having any pattern of bit string (8 bits). The parsing process for this descriptor is specified by the return value of the function read_bits(8).
f(n): fixed-pattern bit string using n bits written (from left to right) with the left bit first. The parsing process for this descriptor is specified by the return value of the function read_bits(n).
se(v): signed integer 0-th order Exp-Golomb-coded syntax element with the left bit first.
tb(v): truncated binary using up to maxVal bits with maxVal defined in the semantics of the symtax element.
tu(v): truncated unary using up to maxVal bits with maxVal defined in the semantics of the symtax element.
u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.
ue(v): unsigned integer 0-th order Exp-Golomb-coded syntax element with the left bit first.

As described above, for inter prediction coding, a motion vector includes a resolution for specifying a sample precision. In particular, for fractional sample resolutions a corresponding interpolation process is used to generate a prediction. NET-N1001 provides the following fractional sample interpolation process:

Inputs to this process are:
a luma location (xSb, ySb) specifying the top-left sample of the current coding subblock relative to the top-left luma sample of the current picture,
a variable sbWidth specifying the width of the current coding subblock,
a variable sbHeight specifying the height of the current coding subblock,
a motion vector offset mvOffset,
a refined motion vector refMvLX,
the selected reference picture sample array refPicLX,
the bidirectional optical flow flag bdofFlag,
a variable cIdx specifying the colour component index of the current block.

Outputs of this process are:
an (sbWidth+bdofOffset)×(sbHeight+bdofOffset) array predSamplesLX of prediction sample values.

The bidirectional optical flow boundary offset bdofOffset is derived as follows:
bdofOffset=bdofFlag ? 2:0
If cIdx is equal to 0, the following applies:
Let (xIntL, yIntL) be a luma location given in full-sample units and (xFracL, yFracL) be an offset given in 1/16-sample units. These variables are used only in this clause for specifying fractional-sample locations inside the reference sample arrays refPicLX.

For each luma sample location
(x$_L$=0 . . . sbWidth−1+bdofOffset, y$_L$=0 . . . sbHeight−1+bdofOffset) inside the prediction luma sample array predSamplesLX, the corresponding prediction luma sample value predSamplesLX[x$_L$][y$_L$] is derived as follows:
   The variables xInt$_L$, yInt$_L$, xFrac$_L$ and yFrac$_L$ are derived as follows:

$x\text{Int}_L = xSb + (refMvLX[0] >> 4) + x_L$ $y\text{Int}_L = ySb + (refMvLX[1] >> 4) + y_L$ $x\text{Frac}_L = refMvLX[0] \& 15$ $y\text{Frac}_L = refMvLX[1] \& 15$ If bdofFlag is equal to TRUE and one or more of the following conditions are true, the prediction luma sample value predSamplesLX[x$_L$][y$_L$] is derived by invoking the luma integer sample fetching process as specified below with (xInt$_L$, yInt$_L$), (xFrac$_L$, yFrac$_L$ and refPicLX as inputs:
   x$_L$ is equal to 0.
   x$_L$ is equal to sbWidth+1.
   y$_L$ is equal to 0.
   y$_L$ is equal to sbHeight+1.
Otherwise, the following applies:
   The motion vector mvLX is set equal to (refMvLX−mvOffset).
   The list padVal[dir] is derived as follows for dir=0 . . . 1:
      The variable disp is derived as follows:

$disp = (refMvLX[dir] >> 4) - (mvLX[dir] >> 4) + (dir == 0 ? x_L : y_L)$

If disp is less than 0, padVal[dir] is set equal to disp.
      Otherwise, if disp is greater than (dir==0 ? sbWidth:sbHeight)−1, padVal[dir] is set equal to disp−((dir==0 ? sbWidth:sbHeight)−1).
      Otherwise, padVal[dir] is set equal to 0.
   The prediction luma sample value predSamplesLX[xL][yL] is derived by invoking the luma sample 8-tap interpolation filtering process as specified in below with (xIntL, yIntL), (xFracL, yFracL), refPicLX, sbWidth, sbHeight, (xSb, ySb) and padVal as inputs.
Otherwise (cIdx is not equal to 0), the following applies:
   Let (xIntC, yIntC) be a chroma location given in full-sample units and (xFracC, yFracC) be an offset given in 1/32 sample units. These variables are used only in this clause for specifying general fractional-sample locations inside the reference sample arrays refPicLX.
   For each chroma sample location (xC=0 . . . sbWidth−1, yC=0 . . . sbHeight−1) inside the prediction chroma sample arrays predSamplesLX, the corresponding prediction chroma sample value predSamplesLX[xC][yC] is derived as follows:
      The variables xInt$_C$, yInt$_C$, xFrac$_C$ and yFrac$_C$ are derived as follows:

$x\text{Int}_C = (xSb/SubWidthC) + (mvLX[0] >> 5) x_C$ $y\text{Int}_C = (ySb/SubHeightC) + (mvLX[1] >> 5) + y_C$ $x\text{Frac}_C = mvLX[0] \& 31$ $y\text{Frac}_C = mvLX[1] \& 31$ The motion vector mvLX is set equal to (refMvLX−mvOffset).
   The list padVal[dir] is derived as follows for dir=0 . . . 1:
      The variable disp is derived as follows:

$disp = (refMvLX[dir] >> 4) - (mvLX[dir] >> 4) + (dir == 0 ? x_C : y_C)$

If disp is less than 0, padVal[dir] is set equal to disp.
      Otherwise, if disp is greater than (dir==0 ? sbWidth/SubWidthC:sbHeight/SubWidthC)−1, padVal[dir] is set equal to $disp - ((dir == 0 ? sbWidth/SubWidthC : sbHeight/SubWidthC) - 1)$.

Otherwise, padVal[dir] is set equal to 0.
   The prediction sample value predSamplesLX[xC][yC] is derived by invoking the chroma sample interpolation process specified below with (xIntC, yIntC), (xFracC, yFracC), refPicLX, and padVal as inputs.
Luma Sample Interpolation Filtering Process:
Inputs to this process are:
   a luma location in full-sample units (xInt$_L$, yInt$_L$).
   a luma location in fractional-sample units (xFrac$_L$, yFrac$_L$),
   the luma reference sample array refPicLX$_L$,
   a variable sbWidth specifying the width of the current subblock,
   a variable sbHeight specifying the height of the current subblock,
   a luma location (xSb, ySb) specifying the top-left sample of the current subblock relative to the top-left luma sample of the current picture,
   a list padVal[dir] with dir=0,1 specifying reference sample padding direction and amount.
Output of this process is a predicted luma sample value predSampleLX$_L$
The variables shift1, shift2 and shift3 are derived as follows:
   The variable shift1 is set equal to Min(4, BitDepth$_Y$−8), the variable shift2 is set equal to 6 and the variable shift3 is set equal to Max(2, 14−BitDepth$_Y$).
   The variable pic W is set equal to pic_width_in_luma_samples and the variable picH is set equal to pic_height_in_luma_samples.
The luma interpolation filter coefficients f$_L$[p] for each 1/16 fractional sample position p equal to xFrac$_L$ or yFrac$_L$ are specified in Table 1A.
The luma interpolation filter coefficients fPad$_L$[0] are set equal to f$_L$[xFrac$_L$] and fPad$_L$[1] are set equal to f$_L$[yFrac$_L$] and modified depending on padVal[dir] as follows for dir being equal to 0 and 1:
   If padVal[dir] is equal to −2, fPad$_L$[dir] is modified as follows:

$f\text{Pad}_L[dir][2] = f\text{Pad}_L[dir][2] + f\text{Pad}_L[dir][1] + f\text{Pad}_L[dir][0]$ $f\text{Pad}_L[dir][0] = 0$ $f\text{Pad}_L[dir][1] = 0$ Otherwise, if padVal[dir] is equal to −1, fPad$_L$[dir] is modified as follows:

$f\text{Pad}_L[dir][1] = f\text{Pad}_L[dir][1] + f\text{Pad}_L[dir][0]$ $f\text{Pad}_L[dir][0] = 0$ Otherwise, if padVal[dir] is equal to 1, fPad$_L$[dir] is modified as follows:

fPad$_L$[dir][6]=fPad$_L$[dir][6]+fPad$_L$[dir][7]

fPad$_L$[dir][7]=0

Otherwise, if padVal[dir] is equal to 2, fPad$_L$[dir] is modified as follows:

fPad$_L$[dir][5]=fPad$_L$[dir][5]+fPad$_L$[dir][6]+fPad$_L$[dir][7]

fPad$_L$[dir][6]=0 fPad$_L$[dir][7]=0

When MotionModelIdc[xSb][ySb] is greater than 0 and sbWidth is equal to 4 and sbHeight is equal to 4, fPad$_L$[dir] is modified as follows for dir being equal to 0 and 1:

fPad$_L$[dir][1]=fPad$_L$[dir][0]+fPad$_L$[dir][1]

fPad$_L$[dir][0]=0 fPad$_L$[dir][6]=fPad$_L$[dir][6]+fPad$_L$[dir][7]

fPad$_{L[dir]}$[7]=0

The luma locations in full-sample units (xInt$_i$, yInt$_i$) are derived as follows for i=0 . . . 7:

xInt$_i$=Clip3(0,picW−1,sps_ref_wraparound_enabled_flag?

ClipH((sps_ref_wraparound_offsetminus1+1)*MinCbSizeY,picW,xInt$_L$+i−3):

xInt$_L$+i−3)

yInt$_i$=Clip3(0,picH−1,yInt$_L$+i−3)

The predicted luma sample value predSampleLX$_L$ is derived as follows:

If both xFrac$_L$ and yFrac$_L$ are equal to 0, the value of predSampleLX$_L$ is derived as follows:

predSampleLX$_L$=refPicLX$_L$[xInt$_3$][yInt$_3$]<<shift3

Otherwise, if xFrac$_L$ is not equal to 0 and yFrac$_L$ is equal to 0, the value of predSampleLX$_L$ is derived as follows:

predSampleLX$_L$=($\Sigma_{i=0}^{7}$fPad$_L$[0][i]*refPicLX$_L$[xInt$_i$][yInt$_3$])>>shift1

Otherwise, if xFrac$_L$ is equal to 0 and yFrac$_L$ is not equal to 0, the value of predSampleLX$_L$ is derived as follows:

predSampleLX$_L$=($\Sigma_{i=0}^{7}$fPad$_L$[1][i]*refPicLX$_L$[xInt$_3$][yInt$_i$])>>shift1

Otherwise, if xFrac$_L$ is not equal to 0 and yFrac$_L$ is not equal to 0, the value of predSampleLX$_L$ is derived as follows:

The sample array temp [n] with n=0 . . . 7, is derived as follows:

temp[n]=($\Sigma_{i=0}^{7}$fPad$_L$[0][i]*refPicLX$_L$[xInt$_i$][yInt$_n$])>>shift1

The predicted luma sample value predSampleLX$_L$ is derived as follows:

predSampleLX$_L$=($\Sigma_{i=0}^{7}$fPad$_L$[1][i]*temp[i])>>shift2

TABLE 1A

| Fractional sample position p | interpolation filter coefficients | | | | | | | |
|---|---|---|---|---|---|---|---|---|
| | f$_L$[ p ][ 0 ] | f$_L$[ p ][ 1 ] | f$_L$[ p ][ 2 ] | f$_L$[ p ][ 3 ] | f$_L$[ p ][ 4 ] | f$_L$[ p ][ 5 ] | f$_L$[ p ][ 6 ] | f$_L$[ p ][ 7 ] |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

Luma Sample Interpolation Filtering Process:

Inputs to this process are:
  a luma location in full-sample units (xInt$_L$, YInt$_L$)
  the luma reference sample array refPicLX$_L$, Output of this process is a predicted luma sample value predSampleLX$_L$ The variable shift is set equal to Max(2, 14−BitDepth$_Y$).

The variable picW is set equal to pic_width_in_luma_samples and the variable picH is set equal to pic_height_in_luma_samples.

The luma locations in full-sample units (xInt, yInt) are derived as follows:

xInt=Clip3(0,picW−1,sps_ref_wraparound_enabled_flag?

ClipH((sps_ref_wraparound_offset_minus1+1)*MinCbSizeY,picW,xInt$_L$):

xInt$_L$)

yInt=Clip3(0,picH−1,yInt$_L$)

The predicted luma sample value predSampleLX$_L$ is derived as follows:

predSampleLX$_L$=refPicLX$_L$[xInt][yInt]<<shift3

Chroma Sample Interpolation Process:
Inputs to this process are:
  a chroma location in full-sample units ($xInt_C$, $yInt_C$),
  a chroma location in 1/32 fractional-sample units ($xFrac_C$, $yFrac_C$),
  the chroma reference sample array $refPicLX_C$.
Output of this process is a predicted chroma sample value $predSampleLX_C$
The variables shift1, shift2 and shift3 are derived as follows:
  The variable shift1 is set equal to Min(4, $BitDepth_C$−8), the variable shift2 is set equal to 6 and the variable shift3 is set equal to Max(2, 14−$BitDepth_C$).
  The variable picW is set equal to pic_width_in_luma_samples/SubWidthC and the variable $picH_C$ is set equal to pic_height_in_luma_samples/SubHeightC.
The chroma interpolation filter coefficients $f_C[p]$ for each 1/32 fractional sample position p equal to $xFrac_C$ or $yFrac_C$ are specified in Table 2A.
The chroma interpolation filter coefficients $fPad_C[0]$ are set equal to $f_C[xFrac_L]$ and $fPad_C[1]$ are set equal to $f_C[yFrac_L]$ and modified depending on padVal[dir] as follows for dir being equal to 0 and 1:
  If padVal[dir] is equal to −1, $fPad_C[dir]$ is modified as follows:

$fPad_C[dir][1]=fPad_C[dir][1]+fPad_C[dir][0]$ $fPad_L[dir][0]=0$

Otherwise, if padVal[dir] is equal to 1, $fPad_C[dir]$ is modified as follows:

$fPad_C[dir][2]=fPad_C[dir][2]+fPad_C[dir][3]$ $fPad_C[dir][3]=0$

The variable xOffset is set equal to (sps_ref_wraparound_offset_minus1+1)*MinCbSize$Y$/SubWidth$C$.

The chroma locations in full-sample units ($xInt_i$, $yInt_i$) are derived as follows for i=0 . . . 3:

$xInt_i$=Clip3(0,pic$W$−1, sps_ref_wraparound_enabled_flag?Clip$H$(xOffset, $picW_C$,$xInt_C$+i−1):

$xInt_C$+i−1)

$yInt_i$=Clip3(0,$picH_C$−1,$yInt_C$+i−1)

The predicted chroma sample value $predSampleLX_C$ is derived as follows:
  If both $xFrac_C$ and $yFrac_C$ are equal to 0, the value of $predSampleLX_C$ is derived as follows:

$predSampleLX_C$=$refPicLX_C$[$xInt_1$][$Yint_1$]<<shift3

Otherwise if $xFrac_C$ is not equal to 0 and $yFrac_C$ is equal to 0, the value of $predSampleLX_C$ is derived as follows:

$predSampleLX_C$=($\Sigma_{i=0}^{3}fPad_C[0][i]$*$refPicLX_C[xInt_i]$ $[yInt_i]$)>>shift1

Otherwise if $xFrac_C$ is equal to 0 and $yFrac_C$ is not equal to 0, the value of $predSampleLX_C$ is derived as follows:

$predSampleLX_C$=($\Sigma_{i=0}^{3}fPad_C[1][i]$*$refPicLX_C[xInt_i]$ $[yInt_i]$)>>shift1

Otherwise if $xFrac_C$ is not equal to 0 and $yFrac_C$ is not equal to 0, the value of $predSampleLX_C$ is derived as follows:

The sample array temp[n] with n=0 . . . 3, is derived as follows:

temp[$n$]=($\Sigma_{i=0}^{3}fPad_C[0][i]$*$refPicLX_C[xInt_i]$ $[yInt_n]$)>>shift1

The predicted chroma sample value $predSampleLX_C$ is derived as follows:

$predSampleLX_C$=($fPad_C[1][0]$*temp[0]+

$fPad_L[1][1]$*temp[1]+

$fPad_C[1][2]$*temp[2]+

$fPad_C[1][3]$*temp[3])>>shift2

TABLE 2A

| Fractional sample position p | interpolation filter coefficients | | | |
| --- | --- | --- | --- | --- |
| | $f_C[p][0]$ | $f_C[p][1]$ | $f_C[p][2]$ | $f_C[p][3]$ |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

Further, JVET-O2001 provides the following fractional sample interpolation process:
Inputs to this process are:
  a luma location (xSb, ySb) specifying the top-left sample of the current coding subblock relative to the top-left luma sample of the current picture,
  a variable sbWidth specifying the width of the current coding subblock,
  a variable sbHeight specifying the height of the current coding subblock,
  a motion vector offset mvOffset,
  a refined motion vector refMvLX,
  the selected reference picture sample array refPicLX,
  the half sample interpolation filter index hpelIfIdx,
  the bi-directional optical flow flag bdofFlag,
  a variable cIdx specifying the colour component index of the current block.

Outputs of this process are:

an (sbWidth+brdExtSize)×(sbHeight+brdExtSize) array predSamplesLX of prediction sample values.

The prediction block border extension size brdExtSize is derived as follows:

brdExtSize=(bdofFlag||(inter_affine_flag[xSb][ySb] && sps_affine_prof_enabled_flag))?2:0

The variable fRefWidth is set equal to the PicOutputWidthL of the reference picture in luma samples.
The variable fRefHeight is set equal to PicOutputHeightL of the reference picture in luma samples.
The motion vector mvLX is set equal to (refMvLX−mvOffset).
  If cIdx is equal to 0, the following applies:
    The scaling factors and their fixed-point representations are defined as hori_scale_fp=((fRefWidth<<14)+(PicOutputWidthL>

>1))/PicOutputWidthL vert_scale_fp=((fRefHeight<<14)+(PicOutputHeightL>

>1))/PicOutputHeightL

Let (xIntL, yIntL) be a luma location given in full-sample units and (xFracL, yFracL) be an offset given in $\frac{1}{16}$-sample units. These variables are used only in this clause for specifying fractional-sample locations inside the reference sample arrays refPicLX.
The top-left coordinate of the bounding block for reference sample padding (xSbInt$_L$, ySbInt$_L$) is set equal to (xSb+(mvLX[0]>>4),ySb+(mvLX[1]>>4)).

For each luma sample location
  (x$_L$=0 ... sbWidth−1+brdExtSize, y$_L$=0 ... sbHeight−1+brdExtSize) inside the prediction luma sample array predSamplesLX, the corresponding prediction luma sample value predSamplesLX[x$_L$][y$_L$] is derived as follows:
Let (refxSb$_L$, refySb$_L$) and (refx$_L$, refy$_L$) be luma locations pointed to by a motion vector (refMvLX[0], refMvLX[1]) given in $\frac{1}{16}$-sample units. The variables refxSb$_L$, refx$_L$, refySb$_L$, and refy$_L$ are derived as follows:

refxSb$_L$=((xSb<<4)+refMvLX[0])*hori_scale_fp refx$_L$=((Sign(refxSb)*((Abs(refxSb)+128)>>8)+ x$_L$*((hori_scale_fp+8)>>4))+32)>>6 refySb$_L$=((ySb<<4)+refMvLX[1])*vert_scale_fp refyL=((Sign(refySb)*((Abs(refySb)+128)>>8)+yL*

((vert_scale_fp+8)>>4))+32)>>6

The variables xInt$_L$, yInt$_L$, xFrac$_L$ and yFrac$_L$ are derived as follows:

xInt$_L$=refx$_L$>>4 yInt$_L$=refy$_L$>>4 xFrac$_L$=refx$_L$&15 yFrac$_L$=refy$_L$&15

If bdofFlag is equal to TRUE or (sps_affine_prof_enabled_flag is equal to TRUE and inter_affine_flag[xSb][ySb] is equal to TRUE), and one or more of the following conditions are true, the prediction luma sample value predSamplesLX[x$_L$][y$_L$] is derived by invoking the luma integer sample fetching process as specified below with (xInt$_L$+(xFrac$_L$>>3)−1), yInt$_L$+(yFrac$_L$>>3)−1) and refPicLX as inputs.
  x$_L$ is equal to 0.
  x$_L$ is equal to sbWidth+1.
  y$_L$ is equal to 0.
  y$_L$ is equal to sbHeight+1.
Otherwise, the prediction luma sample value predSamplesLX[xL][yL] is derived by invoking the luma sample 8-tap interpolation filtering process as specified below with (xIntL−(brdExtSize>0 ? 1:0), yIntL−(brdExtSize>0 ? 1:0)), (xFracL, yFracL), (xSbInt$_L$, ySbInt$_L$), refPicLX, hpelIfIdx, sbWidth, sbHeight and (xSb, ySb) as inputs.
Otherwise (cIdx is not equal to 0), the following applies:
Let (xIntC, yIntC) be a chroma location given in full-sample units and (xFracC, yFracC) be an offset given in $\frac{1}{32}$ sample units. These variables are used only in this clause for specifying general fractional-sample locations inside the reference sample arrays refPicLX.
The top-left coordinate of the bounding block for reference sample padding (xSbIntC,ySbIntC) is set equal to((xSb/SubWidthC)+
  (mvLX[0]>>5), (ySb/SubHeightC)+(mvLX[1]>>5)).

For each chroma sample location (xC=0 ... sbWidth−1, yC=0 ... sbHeight−1) inside the prediction chroma sample arrays predSamplesLX, the corresponding prediction chroma sample value predSamplesLX[xC][yC] is derived as follows:
Let (refxSb$_C$, refySb$_C$) and (refx$_C$, refy$_C$) be chroma locations pointed to by a motion vector (mvLX[0], mvLX[1]) given in $\frac{1}{32}$-sample units. The variables refxSb$_C$, refySb$_C$, refx$_C$ and refy$_C$ are derived as follows:

refxSb$_C$=((xSb/SubWidthC<<5)+mvLX[0])
  *hori_scale_fp refx$_C$=((Sign(refxSb$_C$)*((Abs(refxSb$_C$)+256)>>9)+ xC((hori_scale_fp+8)>>4))+16)>>5 refySb$_C$=((ySb/SubHeightC<<5)+mvLX[1])*vert_scale_fp refy$_C$=((Sign(refySb$_C$)*((Abs(refySb$_C$)+256)>>9)+ yC*((Vert_Scale_Fp+8)>>4))+16)>>5

The variables xInt$_C$, yInt$_C$, xFrac$_C$ and yFrac$_C$ are derived as follows:

xInt$_C$=refx$_C$>>5 yInt$_C$=refy$_C$>>5 xFrac$_C$=refy$_C$& 31 yFrac$_e$=refy$_C$& 31

The prediction sample value predSamplesLX[xC][yC] is derived by invoking the process specified below with (xIntC, yIntC), (xFracC, yFracC), (xSbIntC, ySbIntC), sbWidth, sbHeight and refPicLX as inputs.

Luma Sample Interpolation Filtering Process

Inputs to this process are:
- a luma location in full-sample units ($xInt_L$, $yInt_L$),
- a luma location in fractional-sample units ($xFrac_L$, $yFrac_L$),
- a luma location in full-sample units ($xSbInt_L$, $ySbInt_L$) specifying the top-left sample of the bounding block for reference sample padding relative to the top-left luma sample of the reference picture,
- the luma reference sample array $refPicLX_L$,
- the half sample interpolation filter index hpelIfIdx,
- a variable sbWidth specifying the width of the current subblock,
- a variable sbHeight specifying the height of the current subblock,
- a luma location (xSb, ySb) specifying the top-left sample of the current subblock relative to the top-left luma sample of the current picture, Output of this process is a predicted luma sample value $predSampleLX_L$.

The variables shift1, shift2 and shift3 are derived as follows:
The variable shift1 is set equal to Min(4, $BitDepth_Y$−8), the variable shift2 is set equal to 6 and the variable shift3 is set equal to Max(2, 14−$BitDepth_Y$).

The variable picW is set equal to pic_width_in_luma_samples and the variable picH is set equal to pic_height_in_luma_samples.

The luma interpolation filter coefficients $f_L[p]$ for each 1/16 fractional sample position p equal to $xFrac_L$ or $yFrac_L$ are derived as follows:
- If MotionModelIdc[xSb][ySb] is greater than 0, and sbWidth and sbHeight are both equal to 4, the luma interpolation filter coefficients $f_L[p]$ are specified in Table 1C.
- Otherwise, the luma interpolation filter coefficients $f_L[p]$ are specified in Table 1B depending on hpelIfIdx.

The luma locations in full-sample units ($xInt_i$, $yInt_i$) are derived as follows for i=0 . . . 7:
- If subpic_treated_aspic_flag[SubPicIdx] is equal to 1, the following applies:

$xInt_i$=Clip3(SubPicLeftBoundaryPos,SubPicRightBoundaryPos,$xInt_L$+i−3)

$yInt_i$=Clip3(SubPicTopBoundaryPos,SubPicBotBoundaryPos,$yInt_L$+i−3)

- Otherwise (subpic_treatedas_pic_flag[SubPicIdx] is equal to 0), the following applies:

$xInt_i$=Clip3(0,picW−1,sps_ref_wraparound_enabled_flag?

Clip$H$((sps_ref_wraparound_offset_minus1+1)*MinCbSize$Y$,pic$W$,$xInt_L$+i−3):

$xInt_L$+i−3)

$yInt_i$=Clip3(0,picH−1,$yInt_L$+i−3)

The luma locations in full-sample units are further modified as follows for i=0 . . . 7:

$xInt_i$=Clip3($xSbInt_L$−3,$xSbInt_L$+sbWidth+4,$xInt_i$)

$yInt_i$=Clip3($ySbInt_L$−3,$ySbInt_L$+sbHeight+4,$yInt_i$)

The predicted luma sample value $predSampleLX_L$ is derived as follows:
- If both $xFrac_L$ and $yFrac_L$ are equal to 0, the value of $predSampleLX_L$ is derived as follows:

$predSampleLX_L$=$refPicLX_L$[$xInt_3$][$yInt_3$]<<shift3

- Otherwise, if $xFrac_L$ is not equal to 0 and $yFrac_L$ is equal to 0, the value of $predSampleLX_L$ is derived as follows:

$predSampleLX_L$=($\Sigma_{i=0}^{7} f_L[xFrac_L][i]$*$refPicLX_L$[$xInt_i$][$yInt_3$])>>shift1

- Otherwise, if $xFrac_L$ is equal to 0 and $yFrac_L$ is not equal to 0, the value of $predSampleLX_L$ is derived as follows:

$predSampleLX_L$=($\Sigma_{i=0}^{7} f_L[yFrac_L][i]$*$refPicLX_L$[$xInt_3$][$yInt_3$])>>shift1

- Otherwise, if $xFrac_L$ is not equal to 0 and $yFrac_L$ is not equal to 0, the value of $predSampleLX_L$ is derived as follows:
  - The sample array temp[n] with n=0 . . . 7, is derived as follows:

temp[$n$]=($\Sigma_{i=0}^{7} f_L[xFrac_L][i]$*$refPicLX_L$[$xInt_i$][$yInt_n$])>>shift1

- The predicted luma sample value $predSampleLX_L$ is derived as follows:

$predSampleLX_L$=($\Sigma_{i=0}^{7} f_L[yFrac_L][i]$*temp[$i$])>>shift2

TABLE 1B

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 (hpelIfIdx == 0) | −1 | 4 | −11 | 40 | 40 | −11 | 4 | −1 |
| 8 (hpelIfIdx == 1) | 0 | 3 | 9 | 20 | 20 | 9 | 3 | 0 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

TABLE 1C

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | 0 | 1 | −3 | 63 | 4 | −2 | 1 | 0 |
| 2 | 0 | 1 | −5 | 62 | 8 | −3 | 1 | 0 |
| 3 | 0 | 2 | −8 | 60 | 13 | −4 | 1 | 0 |
| 4 | 0 | 3 | −10 | 58 | 17 | −5 | 1 | 0 |
| 5 | 0 | 3 | −11 | 52 | 26 | −8 | 2 | 0 |
| 6 | 0 | 2 | −9 | 47 | 31 | −10 | 3 | 0 |
| 7 | 0 | 3 | −11 | 45 | 34 | −10 | 3 | 0 |
| 8 | 0 | 3 | −11 | 40 | 40 | −11 | 3 | 0 |
| 9 | 0 | 3 | −10 | 34 | 45 | −11 | 3 | 0 |
| 10 | 0 | 3 | −10 | 31 | 47 | −9 | 2 | 0 |
| 11 | 0 | 2 | −8 | 26 | 52 | −11 | 3 | 0 |
| 12 | 0 | 1 | −5 | 17 | 58 | −10 | 3 | 0 |
| 13 | 0 | 1 | −4 | 13 | 60 | −8 | 2 | 0 |
| 14 | 0 | 1 | −3 | 8 | 62 | −5 | 1 | 0 |
| 15 | 0 | 1 | −2 | 4 | 63 | −3 | 1 | 0 |

Luma Integer Sample Fetching Process
Inputs to this process are:
 a luma location in full-sample units ($xInt_L$, $yInt_L$),
 the luma reference sample array $refPicLX_L$,
Output of this process is a predicted luma sample value $predSampleLX_L$
The variable shift is set equal to Max(2, 14−$BitDepth_Y$).
The variable picW is set equal to pic_width_inluma_samples and the variable picH is set equal to pic_height_in_luma_samples.
The luma locations in full-sample units (xInt, yInt) are derived as follows:

xInt=Clip3(0,picW−1,sps_ref_wraparound_enabled_flag?

ClipH((sps_ref_wraparound_offset_minus1+1)
  *MinCbSizeY,picW,$xInt_L$):

$xInt_L$)

yInt=Clip3(0,picH−1,$yInt_L$)

The predicted luma sample value $predSampleLX_L$ is derived as follows:

$predSampleLX_L$=$refPicLX_L$[xInt][yInt]<<shift3

Chroma Sample Interpolation Process
Inputs to this process are:
 a chroma location in full-sample units ($xInt_C$, $yInt_C$),
 a chroma location in 1/32 fractional-sample units ($xFrac_C$, $yFrac_C$),
 a chroma location in full-sample units (xSbIntC, ySbIntC) specifying the top-left sample of the bounding block for reference sample padding relative to the top-left chroma sample of the reference picture,
 a variable sbWidth specifying the width of the current subblock,
 a variable sbHeight specifying the height of the current subblock,
 the chroma reference sample array $refPicLX_C$.
Output of this process is a predicted chroma sample value $predSampleLX_C$
The variables shift1, shift2 and shift3 are derived as follows:
 The variable shift1 is set equal to Min(4, $BitDepth_C$−8), the variable shift2 is set equal to 6 and the variable shift3 is set equal to Max(2, 14−$BitDepth_C$).

The variable $picW_C$ is set equal to pic_width_in_luma_samples/SubWidthC and the variable $picH_C$ is set equal to pic_height_in_luma_samples/SubHeightC.
The chroma interpolation filter coefficients $f_C[p]$ for each 1/32 fractional sample position p equal to $xFrac_C$ or $yFrac_C$ are specified in Table 2B.

The variable xOffset is set equal to (sps_ref_wraparound_offset_minus1+1)*MinCbSizeY)/SubWidthC.

The chroma locations in full-sample units ($xInt_i$, $yInt_i$) are derived as follows for i=0 . . . 3:
 If subpic_treated_as_pic_flag[SubPicIdx] is equal to 1, the following applies:

$xInt_i$=Clip3(SubPicLeftBoundaryPos/SubWidthC,
  SubPicRightBoundarypos/SubWidth C,$xInt_L$+i)

$yInt_i$=Clip3(SubPicTopBoundaryPos/SubHeightC,
  SubPicBotBoundaryPos/SubHeightC, $yInt_L$+i)

Otherwise (subpic_treated_as_pic_flag[SubPicIdx] is equal to 0), the following applies:

$xInt_i$=Clip3(0,$picW_C$−1, sps_ref_wraparound_enabled_flag?ClipH(xOffset,
  $picW_C$,$xInt_C$+i−1):

$xInt_C$+i−1)

$yInt_i$=Clip3(0,$picH_C$−1,$yInt_C$+i−1)

The chroma locations in full-sample units ($xInt_i$, $yInt_i$) are further modified as follows for i=0 . . . 3:

$xInt_i$=Clip3(xSbIntC−1,xSbIntC+sbWidth+2,$xInt_i$)

$yInt_i$=Clip3(ySbIntC−1,ySbIntC+sbHeight+2,$yInt_i$)

The predicted chroma sample value $predSampleLX_C$ is derived as follows:
 If both $xFrac_C$ and $yFrac_C$ are equal to 0, the value of $predSampleLX_C$ is derived as follows:

$predSampleLX_C$=$refPicLX_C$[$xInt_i$][$yInt_i$]<<shift3

Otherwise, if xFrac$_C$ is not equal to 0 and yFrac$_C$ is equal to 0, the value of predSampleLX$_C$ is derived as follows:

predSampleLX$_C$=($\Sigma_{i=0}^3 f_C$[xFrac$_C$][i]*refPicLX$_C$ [xInt$_i$][yInt$_1$])>>shift1

Otherwise, if xFrac$_C$ is equal to 0 and yFrac$_C$ is not equal to 0, the value of predSampleLX$_C$ is derived as follows:

predSampleLX$_C$=($\Sigma_{i=0}^3 f_C$[yFrac$_C$][i]*refPicLX$_C$ [xInt$_1$][yInt$_i$])>>shift1

Otherwise, if xFrac$_C$ is not equal to 0 and yFrac$_C$ is not equal to 0, the value of predSampleLX$_C$ is derived as follows:
The sample array temp[n] with n=0 . . . 3, is derived as follows:

temp[n]($\Sigma_{i=0}^3 f_C$[xFrac$_C$][i]*refPicLX$_C$[xInt$_i$][yInt$_n$]) >>shift1

The predicted chroma sample value predSampleLX$_C$ is derived as follows:

predSampleLX$_C$=(f$_C$[yFrac$_C$][0]*temp[0]+ f$_C$[yFrac$_C$][1]*temp[1]+ f$_C$[yFrac$_C$][2]*temp[2]+ f$_C$[yFrac$_C$][3]*temp[3])>>shift2

TABLE 2B

| Fractional sample position p | interpolation filter coefficients | | | |
|---|---|---|---|---|
| | f$_C$[ p ][ 0 ] | f$_C$[ p ][ 1 ] | f$_C$[ p ][ 2 ] | f$_C$[ p ][ 3 ] |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

It should be noted that according to the fractional sample interpolation process provided in JVET-O2001, there are two inter prediction modes that uses 6-tap filters for the interpolation filtering. That is, Table 1C is a 6-tap filter that is used for affine motion (i.e., MotionModelIdc[xSb][ySb] greater than 0, and sbWidth and sbHeight both equal to 4, corresponds to affine motion) and a 6-tap filter is derived from Table 1B for half-pel Adaptive Motion Vector Resolution (AMVR) (i.e., hpelIfIdx==1 corresponds to half-pel AVMR, i.e., p=0, 8).

It should be noted that although the fractional sample interpolation process for JVET-N1001 and JVET-O2001 vary, (e.g., based on inclusion of 6-tap filters in JVET-O2001) both processes are similar in that luma interpolation filter coefficients f$_L$[p] and chroma interpolation filter coefficients f$_C$[p] are specified. As provided in detail below, according to the techniques herein, different sets of interpolation filter coefficients may be conditionally used, e.g., depending on a scaling factor. Thus, the techniques described herein may be generally applicable to fractional sample interpolation processes. That is, for example, luma interpolation filter coefficients f$_L$[p] and/or chroma interpolation filter coefficients f$_C$[p] may be conditionally determined (e.g., based on a scaling factor) in a manner that is independent of other aspects of a fractional sample interpolation process. In general, according to the techniques herein, typical use case interpolation filter coefficients that may result in severe aliasing artifacts when scaling occurs, may be replaced with to filters with low-pass characteristics in order to reduce aliasing artifacts. Such filters with low-pass characteristics can, for example, be Lanczos filters generated with the Lanczos window selected to provide the desired low-pass filtering effect. Accordingly, in some cases, the filters described in Tables 1A-2B above may be referred to as typical case filters.

As further described above, video content includes video sequences comprised of a series of frames (or pictures) and each video frame or picture may be divided into one or more regions. A coded video sequence (CVS) may be encapsulated (or structured) as a sequence of access units, where each access unit includes video data structured as network abstraction layer (NAL) units. A bitstream may be described as including a sequence of NAL units forming one or more CVSs. It should be noted that multi-layer extensions enable a video presentation to include a base layer and one or more additional enhancement layers. For example, a base layer may enable a video presentation having a basic level of quality (e.g., a High Definition rendering and/or a 30 Hz frame rate) to be presented and an enhancement layer may enable a video presentation having an enhanced level of quality (e.g., an Ultra High Definition rendering and/or a 60 Hz frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. Each NAL unit may include an identifier indicating a layer of video data the NAL unit is associated with. It should be noted that sub-bitstream extraction may refer to a process where a device receiving a compliant or conforming bitstream forms a new compliant or conforming bitstream by discarding and/or modifying data in the received bitstream. For example, sub-bitstream extraction may be used to form a new compliant or conforming bitstream corresponding to a particular representation of video (e.g., a high quality representation). Layers may also be coded independent of each other. In this case, there may not be an inter-layer prediction between two layers.

Figure 4:
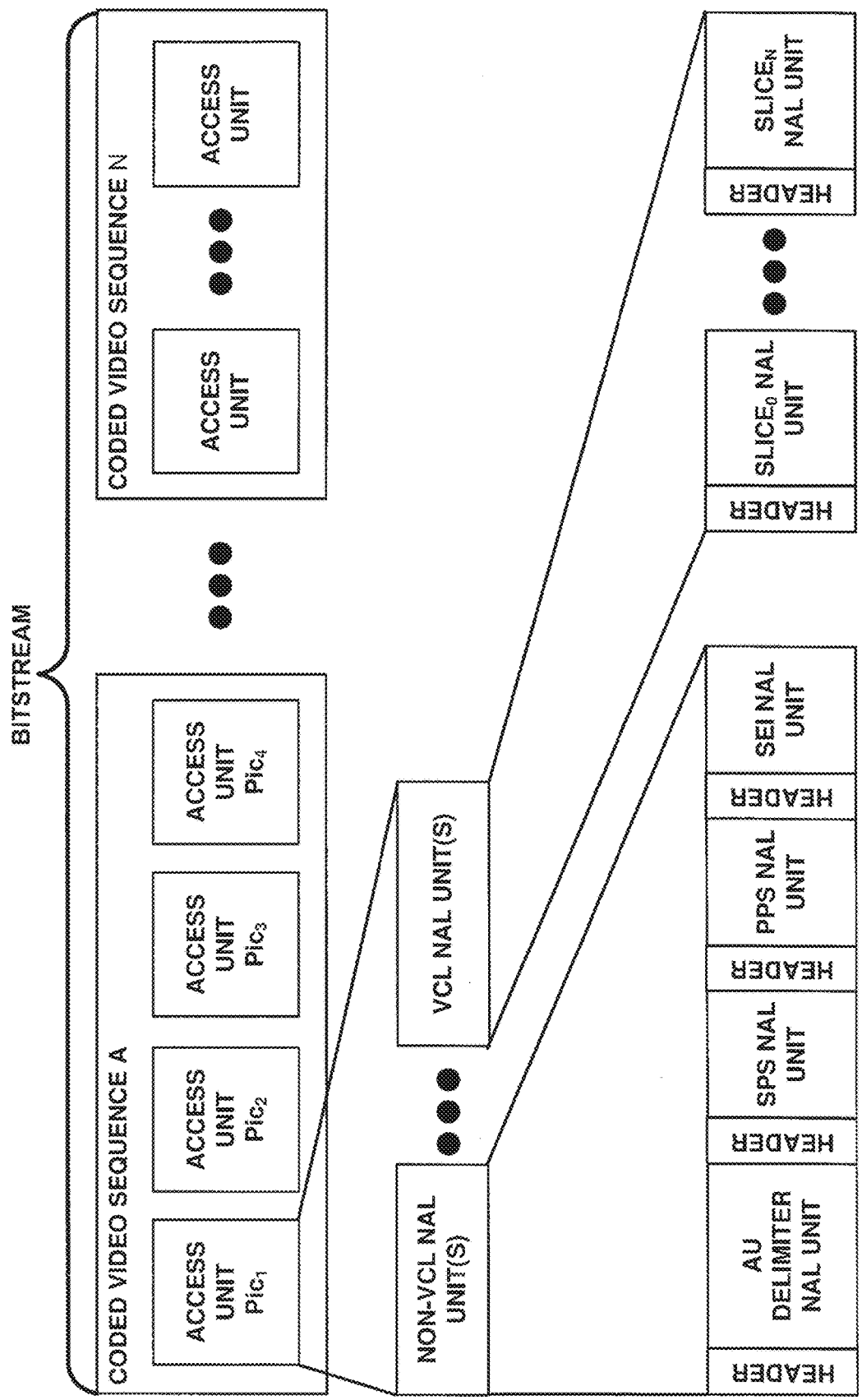
FIG. 4 is a conceptual diagram illustrating a data structure encapsulating coded video data and corresponding metadata according to one or more techniques of this disclosure.

Referring to the example illustrated in FIG. 1, each slice of video data included in Pic$_3$ (i.e., Slice$_0$ and Slice$_1$) is illustrated as being encapsulated in a NAL unit. In JVET-N1001 and JVET-O2001, each of a video sequence, a GOP, a picture, a slice, and CTU may be associated with metadata that describes video coding properties. JVET-N1001 and JVET-O2001 define parameters sets that may be used to describe video data and/or video coding properties. In particular, JVET-N1001 and JVET-O2001 include the following five types of parameter sets: decoding parameter set (DPS), video parameter set (VPS), sequence parameter set (SPS), picture parameter set (PPS), and adaption parameter set (APS). In JVET-N1001 and JVET-O2001, parameter sets may be encapsulated as a special type of NAL unit or may be signaled as a message. NAL units including coded video data (e.g., a slice) may be referred to as VCL (Video Coding Layer) NAL units and NAL units including metadata (e.g., parameter sets) may be referred to as non-VCL NAL units. Further, JVET-N1001 and JVET-O2001 enables supplemental enhancement information (SEI) messages to be signaled. In JVET-N1001 and JVET-O2001, SEI messages assist in processes related to decoding, display or other purposes, however, SEI messages may not be required for constructing the luma or chroma samples by the decoding process. In JVET-N1001 and JVET-O2001, SEI messages may be signaled in a bitstream using non-VCL NAL units. Further, SEI messages may be conveyed by some means other than by being present in the bitstream (i.e., signaled out-of-band). FIG. 4 illustrates an example of a bitstream including multiple CVSs, where a CVS is represented by NAL units included in a respective access unit. In the example illustrated in FIG. 4, non-VCL NAL units include respective parameter set NAL units (i.e., Sequence Parameter Sets (SPS), and Picture Parameter Set (PPS) NAL units), an SEI message NAL unit, and an access unit delimiter NAL unit. It should be noted that in FIG. 4, HEADER is a NAL unit header.

As described above, a video block may be defined as an array of sample values having a video sampling format. The total number of samples, specified as a width times a height, comprising a picture may be referred to as the resolution of a picture (e.g., 1920×1080 luma samples). In JVET-N1001 and JVET-O2001, the resolution and video sampling format of each picture included in a coded video sequence is specified in a corresponding sequence parameter set (SPS). Table 3 illustrates the sequence parameter set syntax provided in JVET-N1001.

TABLE 3

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gra_enabled_flag | u(1) |
|   sps_seq_parameter_set_id | ue(v) |
|   chroma_format_idc | ue(v) |
|   if( chroma_format_idc == 3 ) | |
|     separate_colour_plane_flag | u(1) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   bit_depth_luma_minus8 | ue(v) |
|   bit_depth_chroma_minus8 | ue(v) |
|   log2_max_pic_order_cnt_lsb_minus4 | ue(v) |
|   sps_sub_layer_ordering_info_present_flag | u(1) |
|   for( i = ( sps_sub_layer_ordering_info_present_flag ? 0 : sps_max_sub_layers_minus1 ); | |
|     i <= sps_max_sub_layers_minus1; i++ ) { | |
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
|   } | |
|   long_term_ref_pics_flag | u(1) |
|   sps_idr_rpl_present_flag | u(1) |
|   rpl1_same_as_rpl0_flag | u(1) |
|   for( i = 0; i < !rpl1_same_as_rpl0_flag ? 2 : 1; i++ ) { | |
|     num_ref_pic_lists_in_sps[ i ] | ue(v) |
|     for(j = 0; j < num_ref_pic_lists_in_sps[ i ]; j++) | |
|       ref_pic_list_struct( i, j ) | |
|   } | |
|   qtbtt_dual_tree_intra_flag | u(1) |
|   log2_ctu_size_minus2 | ue(v) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_log2_diff_min_qt_min_cb_inter_slice | ue(v) |
|   sps_max_mtt_hierarchy_depth_inter_slice | ue(v) |
|   sps_max_mtt_hierarchy_depth_intra_slice_luma | ue(v) |
|   if( sps_max_mtt_hierarchy_depth_intra_slice_luma != 0 ) { | |

TABLE 3-continued

| | Descriptor |
|---|---|
|    sps_log2_diff_max_bt_min_qt_intra_slice_luma | ue(v) |
|    sps_log2_diff_max_tt_min_qt_intra_slice_luma | ue(v) |
| } | |
| if( sps_max_mtt_hierarchy_depth_inter_slices != 0 ) { | |
|    sps_log2_diff_max_bt_min_qt_inter_slice | ue(v) |
|    sps_log2_diff_max_tt_min_qt_inter_slice | ue(v) |
| } | |
| if( qtbtt_dual_tree_intra_flag ) { | |
|    sps_log2_diff_min_qt_min_cb_intra_slice_chroma | ue(v) |
|    sps_max_mtt_hierarchy_depth_intra_slice_chroma | ue(v) |
|    if ( sps_max_mtt_hierarchy_depth_intra_slice_chroma != 0 ) { | |
|      sps_log2_diff_max_bt_min_qt_intra_slice_chroma | ue(v) |
|      sps_log2_diff_max_tt_min_qt_intra_slice_chroma | ue(v) |
|    } | |
| } | |
| sps_sao_enabled_flag | u(1) |
| sps_alf_enabled_flag | u(1) |
| sps_pcm_enabled_flag | u(1) |
| if( sps_pcm_enabled_flag ) { | |
|    pcm_sample_bit_depth_luma_minus1 | u(4) |
|    pcm_sample_bit_depth_chroma_minus1 | u(4) |
|    log2_min_pcm_luma_coding_block_size_minus3 | ue(v) |
|    log2_diff_max_min_pcm_luma_coding_block_size | ue(v) |
|    pcm_loop_filter_disabled_flag | u(1) |
| } | |
| if( ( CtbSizeY / MinCbSizeY +1) <= ( pic_width_in_luma_samples / MinCbSizeY − 1 ) ) { | |
|    sps_ref_wraparound_enabled_flag | u(1) |
|    if( sps_ref_wraparound_enabled_flag ) | |
|      sps_ref_wraparound_offset_minus1 | ue(v) |
| } | |
| sps_temporal_mvp_enabled_flag | u(1) |
| if( sps_temporal_mvp_enabled_flag ) | |
|    sps_sbtmvp_enabled_flag | u(1) |
| sps_amvr_enabled_flag | u(1) |
| sps_bdof_enabled_flag | u(1) |
| sps_smvd_enabled_flag | u(1) |
| sps_affine_amvr_enabled_flag | u(1) |
| sps_dmvr_enabled_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| sps_cclm_enabled_flag | u(1) |
| if( sps_cclm_enabled_flag && chroma_format_idc == 1 ) | |
|    sps_cclm_colocated_chroma_flag | u(1) |
| sps_mts_enabled_flag | u(1) |
| if( sps_mts_enabled_flag ) { | |
|    sps_explicit_mts_intra_enabled_flag | u(1) |
|    sps_explicit_mts_inter_enabled_flag | u(1) |
| } | |
| sps_sbt_enabled_flag | u(1) |
| if( sps_sbt_enabled_flag ) | |
|    sps_sbt_max_size_64_flag | u(1) |
| sps_affine_enabled_flag | u(1) |
| if( sps_affine_enabled_flag ) | |
|    sps_affine_type_flag | u(1) |
| sps_bcw_enabled_flag | u(1) |
| sps_ibc_enabled_flag | u(1) |
| sps_ciip_enabled_flag | u(1) |
| if( sps_mmvd_enabled_flag ) | |
|    sps_fpel_mmvd_enabled_flag | u(1) |
| sps_triangle_enabled_flag | u(1) |
| sps_lmcs_enabled_flag | u(1) |
| sps_lfnst_enabled_flag | u(1) |
| sps_ladf_enabled_flag | u(1) |
| if ( sps_ladf_enabled_flag ) { | |
|    sps_num_ladf_intervals_minus2 | u(2) |
|    sps_ladf_lowest_interval_qp_offset | se(v) |
|    for( i = 0; i < sps_num_ladf_intervals_minus2 + 1; i++ ) { | |
|      sps_ladf_qp_offset[ i ] | se(v) |
|      sps_ladf_delta_threshold_minus1[ i ] | ue(v) |
|    } | |
| } | |
| timing_info_present_flag | u(1) |
| if( timing_info_present_flag ) { | |
|    num_units_in_tick | u(32) |
|    time_scale | u(32) |

TABLE 3-continued

| | Descriptor |
|---|---|
|    hrd_parameters_present_flag | u(1) |
|    if( hrd_parameters_present_flag ) | |
|       hrd_parameters( sps_max_sub_layers_minus1 ) | |
|    } | |
|    vui_parameters_present_flag | u(1) |
|    if( vui_parameters_present_flag ) | |
|       vui_parameters( ) | |
|    sps_extension_flag | u(1) |
|    if( sps_extension_flag ) | |
|       while( more_rbsp_data( ) ) | |
|          sps_extension_data_flag | u(1) |
|    rbsp_trailing_bits( ) | |
| } | |

With respect to Table 3, JVET-N1001 provides the following semantics:

sps_decoding_parameter_set_id, when greater than 0, specifies the value of dps_decoding_parameterset_id for the DPS referred to by the SPS. When sps_decoding_parameter_set_id is equal to 0, the SPS does not refer to a DPS and no DPS is active when decoding each CVS referring to the SPS.

sps_video_parameter_set_id, when greater than 0, specifies the value of vps_video_parameter_set_id for the VPS referred to by the SPS. When sps_video_parameter_set_id is equal to 0, the SPS does not refer to a VPS and no VPS is active when decoding each CVS referring to the SPS.

sps_max_sub_layers_minus1 plus 1 specifies the maximum number of temporal sub-layers that may be present in each CVS referring to the SPS. The value of sps_max_sub_layers_minus1 shall be in the range of 0 to 6, inclusive.

sps_reserved_zero_5bits shall be equal to 0 in bitstreams conforming to this version of this Specification. Other values for sps_reserved_zero_5bits are reserved for future use by ITU-T ISO/IEC.

gra_enabled_flag equal to 1 specifies that GRA pictures may be present in CVSs referring to the SPS. gra_enabled_flag equal to 0 specifies that GRA pictures are not present in CVSs referring to the SPS.

sps_seq_parameter_set_id provides an identifier for the SPS for reference by other syntax elements. The value of sps_seq_parameter_set_id shall be in the range of 0 to 15, inclusive.

chroma_format_idc specifies the chroma sampling relative to the luma sampling as specified. The value of chroma_format_idc shall be in the range of 0 to 3, inclusive.

separate_colour_plane_flag equal to 1 specifies that the three colour components of the 4:4:4 chroma format are coded separately. separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value.

NOTE—There is no dependency in decoding processes between the colour planes having different colour_plane_id values. For example, the decoding process of a monochrome picture with one value of colour_plane_id does not use any data from monochrome pictures having different values of colour_plane_id for inter prediction.

Depending on the value of separate_colour_plane_flag, the value of the variable ChromaArrayType is assigned as follows:

If separate_colour_plane_flag is equal to 0, ChromaArrayType is set equal to chroma_format_idc.

Otherwise (separate_colour_plane_flag is equal to 1), ChromaArrayType is set equal to 0.

pic_width_in_luma_samples specifies the width of each decoded picture in units of luma samples. pic_width_in_luma_samples shall not be equal to 0 and shall be an integer multiple of MinCbSizeY.

pic_height_in_luma_samples specifies the height of each decoded picture in units of luma samples. pic_height_in_luma_samples shall not be equal to 0 and shall be an integer multiple of MinCbSizeY.

conformance_window_flag equal to 1 indicates that the conformance cropping window offset parameters follow next in the SPS. conformance_window flag equal to 0 indicates that the conformance cropping window offset parameters are not present.

conf_win_left_offset, conf_win_right_offset, conf_win_top_offset, and conf_win_bottom_offset specify the samples of the pictures in the CVS that are output from the decoding process, in terms of a rectangular region specified in picture coordinates for output. When conformance_window_flag is equal to 0, the values of conf_win_left_offset, conf_win_right_offset, conf_win_top_offset, and conf_win_bottom_offset are inferred to be equal to 0.

The conformance cropping window contains the luma samples with horizontal picture coordinates from SubWidthC*conf_win_left_offset to pic_width_in_luma_samples−(SubWidthC*conf_win_right_offset+1) and vertical picture coordinates from SubHeightC*conf_win_top_offset to pic_height_in_luma_samples−(SubHeightC*conf_win_bottom_offset+1), inclusive.

The value of SubWidthC*(conf_win_left_offset+conf_win_right_offset) shall be less than pic_width_in_luma_samples, and the value of SubHeightC*(conf_win_top_offset+conf_win_bottom_offset) shall be less than pic_height_in_luma_samples.

When ChromaArrayType is not equal to 0, the corresponding specified samples of the two chroma arrays are the samples having picture coordinates (x/SubWidthc, y/SubHeightC), where (x, y) are the picture coordinates of the specified luma samples.

NOTE—The conformance cropping window offset parameters are only applied at the output. All internal decoding processes are applied to the uncropped picture size.

bit_depth_luma_minus8 specifies the bit depth of the samples of the luma array $BitDepth_Y$ and the value of the luma quantization parameter range offset $QpBdOffset_Y$ as follows:

$BitDepth_Y = 8 + bit\_depth\_luma\_minus8$ $QpBdOffset_Y = 6*bit\_depth\_luma\_minus8$ bit_depth_luma_minus8 shall be in the range of 0 to 8, inclusive.

bit_depth_chroma_minus8 specifies the bit depth of the samples of the chroma arrays $BitDepth_C$ and the value of the chroma quantization parameter range offset $QpBdOffset_C$ as follows:

$BitDepth_C = 8 + bit\_depth\_chroma\_minus8$ $QpBdOffset_C = 6*bit\_depth\_chroma\_minus8$ bit_depth_chroma_minus8 shall be in the range of 0 to 8, inclusive.

log 2_max_pic_order_cnt_lsb_minus4 specifies the value of the variable MaxPicOrderCntLsb that is used in the decoding process for picture order count as follows:

$MaxPicOrderCntLsb = 2^{(log\ 2\_max\_pic\_order\_cnt\_lsb\_minus4+4)}$

The value of log 2_max_pic_order_cnt_lsb_minus4 shall be in the range of 0 to 12, inclusive.

sps_sub_layer_ordering_info_present_flag equal to 1 specifies that sps_max_dec_pic_buffering_minus1[i], sps_max_numreorder_pics[i], and sps_max_latency increase_plus1[i] are present for sps_max_sub_layers_minus1+1 sub-layers. sps_sub_layer_ordering_info_present_flag equal to 0 specifies that the values of sps_max_dec_pic_buffering_minus1[sps_max_sub_layers_minus1], sps_max_num-reorder_pics[sps_max_sub_layers_minus1], and sps_max_latencyincrease_plus1[sps_max_sub_layers_minus1] apply to all sub-layers.

sps_max_dec_pic_buffering_minus1[i] plus 1 specifies the maximum required size of the decoded picture buffer for the CVS in units of picture storage buffers when HighestTid is equal to i. The value of sps_max_dec_pic_buffering_minus1[i] shall be in the range of 0 to MaxDpbSize−1, inclusive, where MaxDpbSize is as specified somewhere else. When i is greater than 0, sps_max_dec_pic_buffering_minus1[i] shall be greater than or equal to sps_max_dec_pic_buffering_minus1[i−1]. When sps_max_dec_pic_buffering_minus1[i] is not present for i in the range of 0 to sps_max_sub_layers_minus1−1, inclusive, due to sps_sub_layer_ordering_info_present_flag being equal to 0, it is inferred to be equal to sps_max_dec_pic_buffering_minus1 [sps_max_sub_layers_minus1].

sps_max_num_reorder_pics[i] indicates the maximum allowed number of pictures that can precede any picture in the CVS in decoding order and follow that picture in output order when HighestTid is equal to i. The value of sps_max_num_reorderpics[i] shall be in the range of 0 to sps_max_decpic_buffering_minus1[i], inclusive. When i is greater than 0, sps_max_num_reorderpics[i] shall be greater than or equal to sps_max_numreorderpics[i−1]. When sps_max_numreorderpics[i] is not present for i in the range of 0 to sps_max_sub_layers_minus1−1, inclusive, due to sps_sub_layer_ordering_info_present_flag being equal to 0, it is inferred to be equal to sps_max_num_reorder_pics[sps_max_sub_layers_minus1].

sps_max_latency_increase_plus1[i] not equal to 0 is used to compute the value of SpsMaxLatencyPictures[i], which specifies the maximum number of pictures that can precede any picture in the CVS in output order and follow that picture in decoding order when HighestTid is equal to i.

When sps_max_latency_increase_plus1 [i] is not equal to 0, the value of SpsMaxLatencyPictures[i] is specified as follows:

$SpsMaxLatencyPictures[i] =$
$sps\_max\_num\_reorder\_pics[i] + sps\_max\_latency\_increase\_plus1[i] - 1$ When sps_max_latency_increase_plus1[i] is equal to 0, no corresponding limit is expressed.

The value of sps_max_latency_increase_plus1[i] shall be in the range of 0 to $2^{32}-2$, inclusive. When sps_max_latency_increase_plus1[i] is not present for i in the range of 0 to sps_max_sub_layers_minus1−1, inclusive, due to sps_sub_layer_ordering_info_present_flag being equal to 0, it is inferred to be equal to sps_max_latency_increase_plus1[sps_max_sub_layers_minus1].

long_term_ref_pics_flag equal to 0 specifies that no LTRP is used for inter prediction of any coded picture in the CVS. long_term_ref_pics_flag equal to 1 specifies that LTRPs may be used for inter prediction of one or more coded pictures in the CVS.

sps_idr_rpl_present_flag equal to 1 specifies that reference picture list syntax elements are present in slice headers of IDR pictures. sps_idr_rpl_present_flag equal to 0 specifies that reference picture list syntax elements are not present in slice headers of IDR pictures.

rpl1_same_as_rpl0_flag equal to 1 specifies that the syntax structures num_ref_pic_lists_in_sps[1] and ref_pic_list_struct(1, rplsIdx) are not present and the following applies:

The value of num_ref_pic_lists_in_sps[1] is inferred to be equal to the value of num_ref_pic_lists_in_sps[0].

The value of each of syntax elements in ref_pic_list_struct(1, rplsIdx) is inferred to be equal to the value of corresponding syntax element in ref_pic_list_struct(0, rplsIdx) for rplsIdx ranging from 0 to numref_pic_lists_insps[0]−1.

num_ref_pic_lists_in_sps[i] specifies the number of the ref_pic_list_struct(listIdx, rplsIdx) syntax structures with listIdx equal to i included in the SPS. The value of num_ref_pic_lists_in_sps[i] shall be in the range of 0 to 64, inclusive.

NOTE—For each value of listIdx (equal to 0 or 1), a decoder should allocate memory for a total number of num_ref_pic_lists_in_sps[i]+1 ref_pic_list_struct(listIdx, rplsIdx) syntax structures since there may be one ref_pic_list_struct (listIdx, rplsIdx) syntax structure directly signalled in the slice headers of a current picture.

qtbtt_dual_tree_intra_flag equal to 1 specifies that for I slices, each CTU is split into coding units with 64×64 luma samples using an implicit quadtree split and that these coding units are the root of two separate coding_tree syntax structure for luma and chroma.

log 2_ctu_size_minus2 plus 2 specifies the luma coding tree block size of each CTU.

log 2_min_luma_coding_block_size_minus2 plus 2 specifies the minimum luma coding block size.

The variables CtbLog2SizeY, CtbSizeY, MinCbLog2SizeY, MinCbSizeY, MinTbLog 2SizeY, MaxTbLog 2SizeY, MinTbSizeY, MaxTbSizeY, PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

$Ctb \text{ Log } 2SizeY = \log 2\_ctu\_size\_minus2 + 2$ $CtbSizeY = 1 << Ctb \text{ Log } 2SizeY$ $MinCb \text{ Log } 2SizeY = \log 2\_min\_luma\_coding\_block\_size\_minus2 + 2$ $MinCbSizeY = 1 << MinCb \text{ Log } 2SizeY$ $MinTb \text{ Log } 2SizeY = 2$ $MaxTb \text{ Log } 2SizeY = 6$ $MinTbSizeY = 1 << MinTb \text{ Log } 2SizeY$ $MaxTbSizeY = 1 << MaxTb \text{ Log } 2SizeY$ $PicWidthInCtbsY = \text{Ceil}(pic\_width\_in\_luma\_samples \div CtbSizeY)$ $PicHeightInCtbsY = \text{Ceil}(pic\_height\_in\_luma\_samples \div CtbSizeY)$ $PicSizeInCtbsY = PicWidthInCtbsY * PicHeightInCtbsY$ $PicWidthInMinCbsY = pic\_width\_in\_luma\_samples / MinCbSizeY$ $PicHeightInMinCbsY = pic\_height\_in\_luma\_samples / MinCbSizeY$ $PicSizeInMinCbsY = PicWidthInMinCbsY * PicHeightInMinCbsY$ $PicSizeInSamplesY = pic\_width\_in\_luma\_samples * pic\_height\_in\_luma\_samples$ $PicWidthInSamplesC = pic\_width\_in\_luma\_samples / SubWidthC$ $PicHeightInSamplesC = pic\_height\_in\_luma\_samples / SubHeightC$ The variables CtbWidthC and CtbHeightC, which specify the width and height, respectively, of the array for each chroma CTB, are derived as follows:
  If chroma_format_idc is equal to 0 (monochrome) or separate_colour_plane_flag is equal to 1, CtbWidthC and CtbHeightC are both equal to 0.
  Otherwise, CtbWidthC and CtbHeightC are derived as follows:

$CtbWidthC = CtbSizeY / SubWidthC$ $CtbHeightC = CtbSizeY / SubHeightC$

For log 2BlockWidth ranging from 0 to 4 and for log 2BlockHeight ranging from 0 to 4, inclusive, the up-right diagonal scan order array initialization process as specified is invoked with 1<<log 2BlockWidth and 1<<log 2BlockHeight as inputs, and the output is assigned to DiagScanOrder[log 2BlockWidth][log 2BlockHeight].

partition_constraints_override_enabled_flag equal to 1 specifies the presence of partition_constraints_override_flag in the slice headers for slices referring to the SPS. partition_constraints_override_enabled_flag equal to 0 specifies the absence of partition_constraints_override_flag in the slice headers for slices referring to the SPS.

sps_log 2_diff_min_qt_min_cb_intra_slice_luma specifies the default difference between the base 2 logarithm of the minimum size in luma samples of a luma leaf block resulting from quadtree splitting of a CTU and the base 2 logarithm of the minimum coding block size in luma samples for luma CUs in slices with slice type equal to 2 (I) referring to the SPS. When partition_constraints_override_flag is equal to 1, the default difference can be overridden by slice_log 2_diff_min_qt_min_cb_luma present in the slice header of the slices referring to the SPS. The value of sps_log 2_diff_minqt_min_cb_intra_slice_luma shall be in the range of 0 to CtbLog2SizeY−MinCbLog2SizeY, inclusive. The base 2 logarithm of the minimum size in luma samples of a luma leaf block resulting from quadtree splitting of a CTU is derived as follows:

$MinQt \text{ Log } 2SizeIntraY = sps\_log\ 2\_diff\_min\_qt\_min\_cb\_intraslice\_luma + MinCb \text{ Log } 2SizeY$ sps_log 2_diff_min_qt_min_cb_inter_slice specifies the default difference between the base 2 logarithm of the minimum size in luma samples of a luma leaf block resulting from quadtree splitting of a CTU and the base 2 logarithm of the minimum luma coding block size in luma samples for luma CUs in slices with slice_type equal to 0 (B) or 1 (P) referring to the SPS. When partition_constraints_override_flag is equal to 1, the default difference can be overridden by slice log 2_diff_min_qt_min_cb_luma present in the slice header of the slices referring to the SPS. The value of sps_log 2_diff_min_qt_min_cb_inter_slice shall be in the range of 0 to CtbLog2SizeY−MinCbLog2SizeY, inclusive. The base 2 logarithm of the minimum size in luma samples of a luma leaf block resulting from quadtree splitting of a CTU is derived as follows:

$MinQt \text{ Log } 2SizeInterY = sps\_log\ 2\_diff\_min\_qt\_min\_cb\_inter\_slice + Min_{Cb} \text{ Log } 2Size_Y$ sps_max_mtt_hierarchy_depth_inter_slice specifies the default maximum hierarchy depth for coding units resulting from multi-type tree splitting of a quadtree leaf in slices with slice_type equal to 0 (B) or 1 (P) referring to the SPS. When partition_constraints_override_flag is equal to 1, the default maximum hierarchy depth can be overridden by slice_max_mtt_hierarchy_depth_luma present in the slice header of the slices referring to the SPS. The value of sps_max_mtthierarchy_depth_inter_slice shall be in the range of 0 to CtbLog2SizeY−MinCbLog2SizeY, inclusive.

sps_max_mtt_hierarchy_depth_intra_slice_luma specifies the default maximum hierarchy depth for coding units resulting from multi-type tree splitting of a quadtree leaf in slices with slice_type equal to 2 (I) referring to the SPS. When partition_constraints_override_flag is equal to 1, the default maximum hierarchy depth can be overridden by slice_max_mtt hierarchy_depth_luma present in the slice header of the slices referring to the SPS. The value of sps_max_mtt_hierarchy_depth_intra_slice_luma shall be in the range of 0 to CtbLog2SizeY−MinCbLog2SizeY, inclusive.

sps_log 2_diff_max_bt_min_qt_intra_slice_luma specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice type equal to 2 (I)

referring to the SPS. When partition_constraints_override_flag is equal to 1, the default difference can be overridden by slice_log 2_diff_max_bt_min_qt_luma present in the slice header of the slices referring to the SPS. The value of sps_log 2_diff_max_bt_min_qt_intra_slice_luma shall be in the range of 0 to CtbLog2SizeY−MinQt Log 2 SizeIntraY, inclusive. When sps_log 2_diff_max_bt_min_qt_intra_slice_luma is not present, the value of sps_log 2_diff_max_bt_min_qt_intra_slice_luma is inferred to be equal to 0.

sps_log 2_diff_max_tt_min_qt_intra_slice_luma specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice type equal to 2 (I) referring to the SPS. When partition_constraints_override_flag is equal to 1, the default difference can be overridden by slice_log 2_diff_max_tt_min_qt_luma present in the slice header of the slices referring to the SPS. The value of sps_log 2_diff_max_tt_min_qt_intra_slice_luma shall be in the range of 0 to CtbLog2SizeY−MinQt Log 2SizeIntraY, inclusive. When sps_log 2_diff_max_tt_min_qt_intra_slice_luma is not present, the value of sps_log 2_diff_max_tt_min_qt_intra_slice_luma is inferred to be equal to 0.

sps_log 2_diff_max_bt_min_qt_inter_slice specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice type equal to 0 (B) or 1 (P) referring to the SPS. When partition_constraints_override_flag is equal to 1, the default difference can be overridden by slice_log 2_diff_max_bt_min_qt_luma present in the slice header of the slices referring to the SPS. The value of sps_log 2_diff_max_bt_min_qt_inter_slice shall be in the range of 0 to CtbLog2SizeY−MinQt Log 2SizeInterY, inclusive. When sps_log 2_diff_max_bt_min_qt_inter_slice is not present, the value of sps_log 2_diff_max_bt_min_qt_inter_slice is inferred to be equal to 0.

sps_log 2_diff_max_tt_min_qt_inter_slice specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) referring to the SPS. When partition_constraints_override_flag is equal to 1, the default difference can be overridden by slice_log 2_diff_max_tt_min_qt_luma present in the slice header of the slices referring to the SPS. The value of sps_log 2_diff_max_tt_min_qt_inter_slice shall be in the range of 0 to CtbLog2SizeY−MinQt Log 2SizeInterY, inclusive. When sps_log 2_diff_max_tt_min_qt_inter_slice is not present, the value of sps_log 2_diff_max_tt_min_qt_inter_slice is inferred to be equal to 0.

sps_log 2_diff min_qt_min_cb_intra_slice_chroma specifies the default difference between the base 2 logarithm of the minimum size in luma samples of a chroma leaf block resulting from quadtree splitting of a chroma CTU with treeType equal to DUALTREE_CHROMA and the base 2 logarithm of the minimum coding block size in luma samples for chroma CUs with treeType equal to DUAL_TREE_CHROMA in slices with slice_type equal to 2 (I) referring to the SPS. When partition_constraints_override_flag is equal to 1, the default difference can be overridden by slice log 2_diff min_qt_min_cb_chroma present in the slice header of the slices referring to the SPS. The value of sps_log 2_diff min_qt_min_cb_intra_slice_chroma shall be in the range of 0 to CtbLog2SizeY−MinCbLog2SizeY, inclusive. When not present, the value of sps_log 2_diff min_qt_min_cb_intra_slice_chroma is inferred to be equal to 0. The base 2 logarithm of the minimum size in luma samples of a chroma leaf block resulting from quadtree splitting of a CTU with treeType equal to DUALTREE_CHROMA is derived as follows:

MinQt Log 2SizeIntraC=sps_log 2_diff_min_qt_min_cb_intra_slice_chroma+MinCb Log 2SizeY sps_max_mtt_hierarchy_depth_intra_slice_chroma specifies the default maximum hierarchy depth for chroma coding units resulting from multi-type tree splitting of a chroma quadtree leaf with treeType equal to DUAL_TREE_CHROMA in slices with slice_type equal to 2 (I) referring to the SPS. When partition_constraints_override_flag is equal to 1, the default maximum hierarchy depth can be overridden by slice_max_mtt_hierarchy_depth_chroma present in the slice header of the slices referring to the SPS. The value of sps_max_mtt_hierarchy_depth_intra_slice_chroma shall be in the range of 0 to CtbLog2SizeY−MinCbLog2SizeY, inclusive. When not present, the value of sps_Max_mtt_hierarchy_depth_intra_slice_chroma is inferred to be equal to 0.

sps_log 2_diff_max_bt_min_qt_intra_slice_chroma specifies the default difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice_type equal to 2 (I) referring to the SPS. When partition_constraints_override_flag is equal to 1, the default difference can be overridden by slice_log 2_diff maxbt_min_qt_chroma present in the slice header of the slices referring to the SPS. The value of sps_log 2_diff_max_bt_min_qt_intra_slice_chroma shall be in the range of 0 to CtbLog2SizeY−MinQt Log 2SizeIntraC, inclusive. When sps_log 2_diff_max_bt_min_qt_intra_slice_chroma is not present, the value of sps_log 2_diff_max_bt_min_qt_intra_slice_chroma is inferred to be equal to 0.

sps_log 2_diff_max_qt_min_qt_intra_slice_chroma specifies the default difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice_type equal to 2 (I) referring to the SPS. When partition_constraints_overrideflag is equal to 1, the default difference can be overridden by slice_log 2_diff_max_tt_min_qt_chroma present in the slice header of the slices referring to the SPS. The value of sps_log 2_diff_max_tt_min_qt_intra_slice_chroma shall be in the range of 0 to CtbLog2SizeY−MinQt Log 2SizeIntraC, inclusive. When sps_log 2_diff_max_tt_min_qt_intra_slice_chroma is not present, the value of sps_log 2_diff_max_tt_min_qt_intra_slice_chroma is inferred to be equal to 0.

sps_sao_enabled_flag equal to 1 specifies that the sample adaptive offset process is applied to the reconstructed picture after the deblocking filter process. sps_sao_enabled_flag equal to 0 specifies that the sample adaptive offset process is not applied to the reconstructed picture after the deblocking filter process.

sps_alf_enabled_flag equal to 0 specifies that the adaptive loop filter is disabled. sps_alf enabled_flag equal to 1 specifies that the adaptive loop filter is enabled.

sps_pcm_enabled_flag equal to 0 specifies that PCM-related syntax (pcm_sample_bit_depth_luma_minus1, pcm_sample_bit_depth_chromaminus1, log 2_min_pcm_luma_coding_block_size_minus3, log 2_diff_max_min_pcm_luma_coding_block_size, pcm_loop_filter_disabled_flag, pcm_flag, pcm_alignment_zero_bit syntax elements and pcm_sample( ) syntax structure) is not present in the CVS.

NOTE—When MinCbLog2SizeY is equal to 6 and sps_pcm_enabled_flag is equal to 1, PCM sample data-related syntax (pcm_flag, pcm_alignment_zerobit syntax elements and pcm_sample( ) syntax structure) is not present in the CVS, because the maximum size of coding blocks that can convey PCM sample data-related syntax is restricted to be less than or equal to Min(CtbLog2SizeY, 5). Hence, MinCbLog2SizeY equal to 6 with sps_pcm_enabled_flag equal to 1 is not an appropriate setting to convey PCM sample data in the CVS.

pcm_sample_bit_depth_luma_minus1 specifies the number of bits used to represent each of PCM sample values of the luma component as follows:

$PcmBitDepth_Y=pcm\_sample\_bit\_depth\_luma\_minus1+1$

The value of $PcmBitDepth_Y$ shall be less than or equal to the value of $BitDepth_Y$.

pcm_sample_bit_depth_chroma_minust specifies the number of bits used to represent each of PCM sample values of the chroma components as follows:

$PcmBitDepth_C=pcm\_sample\_bit\_depth\_chroma\_minus1+1$

The value of $PcmBitDepth_C$ shall be less than or equal to the value of $BitDepth_C$. When ChromaArrayType is equal to 0, pcm_sample_bit_depth_chromaminus1 is not used in the decoding process and decoders shall ignore its value.

log 2_min_pcm_luma_coding_block_size_minus3 plus 3 specifies the minimum size of coding blocks with pcm_flag equal to 1.

The variable Log 2MinIpcmCbSizeY is set equal to log 2_min_pcm_luma_coding_block_size_minus3+3. The value of Log 2MinIpcmCbSizeY shall be in the range of Min(MinCbLog2SizeY, 5) to Min(CtbLog2SizeY, 5), inclusive.

log 2_diff_max_min_pcm_luma_coding_block_size specifies the difference between the maximum and minimum size of coding blocks with pcm_flag equal to 1.

The variable Log 2MaxIpcmCbSizeY is set equal to log 2_diff_max_min_pcm_luma_coding_block_size+ Log 2MinIpcmCbSizeY. The value of Log 2MaxIpcmCbSizeY shall be less than or equal to Min (CtbLog2SizeY, 5).

pcm_loop_filter_disabled_flag specifies whether the loop filter process is disabled on reconstructed samples in a coding unit with pcm_flag equal to 1 as follows:

If pcm_loop_filter_disabled_flag is equal to 1, the deblocking filter, sample adaptive offset filter, and adaptive loop filter processes on the reconstructed samples in a coding unit with pcm_flag equal to 1 are disabled.

Otherwise (pcm_loop_filter_disabled_flag value is equal to 0), the deblocking filter, sample adaptive offset filter, and adaptive loop filter processes on the reconstructed samples in a coding unit with pcm_flag equal to 1 are not disabled.

When pcm_loop_filter_disabledflag is not present, it is inferred to be equal to 0.

sps_ref_wraparound_enabled_flag equal to 1 specifies that horizontal wrap-around motion compensation is applied in inter prediction. sps_ref_wraparound_enabled_flag equal to 0 specifies that horizontal wrap-around motion compensation is not applied. When not present, the value of sps_ref_wraparound_enabled_flag is inferred to be equal to 0.

sps_ref_wraparound_offset_minus1 plus 1 specifies the offset used for computing the horizontal wrap-around position in units of MinCbSizeY luma samples. The value of ref_wraparound_offset_minus1 shall be in the range of (CtbSizeY/MinCbSizeY)+1 to (pic_width_in_luma_samples/MinCbSizeY)−1, inclusive.

sps_temporal_mvp_enabled_flag equal to 1 specifies that slice_temporal_mvp_enabled_flag is present in the slice headers of slices with slice type not equal to I in the CVS. sps_temporal_mvp_enabled_flag equal to 0 specifies that slice_temporal_mvp_enabled_flag is not present in slice headers and that temporal motion vector predictors are not used in the CVS.

sps_sbtmvp_enabled_flag equal to 1 specifies that subblock-based temporal motion vector predictors may be used in decoding of pictures with all slices having slice_type not equal to I in the CVS. sps_sbtmvp_enabled_flag equal to 0 specifies that subblock-based temporal motion vector predictors are not used in the CVS. When sps_sbtmvp_enabled_flag is not present, it is inferred to be equal to 0.

sps_amvr_enabled_flag equal to 1 specifies that adaptive motion vector difference resolution is used in motion vector coding. amvr_enabled_flag equal to 0 specifies that adaptive motion vector difference resolution is not used in motion vector coding.

sps_bdof_enabled_flag equal to 0 specifies that the bidirectional optical flow inter prediction is disabled. sps_bdof enabled_flag equal to 1 specifies that the bidirectional optical flow inter prediction is enabled.

sps_smvd_enabled_flag equal to 1 specifies that symmetric motion vector difference may be used in motion vector decoding. sps_smvd_enabled_flag equal to 0 specifies that symmetric motion vector difference is not used in motion vector coding.

sps_affine_amvr_enabled_flag equal to 1 specifies that adaptive motion vector difference resolution is used in motion vector coding of affine inter mode. sps_affine_amvr_enabled_flag equal to 0 specifies that adaptive motion vector difference resolution is not used in motion vector coding of affine inter mode.

sps_dmvr_enabled_flag equal to 1 specifies that decoder motion vector refinement based inter bi-prediction is enabled. sps_dmvr_enabled_flag equal to 0 specifies that decoder motion vector refinement based inter bi-prediction is disabled.

sps_mmvd_enabled_flag equal to 1 specifies that merge mode with motion vector difference is enabled. sps_mmvd_enabled_flag equal to 0 specifies that merge mode with motion vector difference is disabled.

sps_isp_enabled_flag equal to 1 specifies that intra prediction with subpartitions is enabled. sps_isp_enabled_liag equal to 0 specifies that intra prediction with subpartitions is disabled.

sps_mrl_enabled_flag equal to 1 specifies that intra prediction with multiple reference lines is enabled. sps_mrl_enabled_flag equal to 0 specifies that intra prediction with multiple reference lines is disabled.

sps_mip_enabled_flag equal to 1 specifies that matrix-based intra prediction is enabled. sps_mrl_enabled_flag equal to 0 specifies that matrix-based intra prediction is disabled.

sps_cclm_enabled_flag equal to 0 specifies that the cross-component linear model intra prediction from luma component to chroma component is disabled. sps_cclm_enabled_flag equal to 1 specifies that the cross-component linear model intra prediction from luma component to chroma componenent is enabled.

sps_cclm_colocated_chroma_flag equal to 1 specifies that the top-left downsampled luma sample in cross-component linear model intra prediction is collocated with the top-left luma sample. sps_cclm_colocated_chroma_flag equal to 0 specifies that the top-left downsampled luma sample in cross-component linear model intra prediction is horizontally co-sited with the top-left luma sample but vertically shifted by 0.5 units of luma samples relatively to the top-left luma sample.

sps_mts_enabled_flag equal to 1 specifies that sps_explicit_mts_intra_enabled_flag is present in the sequence parameter set RBSP syntax and that sps_explicit_mts_inter_enabled_flag is present in the sequence parameter set RBSP syntax. sps mts enabled_flag equal to 0 specifies that sps_explicit_mts_intra_enabled_flag is not present in the sequence parameter set RBSP syntax and that sps_explicit_mts_inter_enabled_flag is not present in the sequence parameter set RBSP syntax.

sps_explicit_mts_intra_enabled_flag equal to 1 specifies that tu_mts_idx may be present in the transform unit syntax for intra coding units. sps_explicit_mts_intra_enabled_flag equal to 0 specifies that tu_mts_idx is not present in the transform unit syntax for intra coding units. When not present, the value of sps_explicit_mts_intra_enabled_flag is inferred to be equal to 0.

sps_explicit_mts_inter_enabled_flag equal to 1 specifies that tu_mts_idx may be present in the transform unit syntax for inter coding units. sps_explicit_mts_inter_enabled_flag equal to 0 specifies that tu_mts_idx is not present in the transform unit syntax for inter coding units. When not present, the value of sps_explicit_mts_inter_enabled_flag is inferred to be equal to 0.

sps_sbt_enabled_flag equal to 0 specifies that subblock transform for inter-predicted CUs is disabled. sps_sbt_enabled_flag equal to 1 specifies that subblock transform for inter-predicteds CU is enabled.

sps_sbt_max_size_64_flag equal to 0 specifies that the maximum CU width and height for allowing subblock transform is 32 luma samples. sps_sbt_max_size_64_flag equal to 1 specifies that the maximum CU width and height for allowing subblock transform is 64 luma samples.

MaxSbtSize=sps_sbt_max_size_64_flag?64:32 sps_affine_enabled_flag specifies whether affine model based motion compensation can be used for inter prediction. If sps_affine_enabled_flag is equal to 0, the syntax shall be constrained such that no affine model based motion compensation is used in the CVS, and inter_affine_flag and cu_affine_type_flag are not present in coding unit syntax of the CVS. Otherwise (sps_affine_enabled_flag is equal to 1), affine model based motion compensation can be used in the CVS.

sps_affine_type_flag specifies whether 6-parameter affine model based motion compensation can be used for inter prediction. If sps_affine_type_flag is equal to 0, the syntax shall be constrained such that no 6-parameter affine model based motion compensation is used in the CVS, and cu_affine_type_flag is not present in coding unit syntax in the CVS. Otherwise (sps_affine_type_flag is equal to 1), 6-parameter affine model based motion compensation can be used in the CVS. When not present, the value of sps_affine_type_flag is inferred to be equal to 0.

sps_bcw_enabled_flag specifies whether bi-prediction with CU weights can be used for inter prediction. If sps_bcw_enabled_flag is equal to 0, the syntax shall be constrained such that no bi-prediction with CU weights is used in the CVS, and bcw_idx is not present in coding unit syntax of the CVS. Otherwise (sps_bcw_enabled_flag is equal to 1), bi-prediction with CU weights can be used in the CVS.

sps_ibc_enabled_flag equal to 1 specifies that current picture referencing may be used in decoding of pictures in the CVS. sps_ibc_enabled_flag equal to 0 specifies that current picture referencing is not used in the CVS. When sps_ibc_enabled_flag is not present, it is inferred to be equal to 0.

sps_ciip_enabled_flag specifies that ciip_flag may be present in the coding unit syntax for inter coding units. sps_ciip_enabled_flag equal to 0 specifies that ciip_flag is not present in the coding unit syntax for inter coding units.

sps_fpel_mmvd_enabled_flag equal to 1 specifies that merge mode with motion vector difference is using integer sample precision. sps_fpel_mmvd enabled_flag equal to 0 specifies that merge mode with motion vector difference can use fractional sample precision.

sps_triangle_enabled_flag specifies whether triangular shape based motion compensation can be used for inter prediction. sps_triangle_enabled_flag equal to 0 specifies that the syntax shall be constrained such that no triangular shape based motion compensation is used in the CVS, and merge_triangle_split_dir, merge_triangle_idx0, and merge_triangle_idx1 are not present in coding unit syntax of the CVS. sps_triangle_enabled_flag equal to 1 specifies that triangular shape based motion compensation can be used in the CVS.

sps_lmcs_enabled_flag equal to 1 specifies that luma mapping with chroma scaling is used in the CVS. sps_lmcs_enabled_flag equal to 0 specifies that luma mapping with chroma scaling is not used in the CVS.

sps_lfnst_enabled_flag equal to 1 specifies that lfnst_idx may be present in the residual coding syntax for intra coding units. sps_lfnst_enabled_flag equal to 0 specifies that lfnst_idx is not present in the residual coding syntax for intra coding units.

sps_ladf_enabled_flag equal to 1, specifies that sps_num_ladf_intervals_minus2, sps_ladf_lowest_interval_qp_offset, sps_ladf_qp_offset[i], and sps_ladf_delta_threshold_minus1[i] are present in the SPS.

sps_num_ladf_intervals_minus2 plus 1 specifies the number of sps_ladf_delta_threshold_minus1[i] and sps_ladf_qp_offset[i] syntax elements that are present in the SPS. The value of sps_num_ladf_intervals_minus2 shall be in the range of 0 to 3, inclusive.

sps_ladf_lowest_interval_qp_offset specifies the offset used to derive the variable qP as specified. The value of sps_ladf_lowest_interval_qp_offset shall be in the range of 0 to 63, inclusive.

sps_ladf_qp_offset[i] specifies the offset array used to derive the variable qP as specified. The value of sps_ladf_qp_offset[i] shall be in the range of 0 to 63, inclusive.

sps_ladf_delta_threshold_minus1[i] is used to compute the values of SpsLadfIntervalLowerBound[i], which specifies the lower bound of the i-th luma intensity level interval. The value of sps_ladf_deltathreshold_minus1[i] shall be in the range of 0 to $2^{BitDepthY}-3$, inclusive.

The value of SpsLadfIntervalLowerBound[0] is set equal to 0.

For each value of i in the range of 0 to sps_num_ladf_intervals_minus2, inclusive, the variable SpsLadfIntervalLowerBound[i+1] is derived as follows:

SpsLadfIntervalLowerBound[$i$+1]=SpsLadfIntervalLowerBound[$i$]+ sps_ladf_delta_threshold_minus1[$i$]+1 timing_info_present_flag equal to 1 specifies that the syntax elements num_units_in_tick, time_scale, and hrd_parameters_present_flag are present in the SPS RBSP syntax structure. timing_info_present_flag equal to 0 specifies that num_units_in_tick, time_scale, and hrd_parameters_present_flag are not present in the SPS RBSP syntax structure.

num_units_in_tick is the number of time units of a clock operating at the frequency time_scale Hz that corresponds to one increment (called a clock tick) of a clock tick counter. num_units_in_tick shall be greater than 0. A clock tick, in units of seconds, is equal to the quotient of num_units_in_tick divided by time_scale. For example, when the picture rate of a video signal is 25 Hz, time_scale may be equal to 27 000 000 and num_units_in_tick may be equal to 1 080 000, and consequently a clock tick may be equal to 0.04 seconds.

time_scale is the number of time units that pass in one second. For example, a time coordinate system that measures time using a 27 MHz clock has a time_scale of 27 000 000. The value of time_scale shall be greater than 0.

hrd_parameters_present_flag equal to 1 specifies that the syntax structure hrd_parameters( ) is present in the SPS RBSP syntax structure. hrd_parameters_present_flag equal to 0 specifies that the syntax structure hrd_parameters( ) is not present in the SPS RBSP syntax structure.

vui_parameters_present_flag equal to 1 specifies that the syntax structure vui_parameters( ) is present in the SPS RBSP syntax structure. vui_parameters_present_flag equal to 0 specifies that the syntax structure vui_parameters( ) is not present in the SPS RBSP syntax structure.

sps_extension_flag equal to 0 specifies that no sps_extension_data_flag syntax elements are present in the SPS RBSP syntax structure. sps_extension_flag equal to 1 specifies that there are sps_extension_data_flag syntax elements present in the SPS RBSP syntax structure.

sps_extension_data_flag may have any value. Its presence and value do not affect decoder conformance to profiles specified in this version of this Specification. Decoders conforming to this version of this Specification shall ignore all sps_extension_data_flag syntax elements.

Further, Table 4 illustrates the picture parameter set syntax provided in JVET-N1001.

TABLE 4

| | Descriptor |
|---|---|
| pic_parameter_set_rbsp( ) { | |
|   pps_pic_parameter_set_id | ue(v) |
|   pps_seq_parameter_set_id | ue(v) |
|   output_flag_present_flag | u(1) |
|   single_tile_in_pic_flag | u(1) |
|   if( !single_tile_in_pic_flag ) { | |
|     uniform_tile_spacing_flag | u(1) |
|     if( uniform_tile_spacing_flag ) { | |
|       tile_cols_width_minus1 | ue(v) |
|       tile_rows_height_minus1 | ue(v) |
|     } else { | |
|       num_tile_columns_minus1 | ue(v) |
|       num_tile_rows_minus1 | ue(v) |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     brick_splitting_present_flag | u(1) |
|     for( i = 0; brick_splitting_present_flag && i < NumTilesInPic; i++ ) { | |
|       brick_split_flag[ i ] | u(1) |
|       if( brick_split_flag[ i ] ) { | |
|         uniform_brick_spacing_flag[ i ] | u(1) |
|         if( uniform_brick_spacing_flag[ i ] ) | |
|           brick_height_minus1[ i ] | ue(v) |
|         else { | |
|           num_brick_rows_minus1[ i ] | ue(v) |
|           for( j = 0; j < num_brick_rows_minus1[ i ]; j++ ) | |

TABLE 4-continued

| | Descriptor |
|---|---|
|         brick_row_height_minus1[ i ][ j ] | ue(v) |
|       } | |
|     } | |
|   } | |
|   single_brick_per_slice_flag | u(1) |
|   if( !single_brick_per_slice_flag ) | |
|     rect_slice_flag | u(1) |
|   if( rect_slice_flag && !single_brick_per_slice_flag ) { | |
|     num_slices_in_pic_minus1 | ue(v) |
|     for( i = 0; i <= num_slices_in_pic_minus1; i++ ) { | |
|       if( i > 0 ) | |
|         top_left_brick_idx[ i ] | u(v) |
|       bottom_right_brick_idx_delta[ i ] | u(v) |
|     } | |
|   } | |
|   loop_filter_across_bricks_enabled_flag | u(1) |
|   if( loop_filter_across_bricks_enabled_flag ) | |
|     loop_filter_across_slices_enabled_flag | u(1) |
| } | |
| if( rect_slice_flag ) { | |
|   signalled_slice_id_flag | u(1) |
|   if( signalled_slice_id_flag ) { | |
|     signalled_slice_id_length_minus1 | ue(v) |
|     for( i = 0; i <= num_slices_in_pic_minus1; i++ ) | |
|       slice_id[ i ] | u(v) |
|   } | |
| } | |
| entropy_coding_sync_enabled_flag | u(1) |
| cabac_init_present_flag | u(1) |
| for( i = 0; i < 2; i++ ) | |
|   num_ref_idx_default_active_minus1[ i ] | ue(v) |
| rpl1_idx_present_flag | u(1) |
| init_qp_minus26 | se(v) |
| transform_skip_enabled_flag | u(1) |
| if( transform_skip_enabled_flag ) | |
|   log2_transform_skip_max_size_minus2 | ue(v) |
| cu_qp_delta_enabled_flag | u(1) |
| if( cu_qp_delta_enabled_flag ) | |
|   cu_qp_delta_subdiv | ue(v) |
| pps_cb_qp_offset | se(v) |
| pps_cr_qp_offset | se(v) |
| pps_slice_chroma_qp_offsets_present_flag | u(1) |
| weighted_pred_flag | u(1) |
| weighted_bipred_flag | u(1) |
| deblocking_filter_control_present_flag | u(1) |
| if( deblocking_filter_control_present_flag ) { | |
|   deblocking_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|   } | |
| } | |
| pps_loop_filter_across_virtual_boundaries_disabled_flag | u(1) |
| if( pps_loop_filter_across_virtual_boundaries_disabled_flag ) { | |
|   pps_num_ver_virtual_boundaries | u(2) |
|   for( i = 0; i < pps_num_ver_virtual_boundaries; i++ ) | |
|     pps_virtual_boundaries_pos_x[ i ] | u(v) |
|   pps_num_hor_virtual_boundaries | u(2) |
|   for( i = 0; i < pps_num_hor_virtual_boundaries; i++ ) | |
|     pps_virtual_boundaries_pos_y[ i ] | u(v) |
| } | |
| pps_extension_flag | u(1) |
| if( pps_extension_flag ) | |
|   while( more_rbsp_data( ) ) | |
|     pps_extension_data_flag | u(1) |
| rbsp_trailing_bits( ) | |
| } | |

With respect to Table 4, JVET-N1001 provides the following semantics:

pps_pic_parameter_set_id identifies the PPS for reference by other syntax elements. The value of pps_pic_parameter_set_id shall be in the range of 0 to 63, inclusive.

pps_seq_parameter_set_id specifies the value of sps_seq_parameter_set_id for the active SPS. The value of pps_seq_parameter_set_id shall be in the range of 0 to 15, inclusive.

output_flag_present_flag equal to 1 indicates that the pic_output_flag syntax element is present in slice headers referring to the PPS. output_flag_present_flag equal to 0 indicates that the pic_output_flag syntax element is not present in slice headers referring to the PPS.

single_tile_in_pic_flag equal to 1 specifies that there is only one tile in each picture referring to the PPS. single_tile_in_pic_flag equal to 0 specifies that there is more than one tile in each picture referring to the PPS.

NOTE—In absence of further brick splitting within a tile, the whole tile is referred to as a brick. When a picture contains only a single tile without further brick splitting, it is referred to as a single brick.

It is a requirement of bitstream conformance that the value of single_tile_in_pic_flag shall be the same for all PPSs that are activated within a CVS.

uniform_tile_spacing_flag equal to 1 specifies that tile column boundaries and likewise tile row boundaries are distributed uniformly across the picture and signalled using the syntax elements tile_cols_width_minus1 and tile_rows_height_minus1. uniform_tile_spacing_flag equal to 0 specifies that tile column boundaries and likewise tile row boundaries may or may not be distributed uniformly across the picture and signalled using the syntax elements num_tile_columns_minus1 and num_tile_rows_minus1 and a list of syntax element pairs tile_column_width_minus1[i] and tile_row_height_minus1[i]. When not present, the value of uniform_tile_spacing_flag is inferred to be equal to 1.

tile_cols_width_minus1 plus 1 specifies the width of the tile columns excluding the right-most tile column of the picture in units of CTBs when uniform_tile_spacing_liag is equal to 1. The value of tile_cols_width_minus1 shall be in the range of 0 to PicWidthInCtbsY−1, inclusive. When not present, the value of tile_cols_width_minus1 is inferred to be equal to PicWidthInCtbsY−1.

tile_rows_height_minus1 plus 1 specifies the height of the tile rows excluding the bottom tile row of the picture in units of CTBs when uniform_tile_spacing_flag is equal to 1. The value of tile_rows_height_minus1 shall be in the range of 0 to PicHeightInCtbsY−1, inclusive. When not present, the value of tile_rows_height_minus1 is inferred to be equal to PicHeightInCtbsY−1.

num_tile_columns_minus1 plus 1 specifies the number of tile columns partitioning the picture when uniform_tile_spacing_flag is equal to 0. The value of num_tile_columns minus1 shall be in the range of 0 to PicWidthInCtbsY−1, inclusive. If single_tile_in_pic_flag is equal to 1, the value of num_tile_columns minus1 is inferred to be equal to 0. Otherwise, when uniform_tile_spacing_flag is equal to 1, the value of num_tile_columns_minus1 is inferred as specified.

num_tile_rows_minus1 plus 1 specifies the number of tile rows partitioning the picture when uniform_tile_spacing_flag is equal to 0. The value of num_tile_rows minus1 shall be in the range of 0 to PicHeightInCtbsY−1, inclusive. If single_tile_in_pic_flag is equal to 1, the value of numtilerows_minus1 is inferred to be equal to 0. Otherwise, when uniform_tile_spacing_flag is equal to 1, the value of num_tile_rows_minus1 is inferred as specified.

The variable NumTilesInPic is set equal to (num_tile_columns_minus1+1)*(num_tile_rows_minus1+1).

When single_tile_in_pic_liag is equal to 0, NumTilesInPic shall be greater than 1.

tile_column_width_minus1[i] plus 1 specifies the width of the i-th tile column in units of CTBs.

tile_row_height_minus1[i] plus 1 specifies the height of the i-th tile row in units of CTBs.

brick_splitting_present_flag equal to 1 specifies that one or more tiles of pictures referring to the PPS may be divided into two or more bricks. brick_splitting_present_flag equal to 0 specifies that no tiles of pictures referring to the PPS are divided into two or more bricks.

brick_split_flag[i] equal to 1 specifies that the i-th tile is divided into two or more bricks. brick_split_flag[i] equal to 0 specifies that the i-th tile is not divided into two or more bricks. When not present, the value of brick_split_flag[i] is inferred to be equal to 0.

uniform_brick_spacing_flag[i] equal to 1 specifies that horizontal brick boundaries are distributed uniformly across the i-th tile and signalled using the syntax element brick_height_minus1[i]. uniform_brick_spacing_flag[i] equal to 0 specifies that horizontal brick boundaries may or may not be distributed uniformly across i-th tile and signalled using the syntax element num brick rows minus1[i] and a list of syntax elements brick_row_height_minus1[i][j]. When not present, the value of uniform_brick_spacing_flag[i] is inferred to be equal to 1.

brick_height_minus1[i] plus 1 specifies the height of the brick rows excluding the bottom brick in the i-th tile in units of CTBs when uniform_brick_spacing_flag[i] is equal to 1. When present, the value of brick_height_minus1 shall be in the range of 0 to RowHeight[i]−2, inclusive. When not present, the value of brick height_minus1[i] is inferred to be equal to RowHeight[i]−1.

num_brick_rows_minus1[i] plus 1 specifies the number of bricks partitioning the i-th tile when uniform_brick_spacing_flag[i] is equal to 0. When present, the value of num_brick_rows_minus1[i] shall be in the range of 1 to RowHeight[i]−1, inclusive. If brick_split_flag[i] is equal to 0, the value of num_brick_rows_minus1[i] is inferred to be equal to 0. Otherwise, when uniform_brick_spacing_flag[i] is equal to 1, the value of num_brick_rows_minus1[i] is inferred as specified.

brick_row_height_minus1[i][j] plus 1 specifies the height of the j-th brick in the i-th tile in units of CTBs when uniform_tile_spacing_flag is equal to 0.

The following variables are derived, and, when uniform_tile_spacing_flag is equal to 1, the values of num_tile_columns_minus1 and num_file_rows_minus1 are inferred, and, for each i ranging from 0 to NumTilesInPic−1, inclusive, when uniform_brick_spacing_flag[i] is equal to 1, the value of num_brick_rows_minus1[i] is inferred, by invoking the CTB raster and brick scanning conversion process as specified:

the list RowHeight[j] for j ranging from 0 to num_tile_rows_minus1, inclusive, specifying the height of the j-th tile row in units of CTBs, the list CtbAddrRsToBs[ctbAddrRs] for ctbAddrRs ranging from 0 to PicSizeInCtbsY−1, inclusive, specifying the conversion from a CTB address in the CTB raster scan of a picture to a CTB address in the brick scan, the list CtbAddrBsToRs[ctbAddrBs] for ctbAddrBs ranging from 0 to PicSizeInCtbsY−1, inclusive, specifying the conversion from a CTB address in the brick scan to a CTB address in the CTB raster scan of a picture, the list BrickId[ctbAddrBs] for ctbAddrBs ranging from 0 to PicSizeInCtbsY−1, inclusive, specifying the conversion from a CTB address in brick scan to a brick ID, the list NumCtusInBrick[brickIdx] for brickIdx ranging from 0 to NumBricksInPic−1, inclusive, specifying the conversion from a brick index to the number of CTUs in the brick, the list FirstCtbAddrBs[brickIdx] for brickIdx ranging from 0 to NumBricksInPic−1, inclusive, specifying the conversion from a brick ID to the CTB address in brick scan of the first CTB in the brick.

single_brick_per_slice_flag equal to 1 specifies that each slice that refers to this PPS includes one brick. single_brick_per_slice_flag equal to 0 specifies that a slice that refers to this PPS may include more than one brick. When not present, the value of single_brick_per_slice_flag is inferred to be equal to 1.

rect_slice_flag equal to 0 specifies that bricks within each slice are in raster scan order and the slice information is not signalled in PPS. rect_slice_flag equal to 1 specifies that bricks within each slice cover a rectangular region of the picture and the slice information is signalled in the PPS. When not present, rect_slice_flag is inferred to be equal to 1.

num_slices_in_pic_minus1 plus 1 specifies the number of slices in each picture referring to the PPS. The value of num_slices_in_pic_minus1 shall be in the range of 0 to NumBricksInPic−1, inclusive. When not present and single_brick_per_slice_flag is equal to 1, the value of num_slices_in_pic_minus1 is inferred to be equal to NumBricksInPic−1.

top_left_brick_idx[i] specifies the brick index of the brick located at the top-left corner of the i-th slice. The value of top_left_brick_idx[i] shall not be equal to the value of top_left_brick_idx[j] for any i not equal to j. When not present, the value of top_left_brick_idx[i] is inferred to be equal to i. The length of the top_left_brick_idx[i] syntax element is Ceil(Log 2(NumBricksInPic) bits.

bottom_right_brick_idx_delta[i] specifies the difference between the brick index of the brick located at the bottom-right corner of the i-th slice and top_left_brick_idx[i]. When single_brick_per_slice_flag is equal to 1, the value of bottomright_brick_idx_delta[i] is inferred to be equal to 0. The length of the bottomright_brick_idx_delta[i] syntax element is Ceil(Log 2(NumBricksInPic−top_left_brick_idx[i])) bits. It is a requirement of bitstream conformance that a slice shall include either a number of complete tiles or only a consecutive sequence of complete bricks of one tile.

The variable NumBricksInSlice[i] and BricksToSliceMap [j], which specify the number of bricks in the i-th slice and the mapping of bricks to slices, are derived as follows:

```
NumBricksInSlice[ i ] = 0
botRightBkIdx = top_left_brick_idx[ i ] +
bottom_right_brick_idx_delta[ i ]
for( j = 0; j < NumBricksInPic; j++) {
   if( BrickColBd[ j ]  >=  BrickColBd[ top_left_brick_idx[ i ] ]  &&
      BrickColBd[ j ]  <=  BrickColBd[ botRightBkIdx ]  &&
      BrickRowBd[ j ]  >=  BrickRowBd[ top_left_brick_idx[ i ] ]
      && BrickRowBd[ j ] <= BrickRowBd [ botRightBkIdx ] ) {
      NumBricksInSlice[ i ]++
      BricksToSliceMap[ j ] = i
   }
}
``` loop_filter_across_bricks_enabled_flag equal to 1 specifies that in-loop filtering operations may be performed across brick boundaries in pictures referring to the PPS. loop_filter_across_bricks_enabled_flag equal to 0 specifies that in-loop filtering operations are not performed across brick boundaries in pictures referring to the PPS. The in-loop filtering operations include the deblocking filter, sample adaptive offset filter, and adaptive loop filter operations. When not present, the value of loop_filter_across_bricks_enabled_flag is inferred to be equal to 1.

loop_filter_across_slices_enabled_flag equal to 1 specifies that in-loop filtering operations may be performed across slice boundaries in pictures referring to the PPS. loop_filter_across_slice_enabled_flag equal to 0 specifies that in-loop filtering operations are not performed across slice boundaries in pictures referring to the PPS. The in-loop filtering operations include the deblocking filter, sample adaptive offset filter, and adaptive loop filter operations. When not present, the value of loop_filter_across_slices_enabled_flag is inferred to be equal to 0.

signalled_slice_id_flag equal to 1 specifies that the slice ID for each slice is signalled. signalled_slice_idflag equal to 0 specifies that slice IDs are not signalled. When rect_slice_flag is equal to 0, the value of signalled_slice_id_flag is inferred to be equal to 0.

signalled_slice_id_length_minus1 plus 1 specifies the number of bits used to represent the syntax element slice_id[i] when present, and the syntax element slice_address in slice headers. The value of signalled_slice_idlength_minus1 shall be in the range of 0 to 15, inclusive. When not present, the value of signalled_slice_id_length_minus1 is inferred to be equal to Ceil(Log 2(num_slices_in_pic_minus1+1))−1.

slice_id[i] specifies the slice ID of the i-th slice. The length of the slice_id[i] syntax element is signalled_slice_id_length_minus1+1 bits. When not present, the value of slice_id[i] is inferred to be equal to i, for each i in the range of 0 to num_slices_in_pic_minus1, inclusive.

entropy_coding_sync_enabled_flag equal to 1 specifies that a specific synchronization process for context variables is invoked before decoding the CTU that includes the first CTB of a row of CTBs in each brick in each picture referring to the PPS, and a specific storage process for context variables is invoked after decoding the CTU that includes the first CTB of a row of CTBs in each brick in each picture referring to the PPS. entropy_coding_sync_enabled_flag equal to 0 specifies that no specific synchronization process for context variables is required to be invoked before decoding the CTU that includes the first CTB of a row of CTBs in each brick in each picture referring to the PPS, and no specific storage process for context variables is required to be invoked after decoding the CTU that includes the first CTB of a row of CTBs in each brick in each picture referring to the PPS.

It is a requirement of bitstream conformance that the value of entropy_coding_sync_enabled_flag shall be the same for all PPSs that are activated within a CVS.

cabac_init_present_flag equal to 1 specifies that cabac_init_flag is present in slice headers referring to the PPS. cabac_init_present_flag equal to 0 specifies that cabac_init_flag is not present in slice headers referring to the PPS.

num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_activeminus1[i] shall be in the range of 0 to 14, inclusive.

rpl1_idx_present_flag equal to 0 specifies that ref_pic_list_sps_flag[1] and ref_pic_list_idx[1] are not present in slice headers. rpl1_idx_present_flag equal to 1 specifies that ref_pic_list_sps_flag[1] and ref_pic_list_idx[1] may be present in slice headers.

init_qp_minus26 plus 26 specifies the initial value of SliceQp$_Y$ for each slice referring to the PPS. The initial value of SliceQp$_Y$ is modified at the slice layer when a non-zero value of slice_qp_delta is decoded. The value of init_qp_minus26 shall be in the range of −(26+QpBdOffset$_Y$) to +37, inclusive.

transform_skip_enabled_flag equal to 1 specifies that transform_skip_flag may be present in the transform unit syntax. transform_skip_enabled_flag equal to 0 specifies that transform_skip_flag is not present in the transform unit syntax.

log 2_transform_skip_max_size_minus2 specifies the maximum block size used for transform skip, and shall be in the range of 0 to 3.

When not present, the value of log 2_transform_skip_max_size_minus2 is inferred to be equal to 0.

The variable MaxTsSize is set equal to 1<<(log 2_transform_skip_max_size_minus2+2).

eu_qp_delta_enabled_flag equal to 1 specifies that the cu_qp_delta_subdiv syntax element is present in the PPS and that cu_qp_delta_abs may be present in the transform unit syntax. cu_qp_delta_enabled_flag equal to 0 specifies that the cu_qp_delta_subdiv syntax element is not present in the PPS and that cu_qp_delta_abs is not present in the transform unit syntax.

cu_qp_delta_subdiv specifies the maximum cbSubdiv value of coding units that convey cu_qp_delta_abs and cu_qp_delta_sign_flag. The value range of cu_qp_delta_subdiv is specified as follows:

If slice_type is equal to I, the value of cu_qp_delta_subdiv shall be in the range of 0 to 2*(log 2_ctu_size_minus2−log 2_min_qt_size_intraslice_minus2+MaxMttDepthY), inclusive.

Otherwise (slice_type is not equal to I), the value of cu_qp_delta_subdiv shall be in the range of 0 to 2*(log 2_ctu_size_minus2−log 2_min_qt_size_inter_slice_minus2+MaxMttDepthY), inclusive.

When not present, the value of cu_qp_delta_subdiv is inferred to be equal to 0.

pps_cb_qp_offset and pps_cr_qp_offset specify the offsets to the luma quantization parameter Qp'$_Y$ used for deriving Qp'$_{Cb}$ and Qp'$_{Cr}$, respectively. The values of pps_cb_qp_offset and pps_cr_qp_offset shall be in the range of −12 to +12, inclusive. When ChromaArrayType is equal to 0, pps_cb_qp_offset and pps_cr_qp_offset are not used in the decoding process and decoders shall ignore their value.

pps_slice_chroma_qp_offsets_present_flag equal to 1 indicates that the slice_cb_qp_offset and slice_cr_qp_offset syntax elements are present in the associated slice headers. pps_slice_chromaqp_offsets_present_flag equal to 0 indicates that these syntax elements are not present in the associated slice headers. When ChromaArrayType is equal to 0, pps_slice_chroma_qp_offsets_present_flag shall be equal to 0.

weighted_pred_flag equal to 0 specifies that weighted prediction is not applied to P slices. weighted_pred_flag equal to 1 specifies that weighted prediction is applied to P slices.

weighted_bipred_flag equal to 0 specifies that the default weighted prediction is applied to B slices. weighted_bipred_flag equal to 1 specifies that weighted prediction is applied to B slices.

deblocking_ffiter_control_present_flag equal to 1 specifies the presence of deblocking filter control syntax elements in the PPS. deblocking_filter_control_present_flag equal to 0 specifies the absence of deblocking filter control syntax elements in the PPS.

deblocking_filter_override_enabled_flag equal to 1 specifies the presence of deblocking_filter_override_flag in the slice headers for pictures referring to the PPS. deblockingfilter_override_enabled_flag equal to 0 specifies the absence of deblocking_filter_override_flag in the slice headers for pictures referring to the PPS. When not present, the value of deblocking_filter_override enabled_flag is inferred to be equal to 0.

pps_deblocking_filter_disabled_flag equal to 1 specifies that the operation of deblocking filter is not applied for slices referring to the PPS in which slice_deblocking_filter_disabled_flag is not present. pps_deblocking_filter_disabledflag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.

pps_beta_offset_div2 and pps_tc_offset_div2 specify the default deblocking parameter offsets for β and tC (divided by 2) that are applied for slices referring to the PPS, unless the default deblocking parameter offsets are overridden by the deblocking parameter offsets present in the slice headers of the slices referring to the PPS. The values of pps_beta_offset_div2 and pps_tc_offset_div2 shall both be in the range of −6 to 6, inclusive. When not present, the value of pps_beta_offset_div2 and pps_tc_offset_div2 are inferred to be equal to 0.

pps_loop_filter_across_virtual_boundaries_disabled_flag equal to 1 specifies that the in-loop filtering operations are disabled across the virtual boundaries in pictures referring to the PPS. pps_loop_filter_across_virtual_boundaries_disabled_flag equal to 0 specifies that no such disabling of in-loop filtering operations is applied in pictures referring to the PPS. The in-loop filtering operations include the deblocking filter, sample adaptive offset filter, and adaptive loop filter operations. When not present, the value of pps_loop_filter_across_virtual_boundaries_disabled_flag is inferred to be equal to 0.

pps_num_ver_virtual_boundaries specifies the number of pps_virtual_boundaries_pos_x[i] syntax elements that are present in the PPS. When pps_num_ver_virtual_boundaries is not present, it is inferred to be equal to 0.

pps_virtual_boundaries_pos_x[i] is used to compute the value of PpsVirtualBoundariesPosX[i], which specifies the location of the i-th vertical virtual boundary in units of luma samples. The number of bits used to represent pps_virtual_boundaries_pos_x[i] is Ceil(Log 2(pic_width_in_luma_samples)−3). pps_virtual_boundaries_pos_x[i] shall be in the range of 1 to Ceil(pic_width_in_luma_samples÷8)−1, inclusive.

The location of the vertical virtual boundary PpsVirtualBoundariesPosX[i] is derived as follows:

PpsVirtualBoundariesPosX[i]=pps_virtual_boundaries_pos_x[i]*8

The distance between any two vertical virtual boundaries shall be greater than or equal to CtbSizeY luma samples.

pps_num_hor_virtual_boundaries specifies the number of pps_virtual_boundaries_pos_y[i] syntax elements that are present in the PPS. When pps_num_hor_virtual_boundaries is not present, it is inferred to be equal to 0.

pps_virtual_boundaries_pos_y[i] is used to compute the value of PpsVirtualBoundariesPosY[i], which specifies the location of the i-th horizontal virtual boundary in units of luma samples. The number of bits used to represent pps_virtual_boundaries_pos_y[i] is Ceil(Log 2(pic_height_in_luma_samples)−3). pps_virtual_boundaries_pos_y[i] shall be in the range of 1 to Ceil(pic_height_in_luma_samples−8)−1, inclusive.

The location of the horizontal virtual boundary PpsVirtualBoundariesPosY[i] is derived as follows:

PpsVirtualBoundariesPosY[i]=pps_virtual_boundaries_pos_y[i]*8

The distance between any two horizontal virtual boundaries shall be greater than or equal to CtbSizeY luma samples.

pps_extension_flag equal to 0 specifies that no pps_extension_data_flag syntax elements are present in the PPS RBSP syntax structure. pps_extension_flag equal to 1 specifies that there are pps_extension_data_flag syntax elements present in the PPS RBSP syntax structure.

pps_extension_data_flag may have any value. Its presence and value do not affect decoder conformance to profiles specified in this version of this Specification. Decoders conforming to this version of this Specification shall ignore all pps_extension_data_flag syntax elements.

Adaptive Resolution Change (ARC) refers to a resolution change of pictures within a CVS. It should be noted that Adaptive Resolution Change may some instances be referred to as Reference Picture Resampling (RRR). As such, although the term ARC is used in this document, it may, in some cases, be used interchangeably with the term RRR or some other equivalent term. That is, ARC provides where the resolution of a stored reference picture may be different from that of the current picture. A current picture may decoded using prediction from a reference picture that is generated by downscaling and/or downsampling a stored reference picture (i.e., the stored reference picture is larger in resolution than the current picture resolution) or upscaling and/or upsampling a stored reference picture (the stored reference picture is smaller in resolution than the current picture resolution). ARC can be used in many different scenarios. Example scenarios where ARC downsampling may be useful include: cases where the coded resolution is reduced due to a (significant) drop in available bandwidth; cases where the rendered resolution is reduced due to events triggered by the system, such as, for example, changes of active speaker in a multiparty conversation, or switches between "main video" and screen sharing; cases where the rendered resolution is reduced due to events triggered by the user, such as switching from full-screen to window/thumbnail, or rotating a handheld device from landscape to portrait; and/or cases where the received resolution is reduced in an Adaptive Bit Rate (ABR) streaming service when switching from a higher bitrate representation to a lower bitrate representation.

There have been several different proposals to add support for ARC in VVC. One example proposal is Chen et al., "AHG 19: Adaptive Resolution Change", JVET-N0279, March 2019, referred to herein as Chen, which describes signaling adaptive resolution change in parameter sets and modifications to the current motion compensated prediction process when there is a resolution change between a current picture and its reference pictures. In particular, Chen describes where having the resolution of a stored reference picture different from that of the current picture is realized using a block-based one-step approach. That is, Chen provides where modifications to the motion compensated prediction process in JVET-N1001 are limited to motion vector scaling and subpel location derivations and separate resampling process reference pictures are not performed. Further, in Chen there are no changes to existing motion compensation interpolators.

In particular, with respect to signaling ARC in parameter sets, Chen provides where syntax elements pic_width_in_luma_samples and pic_height_in_luma_samples in a SPS syntax structure are respectively replaced with syntax elements max_pic_width_in_luma_samples and max_pic_height_in_luma_samples having the following semantics:

max_pic_width_in_luma_samples specifies the maximum width of decoded pictures referring to the SPS in units of luma samples. max_pic_width_in_luma_samples shall not be equal to 0 and shall be an integer multiple of MinCbSizeY.

max_pic_height_in_luma_samples specifies the maximum height of decoded pictures referring to the SPS in units of luma samples. max_pic_height_in_luma_samples shall not be equal to 0 and shall be an integer multiple of MinCbSizeY.

Chen further provides where the syntax provided in Table 5 is added to a PPS syntax structure:

TABLE 5

| | Descriptor |
|---|---|
| pic_parameter_set_rbsp( ) { | |
| ... | |
| pic_size_different_from_max_flag | u(1) |
| if (pic_size_different_from_max_flag) { | |
| pic_width_in_luma_samples | ue(v) |
| pic_height_in_luma_samples | ue(v) |
| } | |
| ... | |
| } | |

With respect to Table 5, Chen provides the following semantics:

pic_size_different_from_max_flag equal to 1 specifies that the PPS signals different picture width or picture height from the max_pic_width_in_luma_samples and max_pic_height_in_luma_sample in the referred SPS. pic_size_different_from_max_flag equal to 0 specifies that pic_width_in_luma_samples and pic_height_in_luma_sample are the same as max_pic_width_in_luma_samples and max_pic_height_in_luma_sample in the referred SPS.

pic_width_in_luma_samples specifies the width of each decoded picture in units of luma samples. pic_width_in_luma_samples shall not be equal to 0 and shall be an integer multiple of MinCbSizeY. When pic_width_in_luma_samples is not present, it is inferred to be equal to max_pic_width_in_luma_samples pic_height_in_luma_samples specifies the height of each decoded picture in units of luma samples. pic_height_in_luma_samples shall not be equal to 0 and shall be an integer multiple of MinCbSizeY. When pic_height_in_luma_samples is not present, it is inferred to be equal to max_pic_height_in_luma_samples.

It is a requirement of bitstream conformance that horizontal and vertical scaling ratios shall be in the range of 1/8 to 2, inclusive for every active reference picture. The scaling ratios are defined as follows:

- horizontal_scaling_ratio=((reference_pic_width_in_luma samples<<14)+(pic_width_in_luma_samples/2))/ pic_width_in_luma_samples
- vertical_scaling_ratio=((reference_pic_height_in_luma_samples<< 14)+(pic_height_in_luma_samples/2))/ pic_height_in_luma_samples With respect to motion vector scaling and subpel location derivations, Chen provides where all motion vectors are normalized to the current picture grid instead of their corresponding reference picture grids and when a resolution change happens, both the motion vectors and reference blocks are scaled while doing motion compensated prediction, where the scaling range is limited to [1/8, 2], i.e., the upscaling is limited to 1:8 and downscaling is limited to 2:1. In particular, Chen provides the following scaling process for Luma:

The scaling factors and their fixed-point representations are defined as $$\text{hori\_scale\_fp} = \frac{(width_{ref} \ll 14) + \left(\frac{width_{cur}}{2}\right)}{width_{cur}},$$

$$\text{vert\_scale\_fp} = \frac{(height_{ref} \ll 14) + \left(\frac{height_{cur}}{2}\right)}{height_{cur}}.$$

The scaling process includes two parts:
1. Map the upper left corner pixel of the current block to the reference picture;
2. Use the horizontal and vertical step sizes to address the reference locations of the current block's other pixels.

If the coordinate of the upper left corner pixel of the current block is (x, y), the subpel location (x', y') in the reference picture pointed to by a motion vector (mvX, mvY) in units of $1/16^{th}$ pel is specified as follows:

The horizontal location in the reference picture is $x'=((x<<4)+mvX) \cdot \text{hori\_scale\_fp}$, and x' is further scaled down to only keep 10 fractional bits $x'=\text{Sign}(x') \cdot ((\text{Abs}(x')+(1<<7))>>8)$.

Similarly, the vertical location in the reference picture is $y'=((y<<4)+mvY) \cdot \text{vert\_scale\_fp}$, and y' is further scaled down to $y'=\text{Sign}(y') \cdot ((\text{Abs}(y')+(1<<7))>>8)$.

At this point, the reference location of the upper left corner pixel of the current block is at (x', y'). The other reference subpel/pel locations are calculated relative to (x', y') with horizontal and vertical step sizes. Those step sizes are derived with $1/1024$-pel accuracy from the above horizontal and vertical scaling factors as follows:

$x\_\text{step}=(\text{hori\_scale\_fp}+8)>>4$, $y\_\text{step}=(\text{vert\_scale\_fp}+8)>>4$.

As an example, if a pixel in the current block is i-column and j-row away from the upper left corner pixel, its corresponding reference pixel's horizontal and vertical coordinates are derived by $x'_i=x'+i*x\_\text{step}$, $y'_j=y'+j*y\_\text{step}$.

In subpel interpolation, $x'_i$ and $y'_j$ have to be broken up into full-pel parts and fractional-pel parts:

The full-pel parts for addressing reference block are equal to $(x'_i+32)>>10$, $(y'_j+32)>>10$.

The fractional-pel parts used to select interpolation filters are equal to $\Delta x=((x'_i+32)>>6)\&15$, $\Delta y=((y'_j+32)>>6)\&15$.

Once the full-pel and fractional-pel locations within a reference picture are determined, the existing motion compensation interpolators can be used without any additional changes. The full-pel location will be used to fetch the reference block patch from the reference picture and the fractional-pel location will be used to select the proper interpolation filter.

Further, Chen provides the following scaling process for chroma:

When the chroma format is 4:2:0, chroma motion vectors have $1/32$-pel accuracy. The scaling process of chroma motion vectors and chroma reference blocks is almost the same as for luma blocks except a chroma format related adjustment.

When the coordinate of the upper left corner pixel of the current chroma block is $(x_c, y_c)$, the initial horizontal and vertical locations in the reference chroma picture are $x_c'=((x_c<<5)+mvX) \cdot \text{hori\_scale\_fp}$, $y_c'=((y_c<<5)+mvY) \cdot \text{vert\_scale\_fp}$, where mvX and mvY are the original luma motion vector but now should be examined with $1/32$-pel accuracy.

$x_c'$ and $y_c'$ are further scaled down to keep $1/1024$ pel accuracy $x_c'=\text{Sign}(x_c') \cdot ((\text{Abs}(x_c')+(1<<8))>>9)$, $y_c'=\text{Sign}(y_c') \cdot ((\text{Abs}(y_c')+(1<<8))>>9)$.

Compared to the associated luma equations, the above right shift is increased by one extra bit.

The step sizes used are the same as for luma. For a chroma pixel at (i, j) relative to the upper left corner pixel, its reference pixel's horizontal and vertical coordinates are derived by $$x'_{c\,i} = x'_c + i * x\_step,$$

$$y'_{c\,j} = y'_c + j * y\_step.$$

In subpel interpolation, $x'_{c\,i}$ and $y'_{c\,j}$ are also broken up into full-pel parts and fractional-pel parts:

The full-pel parts for addressing reference block are equal to $$(x'_{c\,i} + 16) \gg 10,$$

$$(y'_{c\,j} + 16) \gg 10.$$

The fractional-pel parts used to select interpolation filters are equal to $$\Delta x = ((x'_{c\,i} + 16) \gg 5) \& 31,$$

$$\Delta y = ((y'_{c\,j} + 16) \gg 5) \& 31.$$

The techniques for enabling ARC provided in Chen may be less than ideal. In particular, according to the techniques in Chen, when a current picture uses a different lower resolution compared to a reference picture, the reference picture is downscaled from a higher resolution stored reference picture, the resulting image quality may be less than ideal. That is, when the techniques provided in Chen are utilized with the motion interpolation filters provided in JVET-N1001, described above, severe aliasing artifacts may occur, particularly, in cases of relatively large scaling ratios. This disclosure describes examples of filters with low-pass characteristics that may be used for ARC use cases where a reference picture is larger than a current picture. Further, the signaling of ARC parameters in Chen may be less than ideal. This disclosure describes examples of techniques for signaling ARC parameters. It should be noted that the example techniques described herein may be utilized for approaches of ARC including scaling without the resampling of reference pictures and/or approaches of ARC where a new reference picture is created from a reference picture with different resolution.

Figure 5:
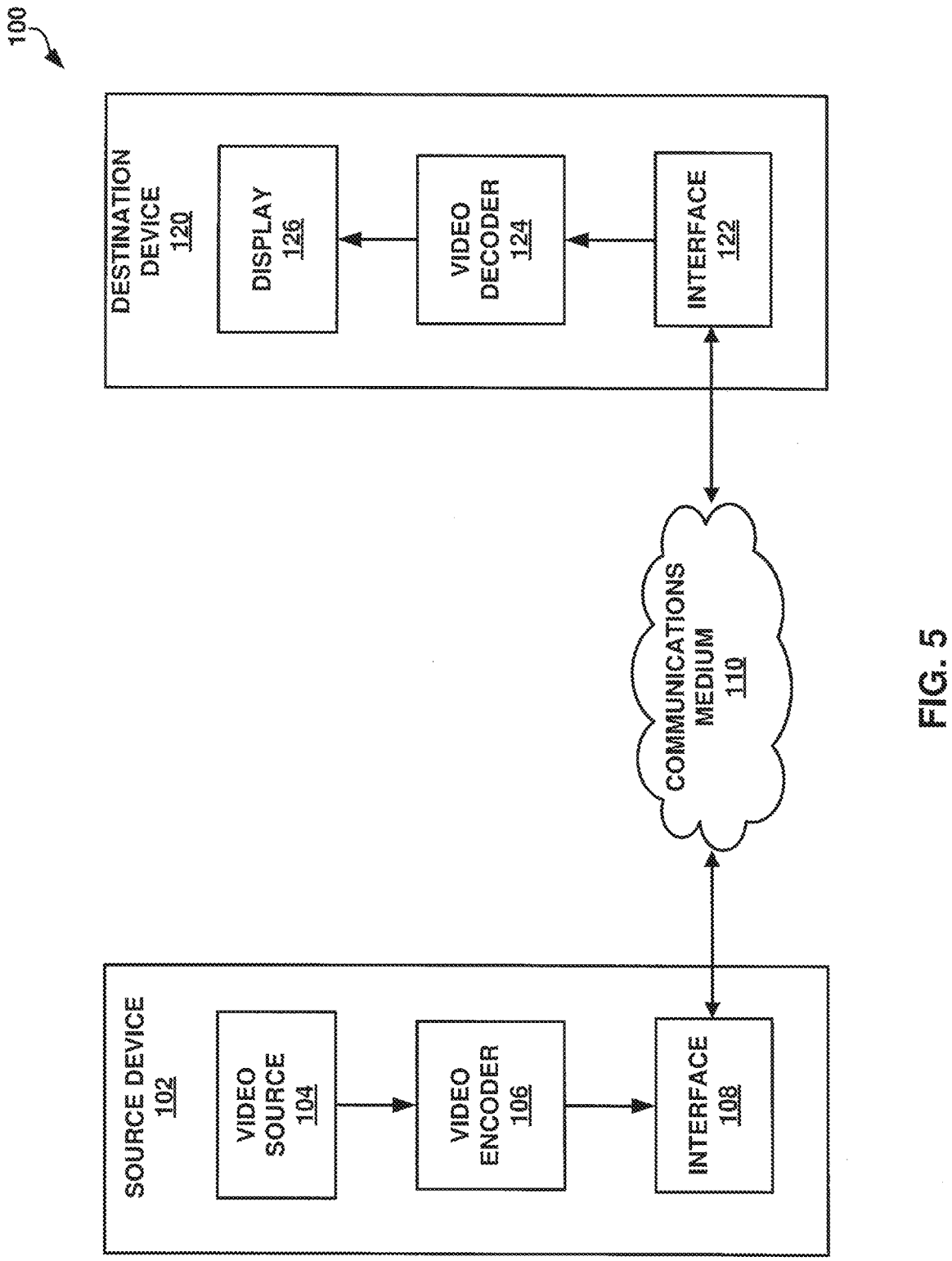
FIG. 5 is a block diagram illustrating an example of a system that may be configured to encode and decode video data according to one or more techniques of this disclosure.

FIG. 5 is a block diagram illustrating an example of a system that may be configured to code (i.e., encode and/or decode) video data according to one or more techniques of this disclosure. System 100 represents an example of a system that may perform video coding using partitioning techniques described according to one or more techniques of this disclosure. As illustrated in FIG. 5, system 100 includes source device 102, communications medium 110, and destination device 120. In the example illustrated in FIG. 5, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 5, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I²C, or any other logical and physical structure that may be used to interconnect peer devices.

Referring again to FIG. 5, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I²C, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 3, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
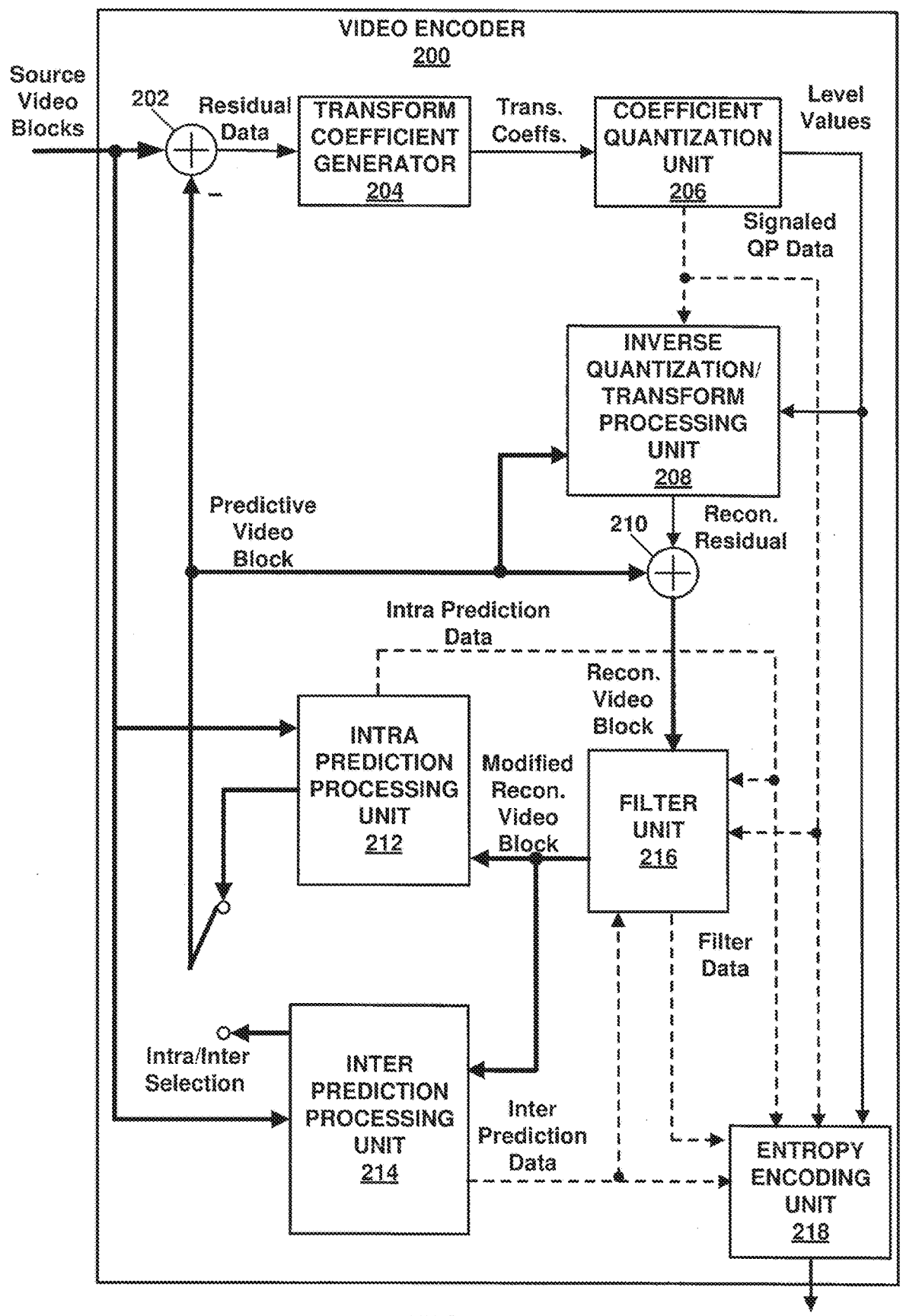
FIG. 6 is a block diagram illustrating an example of a video encoder that may be configured to encode video data according to one or more techniques of this disclosure.

FIG. 6 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 6, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 200 may be configured to perform additional subdivisions of source video blocks. It should be noted that some techniques described herein may be generally applicable to video coding, regardless of how source video data is partitioned prior to and/or during encoding. In the example illustrated in FIG. 6, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218.

As illustrated in FIG. 6, video encoder 200 receives source video blocks and outputs a bitstream. Video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. As described above, in ITU-T H.265, TBs are restricted to the following sizes 4×4, 8×8, 16×16, and 32×32. In one example, transform coefficient generator 204 may be configured to perform transformations according to arrays having sizes of 4×4, 8×8, 16×16, and 32×32. In one example, transform coefficient generator 204 may be further configured to perform transformations according to arrays having other dimensions. In particular, in some cases, it may be useful to perform transformations on rectangular arrays of difference values. In one example, transform coefficient generator 204 may be configured to perform transformations according to the following sizes of arrays: 2×2, 2×4N, 4M×2, and/or 4M×4N. In one example, a 2-dimensional (2D) MxN inverse transform may be implemented as 1-dimensional (1D) M-point inverse transform followed by a 1D N-point inverse transform. In one example, a 2D inverse transform may be implemented as a 1D N-point vertical transform followed by a 1D N-point horizontal transform. In one example, a 2D inverse transform may be implemented as a 1D N-point horizontal transform followed by a 1D N-point vertical transform. Transform coefficient generator 204 may output transform coefficients to coefficient quantization unit 206.

Coefficient quantization unit 206 may be configured to perform quantization of the transform coefficients. As described above, the degree of quantization may be modified by adjusting a quantization parameter. Coefficient quantization unit 206 may be further configured to determine quantization parameters and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

Referring again to FIG. 6, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 6, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction. Intra prediction processing unit 212 may be configured to select an intra prediction mode for a video block to be coded. Intra prediction processing unit 212 may be configured to evaluate a frame and/or an area thereof and determine an intra prediction mode to use to encode a current block. As illustrated in FIG. 6, intra prediction processing unit 212 outputs intra prediction data (e.g., syntax elements) to entropy encoding unit 218 and transform coefficient generator 204. As described above, a transform performed on residual data may be mode dependent. As described above, possible intra prediction modes may include planar prediction modes, DC prediction modes, and angular prediction modes. Further, in some examples, a prediction for a chroma component may be inferred from an intra prediction for a luma prediction mode. Inter prediction processing unit 214 may be configured to perform inter prediction coding for a current video block. Inter prediction processing unit 214 may be configured to receive source video blocks and calculate a motion vector for PUs of a video block. A motion vector may indicate the displacement of a PU (or similar coding structure) of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 214 may be configured to perform motion vector prediction, as described above. Inter prediction processing unit 214 may be configured to generate a predictive block using the motion prediction data. For example, inter prediction processing unit 214 may locate a predictive video block within a frame buffer (not shown in FIG. 6). It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to entropy encoding unit 218. As illustrated in FIG. 6, inter prediction processing unit 214 may receive reconstructed video block via filter unit 216.

As described above, when the techniques provided in Chen are utilized with the motion interpolation filters provided in JVET-N1001, aliasing artifacts may occur. Referring to Table 1A and Table 2A above, the motion interpolation filter in JVET-N1001 does not constitute a low-pass filter and does not provide good quality when applied in a downsampling scenario. It should be noted that although for scaling ratios close to 1, the motion interpolation filter in JVET-N1001 may provide an acceptable result, for large scaling ratios, the result will show severe aliasing artifacts. It should be noted that according to the techniques herein, ARC can be realized with a two-step approach in which additional reference pictures are created by resampling existing reference pictures. The additional reference pictures may either be stored in the Decoded Picture Buffer (DBP) or in a temporary memory buffer. The filters described below may be used for a one-step ARC approach and/or a two-step ARC approach to provide additional reference pictures that do not suffer from aliasing artifacts.

In one example, one or more syntax elements is signaled in a parameter set or in a slice header to indicate which out of a predefined set of filter coefficients to use for interpolation filtering. By allowing such signaling, it is possible to adjust the encoding to use different filters for the same scaling ratio, for example depending on the characteristics of the content.

In one example, one or more thresholds are used to define or determine which filter coefficients to use for interpolation filtering. Such thresholds could, for example, either be predefined or signaled in a parameter set.

In one example, according to the techniques herein, if a downsampling factor is larger than 1.5:1, the following filter coefficients in Table 6A may be used for a luma sample interpolation filtering process:

TABLE 6A

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 0 | −5 | 4 | 37 | 56 | 37 | 4 | −5 | 0 |
| 1 | −5 | 3 | 34 | 57 | 39 | 6 | −5 | −1 |
| 2 | −5 | 2 | 32 | 57 | 41 | 7 | −5 | −1 |
| 3 | −4 | 1 | 30 | 56 | 42 | 9 | −5 | −1 |
| 4 | −4 | 0 | 28 | 55 | 45 | 11 | −5 | −2 |
| 5 | −4 | −1 | 25 | 55 | 47 | 13 | −5 | −2 |
| 6 | −3 | −2 | 23 | 53 | 48 | 15 | −4 | −2 |
| 7 | −3 | −3 | 21 | 53 | 50 | 17 | −4 | −3 |
| 8 | −3 | −4 | 19 | 52 | 52 | 19 | −4 | −3 |
| 9 | −3 | −4 | 17 | 50 | 53 | 21 | −3 | −3 |
| 10 | −2 | −4 | 15 | 48 | 53 | 23 | −2 | −3 |
| 11 | −2 | −5 | 13 | 47 | 55 | 25 | −1 | −4 |
| 12 | −2 | −5 | 11 | 45 | 55 | 28 | 0 | −4 |
| 13 | −1 | −5 | 9 | 42 | 56 | 30 | 1 | −4 |
| 14 | −1 | −5 | 7 | 41 | 57 | 32 | 2 | −5 |
| 15 | −1 | −5 | 6 | 39 | 57 | 34 | 3 | −5 |

It should be noted that for the example filter illustrated in Table 6A, the sum of the filter coefficients is 128. Thus, the resulting filtered value may be acquired by dividing by 128 or alternatively by bit shifting left by 7.

An alternative example set of filter coefficients is shown in Table 6B. In Table 6B, the sum of the filter coefficients is 64. Thus, the resulting filtered value may be acquired by dividing by 64 or alternatively by bit shifting left by 6.

TABLE 6B

| Fractional sample position p | interpolation filter coefficients ||||||||
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 0 | −2 | 2 | 18 | 28 | 18 | 2 | −2 | 0 |
| 1 | −2 | 1 | 17 | 28 | 19 | 3 | −2 | 0 |
| 2 | −2 | 1 | 16 | 28 | 20 | 4 | −2 | −1 |
| 3 | −2 | 0 | 15 | 28 | 21 | 5 | −2 | −1 |
| 4 | −2 | 0 | 14 | 28 | 22 | 5 | −2 | −1 |
| 5 | −2 | −1 | 13 | 28 | 23 | 6 | −2 | −1 |
| 6 | −2 | −1 | 12 | 27 | 24 | 7 | −2 | −1 |
| 7 | −2 | −1 | 11 | 26 | 25 | 8 | −2 | −1 |
| 8 | −1 | −2 | 9 | 26 | 26 | 9 | −2 | −1 |
| 9 | −1 | −2 | 8 | 25 | 26 | 11 | −1 | −2 |
| 10 | −1 | −2 | 7 | 24 | 27 | 12 | −1 | −2 |
| 11 | −1 | −2 | 6 | 23 | 28 | 13 | −1 | −2 |
| 12 | −1 | −2 | 5 | 22 | 28 | 14 | 0 | −2 |
| 13 | −1 | −2 | 5 | 21 | 28 | 15 | 0 | −2 |
| 14 | −1 | −2 | 4 | 20 | 28 | 16 | 1 | −2 |
| 15 | 0 | −2 | 3 | 19 | 28 | 17 | 1 | −2 |

It should be noted that the filters in Tables 6A and 6B may be referred to as 1.5 low scaling filters.

An alternative filter is provided in Table 6C. It should be noted that the filter coefficients provided in Table 6C have the effect of preserving higher frequencies better than the filters in Table 6A and 6B. That is, the filter provided in Table 6C can be said to be sharper than the filters provided in Table 6A and Table 6B and may, for example, provide better results for downsampling with a factor of 2.

TABLE 6C

| Fractional sample position p | interpolation filter coefficients ||||||||
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 0 | −3 | 1 | 19 | 30 | 19 | 1 | −3 | 0 |
| 1 | −3 | 0 | 18 | 31 | 20 | 1 | −3 | 0 |
| 2 | −2 | −1 | 16 | 31 | 21 | 2 | −3 | 0 |
| 3 | −2 | −1 | 15 | 30 | 22 | 3 | −3 | 0 |
| 4 | −2 | −2 | 14 | 30 | 24 | 4 | −3 | −1 |
| 5 | −2 | −2 | 12 | 30 | 25 | 5 | −3 | −1 |
| 6 | −2 | −2 | 11 | 29 | 26 | 6 | −3 | −1 |
| 7 | −1 | −3 | 10 | 28 | 27 | 7 | −3 | −1 |
| 8 | −1 | −3 | 8 | 28 | 28 | 8 | −3 | −1 |
| 9 | −1 | −3 | 7 | 27 | 28 | 10 | −3 | −1 |
| 10 | −1 | −3 | 6 | 26 | 29 | 11 | −2 | −2 |
| 11 | −1 | −3 | 5 | 25 | 30 | 12 | −2 | −2 |
| 12 | −1 | −3 | 4 | 24 | 30 | 14 | −2 | −2 |
| 13 | 0 | −3 | 3 | 22 | 30 | 15 | −1 | −2 |
| 14 | 0 | −3 | 2 | 21 | 31 | 16 | −1 | −2 |
| 15 | 0 | −3 | 1 | 20 | 31 | 18 | 0 | −3 |

Further, in one example, according to the techniques herein, additional or alternatively, if a downsampling factor is larger than 3:1, the following filter coefficients in Table 7A may be used a luma sample interpolation filtering process:

TABLE 7A

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 0 | 7 | 17 | 26 | 28 | 26 | 17 | 7 | 0 |
| 1 | 7 | 16 | 25 | 28 | 25 | 17 | 8 | 2 |
| 2 | 6 | 15 | 24 | 29 | 26 | 18 | 8 | 2 |
| 3 | 6 | 15 | 24 | 28 | 26 | 18 | 9 | 2 |
| 4 | 5 | 14 | 23 | 28 | 27 | 19 | 9 | 3 |
| 5 | 5 | 13 | 23 | 28 | 27 | 19 | 10 | 3 |
| 6 | 5 | 13 | 22 | 28 | 27 | 20 | 10 | 3 |
| 7 | 4 | 12 | 22 | 28 | 27 | 20 | 11 | 4 |
| 8 | 4 | 12 | 21 | 27 | 27 | 21 | 12 | 4 |
| 9 | 4 | 11 | 20 | 27 | 28 | 22 | 12 | 4 |
| 10 | 3 | 10 | 20 | 27 | 28 | 22 | 13 | 5 |
| 11 | 3 | 10 | 19 | 27 | 28 | 23 | 13 | 5 |
| 12 | 3 | 9 | 19 | 27 | 28 | 23 | 14 | 5 |
| 13 | 2 | 9 | 18 | 26 | 28 | 24 | 15 | 6 |
| 14 | 2 | 8 | 18 | 26 | 29 | 24 | 15 | 6 |
| 15 | 2 | 8 | 17 | 25 | 28 | 25 | 16 | 7 |

It should be noted that for the example filter in Table 7A, the sum of the filter coefficients is 128. Thus, the resulting filtered value may be acquired by dividing by 128 or alternatively by bit shifting left by 7.

An alternative example set of filter coefficients is shown in Table 7B. In Table 7B, the sum of the filter coefficients is 64. Thus, the resulting filtered value may be acquired by dividing by 64 or alternatively by bit shifting left by 6.

TABLE 7B

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 0 | 4 | 8 | 13 | 14 | 13 | 8 | 4 | 0 |
| 1 | 3 | 8 | 12 | 14 | 13 | 9 | 4 | 1 |
| 2 | 3 | 8 | 12 | 14 | 13 | 9 | 4 | 1 |
| 3 | 3 | 7 | 12 | 15 | 13 | 9 | 4 | 1 |
| 4 | 3 | 7 | 12 | 14 | 13 | 9 | 5 | 1 |
| 5 | 3 | 7 | 11 | 14 | 13 | 10 | 5 | 1 |
| 6 | 2 | 6 | 11 | 14 | 14 | 10 | 5 | 2 |
| 7 | 2 | 6 | 11 | 14 | 14 | 10 | 5 | 2 |
| 8 | 2 | 6 | 10 | 14 | 14 | 10 | 6 | 2 |
| 9 | 2 | 5 | 10 | 14 | 14 | 11 | 6 | 2 |
| 10 | 2 | 5 | 10 | 14 | 14 | 11 | 6 | 2 |
| 11 | 1 | 5 | 10 | 13 | 14 | 11 | 7 | 3 |
| 12 | 1 | 5 | 9 | 13 | 14 | 12 | 7 | 3 |
| 13 | 1 | 4 | 9 | 13 | 15 | 12 | 7 | 3 |
| 14 | 1 | 4 | 9 | 13 | 14 | 12 | 8 | 3 |
| 15 | 1 | 4 | 9 | 13 | 14 | 12 | 8 | 3 |

It should be noted that the filters in Tables 7A and 7B may be referred to as 3.0 high scaling filters.

Further, in one example, according to the techniques herein, additional or alternatively, if a downsampling factor is larger than 1.3:1, but smaller than 1.8:1, the following example filter coefficients in Table 7C may be used for a luma sample interpolation filtering process. It should be noted that the filter in Table 7C may be referred to as a 1.8 medium scaling filter.

TABLE 7C

| Fractional sample position p | interpolation filter coefficients |  |  |  |  |  |  |  |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 0 | −1 | −5 | 17 | 42 | 17 | −5 | −1 | 0 |
| 1 | 0 | −5 | 15 | 41 | 19 | −5 | −1 | 0 |
| 2 | 0 | −5 | 13 | 40 | 21 | −4 | −1 | 0 |
| 3 | 0 | −5 | 11 | 39 | 24 | −4 | −2 | 1 |
| 4 | 0 | −5 | 9 | 38 | 26 | −3 | −2 | 1 |
| 5 | 0 | −5 | 7 | 38 | 28 | −2 | −3 | 1 |
| 6 | 1 | −5 | 5 | 36 | 30 | −1 | −3 | 1 |
| 7 | 1 | −4 | 3 | 35 | 32 | 0 | −4 | 1 |
| 8 | 1 | −4 | 2 | 33 | 33 | 2 | −4 | 1 |
| 9 | 1 | −4 | 0 | 32 | 35 | 3 | −4 | 1 |
| 10 | 1 | −3 | −1 | 30 | 36 | 5 | −5 | 1 |
| 11 | 1 | −3 | −2 | 28 | 38 | 7 | −5 | 0 |
| 12 | 1 | −2 | −3 | 26 | 38 | 9 | −5 | 0 |
| 13 | 1 | −2 | −4 | 24 | 39 | 11 | −5 | 0 |
| 14 | 0 | −1 | −4 | 21 | 40 | 13 | −5 | 0 |
| 15 | 0 | −1 | −5 | 19 | 41 | 15 | −5 | 0 |

That is, according to the techniques herein, a luma sample interpolation filtering process may conditionally select and utilize filter coefficients for a luma sample interpolation filtering process based on a downsampling factor. In particular, the luma sample interpolation filtering described in JVET-N1001 may be modified to conditionally utilize filter coefficients included in Table 1A, Tables 6A-6B, and/or Tables 7A-7B based on whether a downsampling factor is larger than 1.5:1 and/or larger than 3:1. Further, the luma sample interpolation filtering described in JVET-O2001 may be modified to conditionally utilize filter coefficients included in Tables 1B-1C, Tables 6A-6B, and/or Tables 7A-7B based on whether a downsampling factor is larger than 1.8:1 and/or larger than 3:1. It should be noted that both of the example filters in Table 6A and Table 7A are integer versions of Lanczos filters for scaling factors 2:1 and 4:1, with cut-off frequencies of 0.9a and 0.8a, respectively. Further, either of the luma sample interpolation filtering described in JVET-N1001 or JVET-O2001 may be modified to conditionally utilize filter coefficients included in Table 7C based on whether a downsampling factor is larger than 1.3:1, but smaller than 1.8:1. It should be noted that the example in Table 7C is an integer version of a Lanczos filter for scaling factor 1.5:1 with cut-off frequency of 0.95a.

In one example, according to the techniques herein, if a downsampling factor is larger than 1.5:1, the following filter coefficients in Table 8A may be used for a chroma sample interpolation filtering process:

TABLE 8A

| Fractional sample position p | interpolation filter coefficients |  |  |  |
|---|---|---|---|---|
| | $f_C[p][0]$ | $f_C[p][1]$ | $f_C[p][2]$ | $f_C[p][3]$ |
| 0 | 32 | 64 | 32 | 0 |
| 1 | 30 | 64 | 33 | 1 |
| 2 | 28 | 64 | 35 | 1 |
| 3 | 27 | 63 | 36 | 2 |
| 4 | 25 | 64 | 37 | 2 |
| 5 | 24 | 63 | 39 | 2 |
| 6 | 22 | 63 | 40 | 3 |
| 7 | 21 | 62 | 42 | 3 |
| 8 | 20 | 61 | 43 | 4 |
| 9 | 18 | 60 | 45 | 5 |
| 10 | 17 | 60 | 46 | 5 |
| 11 | 16 | 59 | 47 | 6 |

TABLE 8A-continued

| Fractional sample position p | interpolation filter coefficients |  |  |  |
|---|---|---|---|---|
| | $f_C[p][0]$ | $f_C[p][1]$ | $f_C[p][2]$ | $f_C[p][3]$ |
| 12 | 15 | 58 | 48 | 7 |
| 13 | 13 | 57 | 50 | 8 |
| 14 | 12 | 56 | 52 | 8 |
| 15 | 11 | 55 | 53 | 9 |
| 16 | 10 | 54 | 54 | 10 |
| 17 | 9 | 53 | 55 | 11 |
| 18 | 8 | 52 | 56 | 12 |
| 19 | 8 | 50 | 57 | 13 |
| 20 | 7 | 48 | 58 | 15 |
| 21 | 6 | 47 | 59 | 16 |
| 22 | 5 | 46 | 60 | 17 |
| 23 | 5 | 45 | 60 | 18 |
| 24 | 4 | 43 | 61 | 20 |
| 25 | 3 | 42 | 62 | 21 |
| 26 | 3 | 40 | 63 | 22 |
| 27 | 2 | 39 | 63 | 24 |
| 28 | 2 | 37 | 64 | 25 |
| 29 | 2 | 36 | 63 | 27 |
| 30 | 1 | 35 | 64 | 28 |
| 31 | 1 | 33 | 64 | 30 |

It should be noted that for the filter in Table 8A, the sum of the filter coefficients is 128. Thus, the resulting filtered value may be acquired by dividing by 128 or alternatively by bit shifting left by 7.

An example alternative set of filter coefficients is shown in Table 8B. In Table 8B, the sum of the filter coefficients is 64. Thus, the resulting filtered value may be acquired by dividing by 64 or alternatively by bit shifting left by 6.

TABLE 8B

| Fractional sample position p | interpolation filter coefficients |  |  |  |
|---|---|---|---|---|
| | $f_C[p][0]$ | $f_C[p][1]$ | $f_C[p][2]$ | $f_C[p][3]$ |
| 0 | 16 | 32 | 16 | 0 |
| 1 | 15 | 32 | 16 | 1 |
| 2 | 14 | 32 | 17 | 1 |
| 3 | 13 | 32 | 18 | 1 |
| 4 | 13 | 31 | 19 | 1 |
| 5 | 12 | 32 | 19 | 1 |
| 6 | 11 | 32 | 20 | 1 |
| 7 | 10 | 31 | 21 | 2 |
| 8 | 10 | 30 | 22 | 2 |

TABLE 8B-continued

| Fractional sample position p | interpolation filter coefficients | | | |
|---|---|---|---|---|
| | $f_C[p][0]$ | $f_C[p][1]$ | $f_C[p][2]$ | $f_C[p][3]$ |
| 9 | 9 | 30 | 23 | 2 |
| 10 | 8 | 30 | 23 | 3 |
| 11 | 8 | 29 | 24 | 3 |
| 12 | 7 | 29 | 25 | 3 |
| 13 | 7 | 28 | 25 | 4 |
| 14 | 6 | 28 | 26 | 4 |
| 15 | 6 | 27 | 26 | 5 |
| 16 | 5 | 27 | 27 | 5 |
| 17 | 5 | 26 | 27 | 6 |
| 18 | 4 | 26 | 28 | 6 |
| 19 | 4 | 25 | 28 | 7 |
| 20 | 3 | 25 | 29 | 7 |
| 21 | 3 | 24 | 29 | 8 |
| 22 | 3 | 23 | 30 | 8 |
| 23 | 2 | 23 | 30 | 9 |
| 24 | 2 | 22 | 30 | 10 |
| 25 | 2 | 21 | 31 | 10 |
| 26 | 1 | 20 | 32 | 11 |
| 27 | 1 | 19 | 32 | 12 |
| 28 | 1 | 19 | 31 | 13 |
| 29 | 1 | 18 | 32 | 13 |
| 30 | 1 | 17 | 32 | 14 |
| 31 | 1 | 16 | 32 | 15 |

It should be noted that the filters in Tables 8A and 8B may be referred to as 1.5 low scaling filters.

In one example, according to the techniques herein, if a downsampling factor is larger than 3:1, the following filter coefficients in Table 9A may be used for a chroma sample interpolation filtering process.

TABLE 9A

| Fractional sample position p | interpolation filter coefficients | | | |
|---|---|---|---|---|
| | $f_C[p][0]$ | $f_C[p][1]$ | $f_C[p][2]$ | $f_C[p][3]$ |
| 0 | 38 | 52 | 38 | 0 |
| 1 | 34 | 49 | 36 | 9 |
| 2 | 33 | 49 | 36 | 10 |
| 3 | 32 | 48 | 37 | 11 |
| 4 | 31 | 48 | 38 | 11 |
| 5 | 30 | 48 | 38 | 12 |
| 6 | 29 | 48 | 38 | 13 |
| 7 | 28 | 47 | 39 | 14 |
| 8 | 27 | 47 | 40 | 14 |
| 9 | 27 | 46 | 40 | 15 |
| 10 | 26 | 46 | 40 | 16 |
| 11 | 25 | 46 | 41 | 16 |
| 12 | 24 | 45 | 42 | 17 |
| 13 | 23 | 45 | 42 | 18 |
| 14 | 22 | 44 | 43 | 19 |
| 15 | 21 | 44 | 43 | 20 |
| 16 | 20 | 44 | 44 | 20 |
| 17 | 20 | 43 | 44 | 21 |
| 18 | 19 | 43 | 44 | 22 |
| 19 | 18 | 42 | 45 | 23 |
| 20 | 17 | 42 | 45 | 24 |
| 21 | 16 | 41 | 46 | 25 |
| 22 | 16 | 40 | 46 | 26 |
| 23 | 15 | 40 | 46 | 27 |
| 24 | 14 | 40 | 47 | 27 |
| 25 | 14 | 39 | 47 | 28 |
| 26 | 13 | 38 | 48 | 29 |
| 27 | 12 | 38 | 48 | 30 |
| 28 | 11 | 38 | 48 | 31 |
| 29 | 11 | 37 | 48 | 32 |
| 30 | 10 | 36 | 49 | 33 |
| 31 | 9 | 36 | 49 | 34 |

It should be noted that for the example filter in Table 9A, the sum of the filter coefficients is 128. Thus, the resulting filtered value may be acquired by dividing by 128 or alternatively by bit shifting left by 7.

An alternative example set of filter coefficients is shown in Table 9B. In Table 9B, the sum of the filter coefficients is 64. Thus, the resulting filtered value may be acquired by dividing by 64 or alternatively by bit shifting left by 6.

TABLE 9B

| Fractional sample position p | interpolation filter coefficients | | | |
|---|---|---|---|---|
| | $f_C[p][0]$ | $f_C[p][1]$ | $f_C[p][2]$ | $f_C[p][3]$ |
| 0 | 19 | 26 | 19 | 0 |
| 1 | 17 | 24 | 18 | 5 |
| 2 | 17 | 24 | 18 | 5 |
| 3 | 16 | 24 | 19 | 5 |
| 4 | 15 | 24 | 19 | 6 |
| 5 | 15 | 24 | 19 | 6 |
| 6 | 15 | 24 | 19 | 6 |
| 7 | 14 | 24 | 19 | 7 |
| 8 | 14 | 23 | 20 | 7 |
| 9 | 13 | 23 | 20 | 8 |
| 10 | 13 | 23 | 20 | 8 |
| 11 | 12 | 23 | 21 | 8 |
| 12 | 12 | 22 | 21 | 9 |
| 13 | 12 | 22 | 21 | 9 |
| 14 | 11 | 22 | 21 | 10 |
| 15 | 11 | 22 | 21 | 10 |
| 16 | 10 | 22 | 22 | 10 |
| 17 | 10 | 21 | 22 | 11 |
| 18 | 10 | 21 | 22 | 11 |
| 19 | 9 | 21 | 22 | 12 |
| 20 | 9 | 21 | 22 | 12 |
| 21 | 8 | 21 | 23 | 12 |
| 22 | 8 | 20 | 23 | 13 |
| 23 | 8 | 20 | 23 | 13 |
| 24 | 7 | 20 | 23 | 14 |
| 25 | 7 | 19 | 24 | 14 |
| 26 | 6 | 19 | 24 | 15 |
| 27 | 6 | 19 | 24 | 15 |
| 28 | 6 | 19 | 24 | 15 |
| 29 | 5 | 19 | 24 | 16 |
| 30 | 5 | 18 | 24 | 17 |
| 31 | 5 | 18 | 24 | 17 |

It should be noted that the filters in Tables 9A and 9B may be referred to as 3.0 high scaling filters.

Further, in one example, according to the techniques herein, additional or alternatively, if a downsampling factor is larger than 1.3:1, but smaller than 1.8:1, the following filter coefficients in Table 9C may be used for a luma sample interpolation filtering process. It should be noted that the filter in Table 9C may be referred to as a 1.8 medium scaling filter.

TABLE 9C

| Fractional sample position p | interpolation filter coefficients | | | |
|---|---|---|---|---|
| | $f_C[p][0]$ | $f_C[p][1]$ | $f_C[p][2]$ | $f_C[p][3]$ |
| 0 | 12 | 40 | 12 | 0 |
| 1 | 11 | 40 | 13 | 0 |
| 2 | 10 | 40 | 15 | −1 |
| 3 | 9 | 40 | 16 | −1 |
| 4 | 8 | 40 | 17 | −1 |
| 5 | 8 | 39 | 18 | −1 |
| 6 | 7 | 39 | 19 | −1 |
| 7 | 6 | 38 | 21 | −1 |
| 8 | 5 | 38 | 22 | −1 |
| 9 | 4 | 38 | 23 | −1 |

TABLE 9C-continued

| Fractional sample position p | interpolation filter coefficients | | | |
|---|---|---|---|---|
| | $f_C[p][0]$ | $f_C[p][1]$ | $f_C[p][2]$ | $f_C[p][3]$ |
| 10 | 4 | 37 | 24 | −1 |
| 11 | 3 | 36 | 25 | 0 |
| 12 | 3 | 35 | 26 | 0 |
| 13 | 2 | 34 | 28 | 0 |
| 14 | 2 | 33 | 29 | 0 |
| 15 | 1 | 33 | 30 | 0 |
| 16 | 1 | 31 | 31 | 1 |
| 17 | 0 | 30 | 33 | 1 |
| 18 | 0 | 29 | 33 | 2 |
| 19 | 0 | 28 | 34 | 2 |
| 20 | 0 | 26 | 35 | 3 |
| 21 | 0 | 25 | 36 | 3 |
| 22 | −1 | 24 | 37 | 4 |
| 23 | −1 | 23 | 38 | 4 |
| 24 | −1 | 22 | 38 | 5 |
| 25 | −1 | 21 | 38 | 6 |
| 26 | −1 | 19 | 39 | 7 |
| 27 | −1 | 18 | 39 | 8 |
| 28 | −1 | 17 | 40 | 8 |
| 29 | −1 | 16 | 40 | 9 |
| 30 | −1 | 15 | 40 | 10 |
| 31 | 0 | 13 | 40 | 11 |

That is, according to the techniques herein, a chroma sample interpolation filtering process may conditionally select and utilize filter coefficients for a chroma sample interpolation filtering process based on a downsampling factor. In particular, the chroma sample interpolation filtering described in JVET-N1001 may be modified to conditionally utilize filter coefficients included in Table 2A, Tables 8A-8B, and/or Tables 9A-9B based on whether a downsampling factor is larger than 1.5:1 and/or larger than 3:1. Further, the luma sample interpolation filtering described in JVET-O2001 may be modified to conditionally utilize filter coefficients included in Table 2A, Tables 8A-8B, and/or Tables 9A-9B based on whether a downsampling factor is larger than 1.5:1 and/or larger than 3:1. Further, either of the chroma sample interpolation filtering described in JVET-N1001 or JVET-O2001 may be modified to conditionally utilize filter coefficients included in Table 9C based on whether a downsampling factor is larger than 1.3:1, but smaller than 1.8:1. It should be noted that according to the techniques herein, filter coefficients for a luma sample interpolation filtering process and/or a chroma sample interpolation filtering process based on a downsampling factor.

That is, in one example, filter coefficients for a luma sample interpolation filtering process and a chroma sample interpolation filtering process may be based on a downsampling factor as follows:

If downsampling factor<1.5, use typical case interpolation filters;
  Else if downsampling factor>3.0, use 3.0 high scaling interpolation filters;
  Else use 1.5 low scaling interpolation filters.
OR
If downsampling factor<1.3, use typical case interpolation filters;
  Else if downsampling factor>1.8, use 3.0 high scaling interpolation filters;
  Else use 1.8 medium scaling interpolation filters.
If downsampling factor>3, use 3.0 high scaling interpolation filter;
  Else if downsampling filter>1.8, use 1.8 medium scaling interpolation filter;
  Else if downsampling filter>1.3, use 1.5 low scaling interpolation filter;
  Else, use typical case interpolation filter.

It should be noted that in general, according to the techniques herein, various downsampling factor thresholds may be defined and/or signaled for use in applying various levels of scaling interpolation filters.

As described above, in JVET-O2001, affine and half-pel AMVR inter prediction modes uses 6-tap filters for the interpolation filtering. According to the techniques herein, when one or both of these two inter prediction modes are used with ARC, in some instances, it may be desirable to use 6-tap filters adjusted for ARC. In one example, such filters adjusted could be implemented according to example Tables 9D-9F, where the example filter in Table 9D is optimized for a 1.5:1 scaling factor, the example filter in Table 9E is optimized for a 2:1 scaling factor, and the example filter in Table 9F is optimized for a 4× scaling factor. That is, in one example, according to the techniques herein, the luma sample interpolation filtering described in JVET-O2001 may be modified to conditionally utilize filter coefficients included in Table 1C, Table 9D, Table 9E, and/or Table 9F for affine mode based on a scaling factor and/or may be modified to conditionally utilize filter coefficients included in Table 1B, Table 9D, Table 9E, and/or Table 9F for half-Del AMVR based on a scaling factor.

TABLE 9D

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 0 | 0 | −3 | 15 | 40 | 15 | −3 | 0 | 0 |
| 1 | 0 | −3 | 13 | 39 | 18 | −3 | 0 | 0 |
| 2 | 0 | −3 | 11 | 39 | 20 | −3 | 0 | 0 |
| 3 | 0 | −3 | 9 | 40 | 22 | −3 | −1 | 0 |
| 4 | 0 | −3 | 8 | 38 | 24 | −2 | −1 | 0 |
| 5 | 0 | −3 | 6 | 37 | 26 | −1 | −1 | 0 |
| 6 | 0 | −3 | 4 | 36 | 29 | −1 | −1 | 0 |
| 7 | 0 | −2 | 3 | 34 | 31 | 0 | −2 | 0 |
| 8 | 0 | −2 | 1 | 33 | 33 | 1 | −2 | 0 |
| 9 | 0 | −2 | 0 | 31 | 34 | 3 | −2 | 0 |
| 10 | 0 | −1 | −1 | 29 | 36 | 4 | −3 | 0 |
| 11 | 0 | −1 | −1 | 26 | 37 | 6 | −3 | 0 |
| 12 | 0 | −1 | −2 | 24 | 38 | 8 | −3 | 0 |
| 13 | 0 | −1 | −3 | 22 | 40 | 9 | −3 | 0 |

TABLE 9D-continued

| Fractional sample position p | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
|---|---|---|---|---|---|---|---|---|
| 14 | 0 | 0 | −3 | 20 | 39 | 11 | −3 | 0 |
| 15 | 0 | 0 | −3 | 18 | 39 | 13 | −3 | 0 |

TABLE 9E

| Fractional sample position p | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
|---|---|---|---|---|---|---|---|---|
| 0  | 0 | 2  | 16 | 28 | 16 | 2  | 0  | 0 |
| 1  | 0 | 1  | 16 | 28 | 18 | 2  | −1 | 0 |
| 2  | 0 | 1  | 14 | 28 | 19 | 3  | −1 | 0 |
| 3  | 0 | 0  | 13 | 28 | 20 | 4  | −1 | 0 |
| 4  | 0 | 0  | 12 | 28 | 21 | 4  | −1 | 0 |
| 5  | 0 | 0  | 11 | 27 | 22 | 5  | −1 | 0 |
| 6  | 0 | −1 | 10 | 27 | 23 | 6  | −1 | 0 |
| 7  | 0 | −1 | 9  | 26 | 24 | 7  | −1 | 0 |
| 8  | 0 | −1 | 8  | 25 | 25 | 8  | −1 | 0 |
| 9  | 0 | −1 | 7  | 24 | 26 | 9  | −1 | 0 |
| 10 | 0 | −1 | 6  | 23 | 27 | 10 | −1 | 0 |
| 11 | 0 | −1 | 5  | 22 | 27 | 11 | 0  | 0 |
| 12 | 0 | −1 | 4  | 21 | 28 | 12 | 0  | 0 |
| 13 | 0 | −1 | 4  | 20 | 28 | 13 | 0  | 0 |
| 14 | 0 | −1 | 3  | 19 | 28 | 14 | 1  | 0 |
| 15 | 0 | −1 | 2  | 18 | 28 | 16 | 1  | 0 |

TABLE 9F

| Fractional sample position p | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
|---|---|---|---|---|---|---|---|---|
| 0  | 0 | 8 | 15 | 18 | 15 | 8  | 0 | 0 |
| 1  | 0 | 7 | 14 | 18 | 15 | 8  | 2 | 0 |
| 2  | 0 | 7 | 13 | 17 | 15 | 9  | 3 | 0 |
| 3  | 0 | 7 | 13 | 17 | 15 | 9  | 3 | 0 |
| 4  | 0 | 6 | 13 | 17 | 16 | 9  | 3 | 0 |
| 5  | 0 | 6 | 12 | 17 | 16 | 10 | 3 | 0 |
| 6  | 0 | 5 | 12 | 17 | 16 | 10 | 4 | 0 |
| 7  | 0 | 5 | 12 | 16 | 16 | 11 | 4 | 0 |
| 8  | 0 | 5 | 11 | 16 | 16 | 11 | 5 | 0 |
| 9  | 0 | 4 | 11 | 16 | 16 | 12 | 5 | 0 |
| 10 | 0 | 4 | 10 | 16 | 17 | 12 | 5 | 0 |
| 11 | 0 | 3 | 10 | 16 | 17 | 12 | 6 | 0 |
| 12 | 0 | 3 | 9  | 16 | 17 | 13 | 6 | 0 |
| 13 | 0 | 3 | 9  | 15 | 17 | 13 | 7 | 0 |
| 14 | 0 | 3 | 9  | 15 | 17 | 13 | 7 | 0 |
| 15 | 0 | 2 | 8  | 15 | 18 | 14 | 7 | 0 |

In one example, selection of interpolation filter coefficients for affine mode and/or half-pel AMVR may be as follows:

If downsampling factor<1.3, use typical case interpolation filters;
  Else if downsampling factor>3, use Table 9F;
  Else if downsampling factor>1.8, use Table 9E;
  Else use Table 9D.

It should be noted that in general, according to the techniques herein, various downsampling factor thresholds may be defined and/or signaled for use in applying various levels of scaling interpolation filters for cases of affine mode and/or half-pel AMVR.

As described above, JVET-N0279, proposes a process for determining corresponding positions in reference pictures of different resolution with a fixed-point representation of the scaling factor. According to the techniques herein, the different motion compensation interpolation filters described above in Tables 1A-2B and Tables 6A-9F may be conditionally used depending on the scaling factor in conjunction with the ARC process described in WET-N0279. That is, for example, using the fixed-point precision from JVET-N0279, where scaling factor values have 14 binary decimals, the proposed thresholds would be 24576 (for 1.5:1) and 49152 (for 3:1), respectively. Thus, according to the techniques herein, in addition to the derivation of the full-pel and fractional-pel location proposed in JVET-N0279, the following may be added to the scaling process for luma in JVET-N0279.

If scale_fp>49152, luma interpolation filter coefficients $f_L[p]$ for each 1/16 fractional sample position p equal to xFrac$_L$ or yFrac$_L$ are specified in Table 7A.

Otherwise, if scale_fp>24576, luma interpolation filter coefficients $f_L[p]$ for each 1/16 fractional sample position p equal to xFrac$_L$ or yFrac$_L$ are specified in Table 6.

Otherwise, luma interpolation filter coefficients $f_C[p]$ for each 1/16 fractional sample position p equal to xFrac$_L$ or yFrac$_L$ are specified in Table 1A.

And/or
the following may be added to the scaling process for chroma in NET-N0279:

If scale_fp>49152, chroma interpolation filter coefficients $f_C[p]$ for each 1/32 fractional sample position p equal to xFrac$_C$ or yFrac$_C$ are specified in Table 9A.

Otherwise, if scalefp>24576, chroma interpolation filter coefficients $f_C[p]$ for each 1/16 fractional sample position p equal to xFrac$_C$ or yFrac are specified in Table 8.

Otherwise, Chroma Interpolation Filter Coefficients $f_C[p]$ for Each 1/16 Fractional Sample position p equal to xFrac$_C$ or yFrac$_C$ are specified in Table 2A.

In another example,

If scale_fp>49152, chroma interpolation filter coefficients $f_C[p]$ for each 1/16 fractional sample position p equal to xFrac$_C$ or yFrac$_C$ are specified in Table 9A.

Otherwise, if scale_fp>24576, chroma interpolation filter coefficients $f_C[p]$ for each 1/16 fractional sample position p equal to xFrac$_C$ or yFrac$_C$ are specified in Table 8.

Otherwise, chroma interpolation filter coefficients $f_C[p]$ for each 1/16 fractional sample position p equal to xFrac$_C$ or yFrac$_C$ are specified in Table 2A.

Where scale_fp is the fixed-point scaling factor for the respective direction (horizontal or vertical).

Referring again to FIG. 6, filter unit 216 receives reconstructed video blocks and coding parameters and outputs modified reconstructed video data. Filter unit 216 may be configured to perform deblocking, Sample Adaptive Offset (SAO) filtering, Adaptively Loop Filtering (ALF), etc. SAO filtering is a non-linear amplitude mapping that may be used to improve reconstruction by adding an offset to reconstructed video data. It should be noted that as illustrated in FIG. 5, intra prediction processing unit 212 and inter prediction processing unit 214 may receive modified reconstructed video block via filter unit 216. Entropy encoding unit 218 receives quantized transform coefficients and predictive syntax data (i.e., intra prediction data and motion prediction data). Entropy encoding unit 218 may be configured to perform entropy encoding according to one or more of the techniques described herein. In this manner, video encoder 200 represents an example of a device configured to determine an adaptive resolution scaling factor and determine a motion compensation interpolation filter based on the adaptive resolution scaling factor according to one or more techniques of this disclosure.

As described above, Chen, describes signaling adaptive resolution change in parameter sets. The signaling of adaptive resolution change in Chen may be less than ideal. In one example, according to the techniques herein, syntax elements pic_width_in_luma_samples and pic_height_in_luma_samples in a SPS syntax structure may be respectively replaced with syntax elements pic_width_unit_minus1 and pic_height_unit_minus1 and syntax elements max_pic_width_in_pic_width_units_minus1 and max_pic_height_in_pic_height_units_minus1 may be added to a SPS syntax structure, as provided in Table 10.

TABLE 10

| | Descriptor |
|---|---|
| seq_parameter_set_rbsp( ) { | |
| ... | |
| pic_width_unit_minus1 | ue(v) |
| pic_height_unit_minus1 | ue(v) |
| max_pic_width_in_pic_width_units_minus1 | ue(v) |
| max_pic_height_in_pic_height_units_minus1 | ue(v) |
| ... | |
| } | |

With respect to Table 10, in one example, the semantics of pic_width_unit_minus1 pic_height_unit_minus1, max_pic_width_in_pic_width_units_minus1 and max_pic_height_in_pic_height_units_minus1 may be based on the following:

pic_width_unit_minus1 plus 1 specifies the unit used to signal width related syntax elements.

pic_height_unit_minus1 plus 1 specifies the unit used to signal height related syntax elements.

max_pic_width_in_pic_width_units_minus1 plus 1 specifies the maximum width of decoded pictures referring to the SPS in units of ((pic_width_unit_minus1+1)*MinCbSizeY) luma samples.

max_pic_height_in_pic_height_units_minus1 plus 1 specifies the maximum height of decoded pictures referring to the SPS in units of ((pic_height_unit_minus1+1)*MinCbSizeY) luma samples.

Further, according to the techniques herein, in one example, the syntax provided in Table 11 may be added to a PPS syntax structure:

TABLE 11

| | Descriptor |
|---|---|
| pic_parameter_set_rbsp( ) { | |
| ... | |
| pic_size_different_from_max_flag | u(1) |
| if (pic_size_different_from_max_flag) { | |
| pic_width_in_pic_width_units_minus1 | ue(v) |
| pic_height_in_pic_height_unit_minus1 | ue(v) |
| } | |
| ... | |
| } | |

With respect to Table 11, in one example, the semantics of pic_size_different_from_max_flag, pic_width_in_pic_width units minus1, and pic_height_in_luma_samples_pic_height_unit_minus1 may be based on the following:

pic_size_different_from_max_flag equal to 1 specifies that the PPS signals different picture width or picture height from the max_pic_width_in_pic_width_units_minus1 and max_pic_height_in_pic_height_units_minus1 in the referred SPS. pic_size_different_from_max_flag equal to 0 specifies that pic_width_in_pic_width_units_minus1 and pic_height_in_pic_height_unit_minus1 are the same as max_pic_width_in_pic_width_units_minus1 and max_pic_height_in_pic_height units_minus1 in the referred SPS.

pic_width_in_pic_width_units_minus1 specifies the width of each decoded picture in units of ((pic_width_unit_minus1+1)*MinCbSizeY) luma samples. When pic_width_in_pic_width_units_minus1 is not present, it is inferred to be equal to max_pic_width_in_pic_width_units_minus1 pic_height_in_pic_height_unit_minus1 specifies the height of each decoded picture in units of ((pic_height_unit_minus1+1)*MinCbSizeY) luma samples. When pic_height_in_pic_width_units_minus1 is not present, it is inferred to be equal to max_pic_height_in_pic_height_units_minus1.

It is a requirement of bitstream conformance that horizontal and vertical scaling ratios shall be in the range of 1/8 to 2, inclusive for every active reference picture. The scaling ratios are defined as follows:

horizontal_scaling_ratio=(((reference_pic_width_in_pic_width_units_minus1+1)<<14)+

((pic_width_in_pic_width_units_minus1+1)/2))/ pic_width_in_(pic_width_units_minus1+1)

vertical_scaling_ratio=(((reference_pic_height_in_pic_height_units_minus1+1)<<14)+

((pic_height_in_pic_height_units_minus1+1)/2))/ (pic_height_in_pic_height_units_minus1+1)

Further, in one example, a single pic_size_unit syntax element may be added instead of two new syntax elements. That is, the width and height may be specified according to a single syntax element, an example of this is illustrated in Table 11A.

TABLE 11A

| | Descriptor |
|---|---|
| seq_parameter_set_rbsp( ) { | |
| ... | |
| pic_size_unit | ue(v) |
| max_pic_width_in_pic_size_units_minus1 | ue(v) |
| max_pic_height_in_pic_size_units_minus1 | ue(v) |
| ... | |
| } | | pic_size_unit specifies the unit used to signal syntax elements related to width and height. pic_size_unit shall not be equal to 0 and shall be an integer multiple of MinCbSizeY.

max_pic_width_inpic_size_units_minus1 plus 1 specifies the maximum width of decoded pictures referring to the SPS in units of pic_size_unit luma samples.

max_pic_height_in_pic_size_units_minus1 plus 1 specifies the maximum height of decoded pictures referring to the SPS in units of pic_size_unit luma samples.

Further, in one example, a single pic_size_unit_minus1 syntax element may be added instead of two new syntax elements. That is, the width and height may be specified according to a single syntax element, an example of this is illustrated in Table 11B.

TABLE 11B

| | Descriptor |
|---|---|
| seq_parameter_set_rbsp( ) { | |
| ... | |
| pic_size_unit_minus1 | ue(v) |
| max_pic_width_in_pic_size_units_minus1 | ue(v) |
| max_pic_height_in_pic_size_units_minus1 | ue(v) |
| ... | |
| } | | pic_size_unit_minus1 plus 1 specifies the unit used to signal syntax elements related to width and height. pic_size_unit_minus1 plus 1 shall be an integer multiple of MinCbSizeY.

The variable PicSizeUnit is derived as follows:

PicSizeUnit=(pic_size_unit_minus1+1)

max_pic_width_in_pic_size_units_minus1 plus 1 specifies the maximum width of decoded pictures referring to the SPS in units of PicSizeUnit luma samples.

max_pic_height_in_pic_size_units_minus1 plus 1 specifies the maximum height of decoded pictures referring to the SPS in units of PicSizeUnit luma samples.

In a further variant, the pic-size-unit-minus1 may be defined with following semantics:

pic_size_unit_minus1 plus 1 specifies the unit used to signal syntax elements related to width and height.

The variable PicSizeUnit is derived as follows:

PicSizeUnit=(pic_size_unit_minus1+1)*MinCbSize$Y$

In one example, the picture width and height may be indicated using minus one coding and in units of MinCbSizeY samples. In one example, any of the syntax element provided above and indicated as having ue(v) coding may be instead use u(v) coding based on profile, tier, level size limits.

In one example, according to the techniques herein, the scaling ratio may be signaled explicitly, e.g., by signaling the floating point ratio. In one example, according to the techniques herein, the syntax provided in Table 12 may be added to a PPS syntax structure:

TABLE 12

| | Descriptor |
|---|---|
| pic_parameter_set_rbsp( ) { | |
| ... | |
| pic_size_different_from_max_flag | u(1) |
| if (pic_size_different_from_max_flag) { | |
| horizontal_scaling_ratio_fp | ue(v) |
| vertical_scaling_ratio_fp | ue(v) |
| } | |
| ... | |
| } | |

With respect to Table 12, in one example, the semantics of pic_size_different_from_max_flag, horizontal_scaling_ratio_fp, and vertical_scaling_ratio_fp may be based on the following:

pic_size_different_from_max_flag equal to 1 specifies that the PPS signals different picture width or picture height from the maximum picture width and maximum picture height (e.g. max_pic_width_in_pic_width_units_minus1 and max_pie_height_in_pic_heightunits_minus1) specified in the referred SPS. pic_size_different_from_max_flag equal to 0 specifies that picture width and picture height of the picture to which this PPS applies are the same as maximum picture width and maximum picture height (e.g. max_pic_width_in_pic_width_units_minus1 and max_pic_height_in_pic_height_units_minus1) specified in the referred SPS.

horizontal_scaling_ratio_fp specifies a fixed point or a floating point scaling ratio which when multiplied by maximum width of decoded picture signalled in the SPS specifies the width of the picture that refers to this PPS.

vertical_scaling_ratio_fp specifies a fixed point or a floating point scaling ratio which when multiplied by maximum height of decoded picture signalled in the SPS specifies the height of the picture that refers to this PPS.

In one example, according to the techniques herein, the scaling ratio may be signaled explicitly, e.g., by signaling the numerator and denominator of the ratio. In one example, according to the techniques herein, the syntax provided in Table 13 may be added to a PPS syntax structure:

TABLE 13

| | Descriptor |
|---|---|
| pic_parameter_set_rbsp( ) { | |
| ... | |
|   pic_size_different_from_max_flag | u(1) |
|   if (pic_size_different_from_max_flag) { | |
|     horizontal_scaling_ratio_numerator_minus1 | ue(v) |
|     horizontal_scaling_ratio_denominator_minus1 | ue(v) |
|     vertical_scaling_ratio_numerator_minus1 | ue(v) |
|     vertical_scaling_ratio_denominator_minus1 | ue(v) |
|   } | |
| ... | |
| } | |

With respect to Table 13, in one example, the semantics of pic_size_different_from_max_flag, horizontal_scaling_ratio_numerator_minus1, horizontal_scaling_ratio_denominator_minus1, verlical_scaling_ratio_numerator_minus1, and vertical_scaling_ratio_denominator_minus1 may be based on the following:

pic_size_different_from_max_flag equal to 1 specifies that the PPS signals different picture width or picture height from the maximum picture width and maximum picture height (e.g. max_pic_width_in_pic_width_units_minus1 and max_pic_height_in_pic_height_units_minus1) specified in the referred SPS. Pic_size_different_from_max_flag equal to 0 specifies that picture width and picture height of the picture to which this PPS applies are the same as maximum picture width and maximum picture height (e.g. max_pic_width_in_pic_width units_minus1 and max_pic_height_in_pic_height_units_minus1) specified in the referred SPS.

horizontal_scaling_ratio_numerator_minus1 plus1 specifies a numerator of a fixed point or a floating point scaling ratio which when multiplied by maximum width of decoded picture signalled in the SPS specifies the width of the picture that refers to this PPS.

horizontal_scaling_ratio_denominator_minus1 plus1 specifies a denominator of a fixed point or a floating point scaling ratio which when multiplied by maximum width of decoded picture signalled in the SPS specifies the width of the picture that refers to this PPS.

vertical_scaling_ratio_numerator_minus1 plus 1 specifies a numerator of a fixed point or a floating point scaling ratio which when multiplied by maximum height of decoded picture signalled in the SPS specifies the height of the picture that refers to this PPS.

vertical_scaling_ratio_denominator_minus1 plus 1 specifies a denominator of a fixed point or a floating point scaling ratio which when multiplied by maximum height of decoded picture signalled in the SPS specifies the height of the picture that refers to this PPS.

In one example, according to the techniques herein, for ARC a conformance window may be signaled. In one example, according to the techniques herein, the syntax provided in Table 14 may be added to a PPS syntax structure:

TABLE 14

| | Descriptor |
|---|---|
| pic_parameter_set_rbsp( ) { | |
| ... | |
|   pic_size_different_from_max_flag | u(1) |
|   if (pic_size_different_from_max_flag) { | |
|     pic_width_in_luma_samples | ue(v) |
|     pic_height_in_luma_samples | ue(v) |
|     pps_conformance_window_flag | u(1) |
|     if( conformance_window_flag ) { | |
|       pps_conf_win_left_offset | ue(v) |
|       pps_conf_win_right_offset | ue(v) |
|       pps_conf_win_top_offset | ue(v) |
|       pps_conf_win_bottom_offset | ue(v) |
|     } | |
|   } | |
| } | |

With respect to Table 14, in one example, the semantics of the various syntax elements may be based on the following:

pic_size_different_from_max_flag equal to 1 specifies that the PPS signals different picture width or picture height from the max_pic_width_in_pic_width_units_minus1 and max_pic_height_in_pic_height_units_minus1 in the referred SPS. pic_size_different_from_max_flag equal to 0 specifies that picture width and picture height of the picture to which this PPS applies are the same as max_pic_width_in_pic_width_units_minus1 and max_pic_height_in_pic_height_units_minus1 in the referred SPS.

pic_width_in_luma_samples specifies the width of each decoded picture in units of luma samples. pic_width_in_luma_samples shall not be equal to 0 and shall be an integer multiple of MinCbSizeY. When pic_width_in_luma_samples is not present, it is inferred to be equal to maximum width of picture specified in the referred SPS (e.g. max_pic_width_in_luma_samples)

pic_height_in_luma_samples specifies the height of each decoded picture in units of luma samples. pic_height_in_luma_samples shall not be equal to 0 and shall be an integer multiple of MinCbSizeY. When pic_height_in_luma_samples is not present, it is inferred to be equal to maximum width of picture specified in the referred SPS (e.g. max_pic_height_in_luma_samples).

pps_conformance_window_flag equal to 1 indicates that the conformance cropping window offset parameters follow next in the PPS. conformance_window_flag equal to 0 indicates that the conformance cropping window offset parameters are not present.

pps_conf_win_left_offset, pps_conf_win_right_offset, pps_conf_win_top_offset, and pps_conf_win_bottom_offset specify the samples of the pictures in the CVS that are output from the decoding process, in terms of a rectangular region specified in picture coordinates for output. When conformance_window_flag is equal to 0, the values of pps_conf_win_left_offset, pps_conf_win_right_offset, pps_conf_win_top_offset, and pps_conf_win_bottom_offset are inferred to be equal to 0.

The conformance cropping window contains the luma samples with horizontal picture coordinates from SubWidthC*pps_conf_win_left_offset to pic_width_in_pic_size_units*pic_size_unit−(SubWidthC*pps_conf_win_right_offset+1) and vertical picture coordinates from SubHeightC*pps_conf_win_top_offset to picheight_inpic_size_units_pic_size_unit−(SubHeightC*pps_conf_win_bottom_offset+1), inclusive.

The value of SubWidthC*(pps_conf_win_left_offset+pps_conf_win_right_offset) shall be less than pic_width_in_pic_size_units and the value of SubHeightC*(pps_conf_win_top_offset+pps_conf_win_bottom_offset) shall be less than pic_height_in_pic_size_units*pic_size_unit.

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE—The conformance cropping window offset parameters are only applied at the output. All internal decoding processes are applied to the uncropped picture size.

In another example according to the techniques herein, for ARC a conformance window may be signaled. In one example, according to the techniques herein, the syntax provided in Table 14A may be added to a PPS syntax structure:

TABLE 14A

|  | Descriptor |
|---|---|
| pic_parameter_set_rbsp( ) { |  |
| ... |  |
| pic_size_different_from_max_flag | n(l) |
| if (pic_size_different_from_max_flag) { |  |
|   pic_width_in_pic_size_units_minus1 | ue(v) |
|   pic_height_in_pic_size_units_minus1 | ue(v) |
|   pps_conformance_window_flag | u(1) |
|   if( conformance_window_flag ) { |  |
|     pps_conf_win_left_offset | ue(v) |
|     pps_conf_win_right_offset | ue(v) |
|     pps_conf_win_top_offset | ue(v) |
|     pps_conf_win_bottom_offset | ue(v) |
|   } |  |
| } |  |
| ... |  |
| } |  |

With respect to Table 14A, in one example, the semantics of various syntax elements may be based on the following:

pic_size_different_from_max_flag equal to 1 specifies that the PPS signals different picture width or picture height from the maxpic_width_in_pic_size_units_minus1 and max_pic_height_in_pic_size_units_minus1 in the referred SPS. pic_size_different_from_max_flag equal to 0 specifies that pic_width_in_pic_size_units_minus1 and pic_height_in_pic_size_units_minus1 are the same as max_pic_width_in_pic_size_units_minus1 and max_pic_height_in_pic_size_units_minus1 in the referred SPS.

pic_width_in_pic_size_units_minus1 specifies the width of each decoded picture in units of pic_size_unit luma samples. When pic_width_in_pic_size_units_minus1 is not present, it is inferred to be equal to max_pic_width_in_pic_size_units_minus1 pic_height_in_size_unit_minus1 specifies the height of each decoded picture in units of pic_size_unit luma samples. When pic_height_in_pic_size_units_minus1 is not present, it is inferred to be equal to max_pic_height_in_pic_size_units_minus1.

pps_conformance_window_flag equal to 1 indicates that the conformance cropping window offset parameters follow next in the PPS. conformance_window_flag equal to 0 indicates that the conformance cropping window offset parameters are not present.

pps_conf_win_left_offset, pps_conf_win_right_offset, pps_conf_win_top_offset, and pps_conf_win_bottom_offset specify the samples of the pictures in the CVS that are output from the decoding process, in terms of a rectangular region specified in picture coordinates for output. When conformance_window_liag is equal to 0, the values of pps_conf_win_left_offset, pps_conf_win_right_offset, pps_conf_win_top_offset, and pps_conf_win_bottom_offset are inferred to be equal to 0.

The conformance cropping window contains the luma samples with horizontal picture coordinates from SubWidthC*pps_conf_win_left_offset to pic_width_in_pic_size_units*pic_size_unit−(SubWidthC*pps_conf_win_right_offset+1) and vertical picture coordinates from SubHeightC*pps_conf_win_top_offset to pic_height_in_pic_size_units pic_size_unit−(SubHeightC*pps_conf_win_bottom_offset+1), inclusive.

The value of SubWidthC*(pps_conf_win_left_offset+pps_conf_win_right_offset) shall be less than pic_width_in_pic_size_units_pic_size_unit, and the value of SubHeightC*(pps_conf_wintop_offset+pps_conf_win_bottom_offset) shall be less than pic_height_in_pic_size_units*pic_size_unit.

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE—The conformance cropping window offset parameters are only applied at the output. All interval decoding processes are applied to the uncropped picture size.

In another example according to the techniques herein, for ARC a conformance window may be signaled. hi one example, according to the techniques herein, the syntax provided in Table 14B may be added to a PPS syntax structure:

TABLE 14B

|  | Descriptor |
|---|---|
| pic_parameter_set_rbsp( ) { |  |
| ... |  |
| pic_size_different_from_max_flag | u(1) |
| if (pic_size_different_from_max_flag) { |  |
|   pic_width_in_pic_size_units_minus1 | ue(v) |
|   pic_height_in_pic_size_units_minus1 | ue(v) |
|   pps_conformance_window_flag | u(1) |
|   if( conformance_window_flag ) { |  |
|     pps_conf_win_left_offset | ue(v) |

TABLE 14B-continued

| | Descriptor |
|---|---|
| pps_conf_win_right_offset | ue(v) |
| pps_conf_win_top_offse | ue(v) |
| pps_conf_win_bottom_offset | ue(v) |
| } | |
| } | |
| ... | |
| } | |

With respect to Table 14B, in one example, the semantics of various syntax elements may be based on the following:

pic_size_different_from_max_flag equal to 1 specifies that the PPS signals different picture width or picture height from the max_pic_width_in_pic_size_units_minus1 and max_pic_height_in_pic_size_units_minus1 in the referred SPS. pic_size_differentfrommax_flag equal to 0 specifies that pic_width_in_pic_size_units_minus1 and pic_height_in_pic_size_units_minus1 are the same as max_pic_width_in_pic_size_units_minus1 and max_pic_height_in_pic_size_units_minus1 in the referred SPS.

pic_width_in_pic_size_units_minus1 specifies the width of each decoded picture in units of PicSizeUnit luma samples. When pic_width_in_pic_size_units_minus1 is not present, it is inferred to be equal to max_pic_width_in_pic_size_units_minus1.

pic_height_in_size_unit_minus1 specifies the height of each decoded picture in units of PicSizeUnit luma samples. When pic_height_in_pic_size_units_minus1 is not present, it is inferred to be equal to max_pic_height_in_pic_size_units_minus1.

pps_conformance_window_flag equal to 1 indicates that the conformance cropping window offset parameters follow next in the PPS. conformance_window_flag equal to 0 indicates that the conformance cropping window offset parameters are not present. When not present, the value of pps_confonnance_windowflag is inferred to be equal to 0.

pps_conf_win_left_offset, pps_conf_win_right_offset, pps_conf_win_top_offset, and pps_conf_win_bottom_offset specify the samples of the pictures in the CVS that are output from the decoding process, in terms of a rectangular region specified in picture coordinates for output. When pic_size_different_from_max_flag is equal to 1 and conformance window flag is equal to 0, the values of pps_conf_win_left_offset, pps_conf_win_right_offset, pps_conf_wintop_offset, and pps_conf_win bottom offset are inferred to be equal to 0. When pic_size_different_from_max_flag is equal to 0, the values of pps_conf_win_left_offset, pps_conf_win_right_offset, pps_conf_win_top_offset, and pps_conf_win_bottom_offset are inferred to be equal to sps_conf_win_left_offset, sps_conf_win_right_offset, sps_conf_win_top_offset, and sps_conf_win_bottom_offset, respectively.

The conformance cropping window contains the luma samples with horizontal picture coordinates from SubWidthC*pps_conf_win_left_offset to pic_width_in_pic_size_units*PicSizeUnit)−(SubWidthC*pps_conf_win_right_offset+1) and vertical picture coordinates from SubHeightC*pps_conf_win_top_offset to pic_height_in_pic_size_units*PicSizeUnit)−(SubHeightC*pps_conf_win_bottom_offset+1), inclusive.

The value of SubWidthC*(pps_conf_win_left_offset+pps_conf_win_right_offset) shall be less than pic_width_in_pic_sizeunits*PicSizeUnit), and the value of SubHeightC*(pps_conf_win_top_offset+pps_conf_win_bottom_offset) shall be less than pic_height_in_pic_size_units*PicSizeUnit.

The variables PicOutputWidthL and PicOutputHeightL are derived as follows:

PicOutputWidth$L$=pic_width_in_pic_size_units*PicSizeUnit−

(SubWidth$C$*pps_conf_win_right_offset+1)−

SubWidth$C$*pps_conf_win_left_offset

PicOutputHeight$L$=pic_height_in_pic_size_units*PicSizeUnit−

SubHeight$C$*pps_conf_win_top_offset

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE—The conformance cropping window offset parameters are only applied at the output. All internal decoding processes are applied to the uncropped picture size.

In a further variant example, a separate syntax element may be added to PPS to indicate the picture size unit. Thus, in this case the picture size unit does need to be obtained from SPS. This allows a complete parallel and independent parsing and operation based on SPS and PPS. Table 14C shows the picture size unit related syntax element in PPS.

TABLE 14C

| | Descriptor |
|---|---|
| pic_parameter_set_rbsp( ) { | |
| ... | |
| pic_size_different_from_max_flag | u(1) |
| if (pic_size_different_from_max_flag) { | |
| pps_pic_size_unit_minus1 | ue(v) |
| pic_width_in_pic_size_units_minus1 | ue(v) |
| pic_height_in_pic_size_units_minus1 | ue(v) |
| pps_conformance_window_flag | u(1) |
| if( conformance_window_flag ) { | |
| pps_conf_win_left_offset | ue(v) |
| pps_conf_win_right_offset | ue(v) |
| pps_conf_win_top_offse | ue(v) |
| pps_conf_win_bottom_offset | ue(v) |
| } | |
| } | |
| ... | |
| } | |

With respect to Table 14C, in one example, the semantics of various syntax elements may be based on the following:

ppspic_size_unit_minus1 plus 1 specifies the unit used to signal syntax elements related to width and height of the picture that refers to this PPS. ppspic_size_unit_minus1 plus 1 shall be an integer multiple of MinCbSizeY.

The variable PPSPicSizeUnit is derived as follows:

PPSPicSizeUnit=(pic_size_unit_minus1+1)

In a further variant, the pps_pic_size_unit_minus1 may be defined with following semantics:

pps_pic_size_unit_minus1 plus 1 specifies the unit used to signal syntax elements related to width and height of the picture that refers to this PPS.

The variable PPSPicSizeUnit is derived as follows:

PPSPicSizeUnit=(pic_size_unit_minus1+1)*MinCbSizeY pps_conf_win_left_offset, pps_conf_win_right_offset, pps_conf_win_top_offset, and pps_conf_win_bottom_offset specify the samples of the pictures in the CVS that are output from the decoding process, in terms of a rectangular region specified in picture coordinates for output. When pic_size_different_from_max_flag is equal to 1 and conformance_window_flag is equal to 0, the values of pps_conf_win_left_offset, pps_conf_win_right_offset, pps_conf_win_top_offset, and pps_conf_win_bottom_offset are inferred to be equal to 0. When pic_size_different_from_max_flag is equal to 0, the values of pps_conf_win_left_offset, pps_conf_win_right_offset, pps_conf_wintop_offset, and pps_conf_win_bottom_offset are inferred to be equal to sps_conf_win_left_offset, sps_conf_win_right_offset, sps_conf_win_top_offset, and sps_conf_win_bottom_offset, respectively.

The conformance cropping window contains the luma samples with horizontal picture coordinates from SubWidthC*pps_conf_win_left_offset to pic_width_inpic_size_units*PPSPicSizeUnit)−(SubWidthC*pps_conf_win_right_offset+1) and vertical picture coordinates from SubHeightC*pps_conf_win_top_offset to pic_height_inpic_size_units*PPSPicSizeUnit)−(SubHeightC*pps_conf_win_bottom_offset+1), inclusive.

The value of SubWidthC*pps_conf_win_left_offset+pps_conf_win_right_offset) shall be less than pic_width_in_pic_size_units PPSPicSizeUnit), and the value of SubHeightC*(pps_conf_win_top_offset+pps_conf_win_bottom_offset) shall be less than pic_height_in_pic_size_units*PPSPicSizeUnit The variables PicOutputWidthL and PicOutputHeightL are derived as follows:

PicOutputWidth$L$=pic_width_in_pic_size_units*PPSPicSizeUnit−

(SubWidth$C$*pps_conf_win_right_offset+1)−

SubWidth$C$*pps_conf_win_left_offset

PicOutputHeight$L$=pic_height_in_pic_size_units*PPSPicSizeUnit−

SubHeight$C$*pps_conf_win_top_offset

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE The conformance cropping window offset parameters are only applied at the output. All internal decoding processes are applied to the uncropped picture size.

In one example, according to the techniques herein, the actual output width and height may be signaled and then the coded resolution may be derived as the minimum resolution that is larger than or equal to the output resolution and as a multiple of the minimum block size. In one example, according to the techniques herein, the syntax provided in Table 14 may be added to a PPS syntax structure:

TABLE 15

| | Descriptor |
|---|---|
| pic_parameter_set_rbsp( ) { | |
| ... | |
|    pic_size_different_from_max_flag | u(1) |
|    if (pic_size_different_from_max_flag) { | |
|      pic_width_in_luma_samples | ue(v) |
|      pic_height_in_luma_samples | ue(v) |
|    } | |

With respect to Table 15, in one example, the semantics of pic_size_different_from_max_flag, pic_width_in_luma_samples, and pic_height_in_luma_samples may be based on the following:

pic_size_different_from_max_flag equal to 1 specifies that the PPS signals different picture width or picture height from the maximum picture width and maximum picture height (e.g. max_pic_width_in_pic_width units minus1' and max_pie_height_in_pic_height_units_minus1) specified in the referred SPS. pic_size_different_from_max flag equal to 0 specifies that picture width and picture height of the picture to which this PPS applies are the same as maximum picture width and maximum picture height (e.g. max_pic_width_in_pic_width_units_minus1 and max_pic_height_in_pic_height_units_minus1) specified in the referred SPS.

pic_width_in_luma_samples specifies the width of each decoded picture in units of luma samples. pic_width_in_luma_samples shall not be equal to 0 and shall be an integer multiple of MinCbSizeY. When pic_width_in_luma_samples is not present, it is inferred to be equal to maximum width of picture specified in the referred SPS (e.g. max_pic_width_in_luma_samples) pic_height_in_luma_samples specifies the height of each decoded picture in units of luma samples. pic_height_in_luma_samples shall not be equal to 0 and shall be an integer multiple of MinCbSizeY. When pic_height_in_luma_samples is not present, it is inferred to be equal to maximum width of picture specified in the referred SPS (e.g. max_pic_height_in_luma_samples).

In one example it is proposed that a scale factor is calculated based on the output width and output height for both the current picture and for the referenced picture. If the scale factor is expressed in 14 bit fixed-point representation, as in JVET-N0279, then the scale factors can be calculated as:

HoriScaleFp=(RefPicOutputWidth$L$<<14)/PicOutputWidth$L$

VertScaleFp=(RefPicOutputHeight$L$<<14)/PicOutputHeight$L$ where RefPicOutputWidthL and RefPicOutputHeightL are the PicOutputWidthL and the PicOutputHeightL of the picture used for reference, respectively.

In one example, according to the techniques herein, a process for ARC may be based on the following:

In a two-step approach an entire picture which has resolution different than the maximum resolution at different resolution is up/down sampled and stored in DPB.
1. Signal in slice a flag if the current picture shall be stored twice in the DPB with different resolutions. If so, a resampling process is invoked immediately after the picture has been decoded.
2. Specify simple fixed resampling filters that provide good performance for the 1:2 and 2:1 scaling case.

3. Both coded resolution and resolution after resampling must be in the range of [¼, 1] relative the width and height signalled in SPS.
4. If resolution is not=the one signalled in SPS then one of width or height must be at most ¾ relative to the value signalled in SPS.
5. A coded picture may only predict from pictures in the DPB of the same resolution. If there are no reference pictures in the DPB of the same resolution, the coded picture must be coded as intra.
6. A lower resolution picture occupies 1 whole DPB picture slot from the total number of picture slots available at full resolution. This means that memory allocation and indexing in DPB does not need to be flexible.
7. Which picture to output from the DPB could be signalled, assumed (e.g. always highest resolution or always coded resolution) or controlled by external means (i.e. decoders choice)

General spatial scalability when using two-step approach could be handled with the ARC scheme with the following differences/additions:
1. Higher resolution uses higher layer_id.
2. It is not allowed to predict from higher layer_id to lower layer_id.
3. Only the base layer picture with the same POC can be used for inter-layer prediction.
4. The base layer picture is resampled (using the ARC resampling process) and made available for predicting the current picture in the higher layer.
5. Each layer has its own DPB and cannot add or remove pictures from other layers' DPBs.

Further, in one example, according to the techniques herein, a process for ARC may be based on the following:

In a one-step approach the decoder picture is stored in DPB at its native resolution. Down/up-sampling is performed on a block basis when a block from a picture is used as reference.

The primary goal/purpose of these steps are to minimize processing and implementational overhead to support ARC. It is reasonable to assume that ARC will be used in cases where there is enough DPB space available (e.g. low delay) so there is no need to optimize for storing more pictures when a "reduced resolution picture is coded".

Default/simplest behavior would be to mark both pictures as "unused for prediction" at the same time i.e. there would be no way to remove a picture of different resolution without also removing the corresponding picture of the same resolution.

Corresponding DPB handling for one step approach:
1. Resolution of current picture is signalled in slice header or SPS (or PPS).
2. After decoding, the current picture is stored in the DPB with no further processing.
3. Scaling is performed by adjusting motion compensation to account for the scaling ratio.
4. Scaling factor could be limited to [¼, 1] but it is not absolutely necessary to limit the scaling factor. An extreme case would be 360p to 8K which is a scaling factor of 12. However the benefit compared to coding the 8K picture directly as Intra would be minimal.
5. Resolution could be arbitrarily close to "full resolution" since there is no cost associated with resampling.
6. A lower resolution picture occupies 1 whole DPB picture slot from the total number of picture slots available at full resolution. This means that memory allocation and indexing in DPB does not need to be flexible.
7. The resolution of output pictures from the DPB could be signalled, assumed (e.g. always full resolution or always coded resolution) or controlled by external means (i.e. decoders choice).

General spatial scalability when using one-step approach could be handled with the ARC scheme with the following differences/additions:
1. Higher resolution uses higher layer_id.
2. It is not allowed to predict from higher layer_id to lower layer_id.
3. POC must be unique for all pictures in all layers.
4. A "POC offset" is used for higher layers to indicate which pictures corresponds to the same time instance as pictures in the base layer. (this offset could potentially be used when scaling motion vectors in MV prediction but it is not clear how much gain there would be).
5. Each layer has its own DPB and cannot add or remove pictures from other layers' DPBs.

In this manner, video encoder 200 represents an example of a device configured to signal adaptive resolution change parameters according to one or more techniques of this disclosure.

Figure 7:
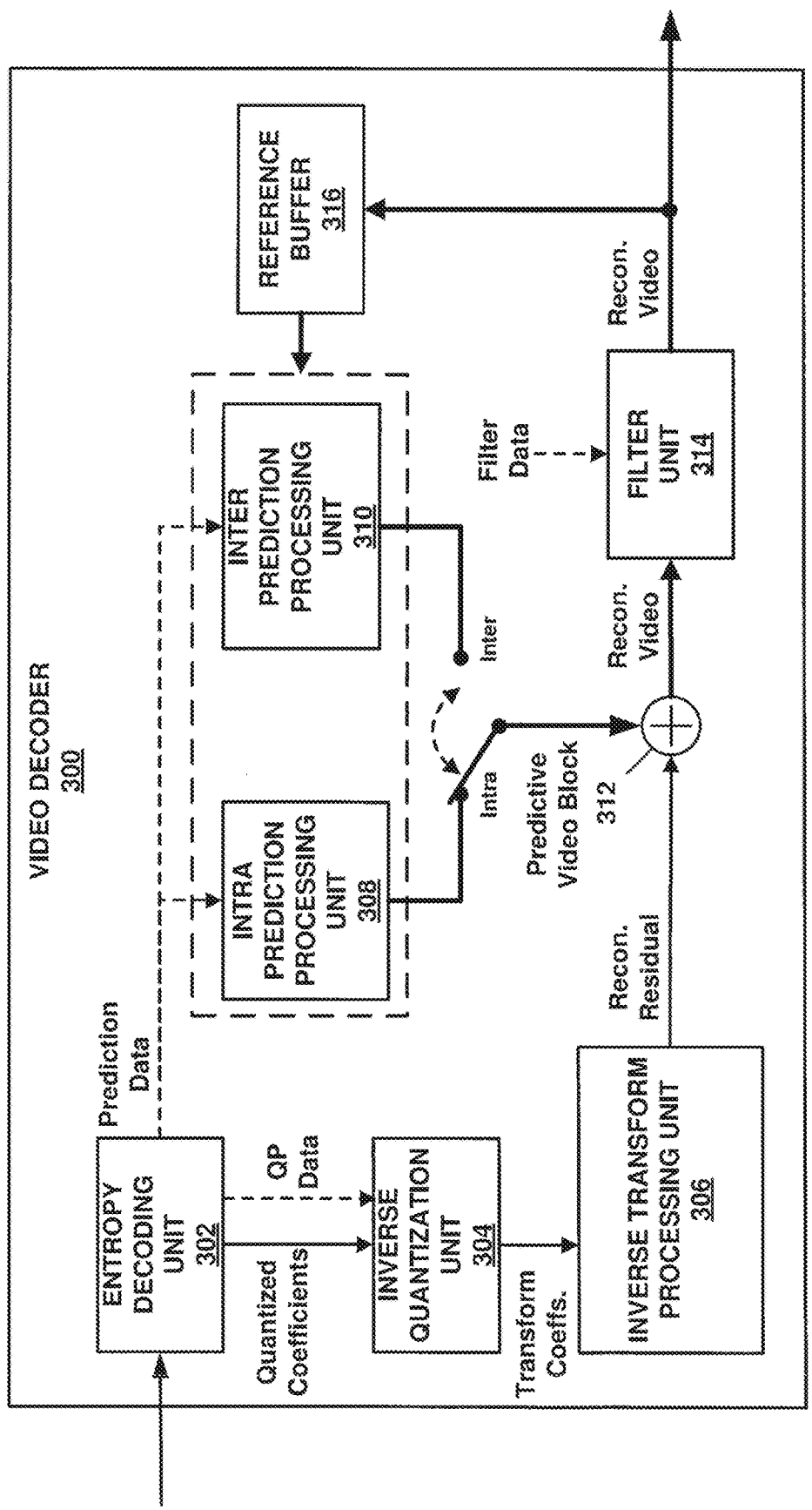
FIG. 7 is a block diagram illustrating an example of a video decoder that may be configured to decode video data according to one or more techniques of this disclosure.

FIG. 7 is a block diagram illustrating an example of a video decoder that may be configured to decode video data according to one or more techniques of this disclosure. In one example, video decoder 300 may be configured to reconstruct video data based on one or more of the techniques described above. That is, video decoder 300 may operate in a reciprocal manner to video encoder 200 described above. Video decoder 300 may be configured to perform intra prediction decoding and inter prediction decoding and, as such, may be referred to as a hybrid decoder. In the example illustrated in FIG. 7 video decoder 300 includes an entropy decoding unit 302, inverse quantization unit 304, inverse transformation processing unit 306, intra prediction processing unit 308, inter prediction processing unit 310, summer 312, filter unit 314, and reference buffer 316. Video decoder 300 may be configured to decode video data in a manner consistent with a video encoding system, which may implement one or more aspects of a video coding standard. It should be noted that although example video decoder 300 is illustrated as having distinct functional blocks, such an illustration is for descriptive purposes and does not limit video decoder 300 and/or sub-components thereof to a particular hardware or software architecture. Functions of video decoder 300 may be realized using any combination of hardware, firmware, and/or software implementations.

As illustrated in FIG. 7, entropy decoding unit 302 receives an entropy encoded bitstream. Entropy decoding unit 302 may be configured to decode quantized syntax elements and quantized coefficients from the bitstream according to a process reciprocal to an entropy encoding process. Entropy decoding unit 302 may be configured to perform entropy decoding according any of the entropy coding techniques described above. Entropy decoding unit 302 may parse an encoded bitstream in a manner consistent with a video coding standard. Video decoder 300 may be configured to parse an encoded bitstream where the encoded bitstream is generated based on the techniques described above.

Referring again to FIG. 7, inverse quantization unit 304 receives quantized transform coefficients (i.e., level values) and quantization parameter data from entropy decoding unit 302. Quantization parameter data may include any and all combinations of delta QP values and/or quantization group size values and the like described above. Video decoder 300 and/or inverse quantization unit 304 may be configured to determine QP values used for inverse quantization based on values signaled by a video encoder and/or through video properties and/or coding parameters. That is, inverse quantization unit 304 may operate in a reciprocal manner to coefficient quantization unit 206 described above. For example, inverse quantization unit 304 may be configured to infer predetermined values), allowed quantization group sizes, and the like, according to the techniques described above. Inverse quantization unit 304 may be configured to apply an inverse quantization. Inverse transform processing unit 306 may be configured to perform an inverse transformation to generate reconstructed residual data. The techniques respectively performed by inverse quantization unit 304 and inverse transform processing unit 306 may be similar to techniques performed by inverse quantization/transform processing unit 208 described above. Inverse transform processing unit 306 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 7, reconstructed residual data may be provided to summer 312. Summer 312 may add reconstructed residual data to a predictive video block and generate reconstructed video data. A predictive video block may be determined according to a predictive video technique (i.e., intra prediction and inter frame prediction).

Intra prediction processing unit 308 may be configured to receive intra prediction syntax elements and retrieve a predictive video block from reference buffer 316. Reference buffer 316 may include a memory device configured to store one or more frames of video data. Intra prediction syntax elements may identify an intra prediction mode, such as the intra prediction modes described above. In one example, intra prediction processing unit 308 may reconstruct a video block using according to one or more of the intra prediction coding techniques described herein. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block. That is, for example, inter prediction processing unit 310 use one or more of the interpolation filters described above based on one or more ARC parameters. Filter unit 314 may be configured to perform filtering on reconstructed video data. For example, filter unit 314 may be configured to perform deblocking and/or SAO filtering, as described above with respect to filter unit 216. Further, it should be noted that in some examples, filter unit 314 may be configured to perform proprietary discretionary filter (e.g., visual enhancements). As illustrated in FIG. 7, a reconstructed video block may be output by video decoder 300. In this manner, video decoder 300 represents an example of a device configured to determine an adaptive resolution scaling factor and determine a motion compensation interpolation filter based on the adaptive resolution scaling factor according to one or more techniques of this disclosure. In this manner, video decoder 300 represents an example of a device configured to parse syntax elements indicating adaptive resolution change parameters according to one or more techniques of this disclosure.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

SUMMARY

In one example, a method of video encoding, the method comprising: determining an adaptive resolution scaling factor; and determining a motion compensation interpolation filter based on the adaptive resolution scaling factor.

In one example, a method of video decoding, the method comprising: determining an adaptive resolution scaling factor; and determining a motion compensation interpolation filter based on the adaptive resolution scaling factor.

In one example, the method, further comprising signaling one or more syntax elements indicating the adaptive resolution scaling factor and/or the motion compensation interpolation filter.

In one example, the method, further comprising parsing one or more syntax elements indicating the adaptive resolution scaling factor and/or the motion compensation interpolation filter.

In one example, a device for coding video data, the device comprising one or more processors configured to perform any and all combinations of the steps.

In one example, the device, wherein the device includes a video encoder.

In one example, the device, wherein the device includes a video decoder.

In one example, a system comprising: the device includes a video encoder; and the device includes a video decoder.

In one example, an apparatus for coding video data, the apparatus comprising means for performing any and all combinations of the steps.

In one example, a non-transitory computer-readable storage medium comprising instructions stored thereon that, when executed, cause one or more processors of a device for coding video data to perform any and all combinations of the steps.

In one example, a method of video decoding, the method comprising: determining a scaling factor corresponding to down sampling between a reference picture and a current picture; and wherein the motion compensation interpolation filter is specified by 16 fractional sample positions and 8 interpolation filter coefficients corresponding to each of the fractional sample position.

In one example, the method, wherein the motion compensation interpolation filter is selected as an integer version of a Lanczos filter for scaling factor 1.5:1 with cut-off frequency of 0.95a.

In one example, the method, wherein interpolation filter coefficients [−1, −5, 17, 42, 17, −5, −1, 0] correspond to a fractional sample position 0.

In one example, the method, wherein selecting the motion compensation interpolation filter based on a value of the scaling factor includes selecting the motion compensation interpolation filter when the scaling factor is greater than 1.3.

In one example, the method, wherein selecting the motion compensation interpolation filter based on a value of the scaling factor includes selecting the motion compensation interpolation filter when the scaling factor is less than 1.8.

In one example, a device for coding video data, the device comprising one or more processors configured to: determine a scaling factor corresponding to down sampling between a reference picture and a current picture; and select a motion compensation interpolation filter based on a value of the scaling factor, wherein the motion compensation interpolation filter is specified by 16 fractional sample positions and 8 interpolation filter coefficients corresponding to each of the fractional sample position.

In one example, the device, wherein the motion compensation interpolation filter is selected as an integer version of a Lanczos filter for scaling factor 1.5:1 with cut-off frequency of 0.95a.

In one example, the device, wherein interpolation filter coefficients [−1, −5, 17, 42, 17, −5, −1, 0] correspond to a fractional sample position 0.

In one example, the device, wherein selecting the motion compensation interpolation filter based on a value of the scaling factor includes selecting the motion compensation interpolation filter when the scaling factor is greater than 1.3.

In one example, the device, wherein selecting the motion compensation interpolation filter based on a value of the scaling factor includes selecting the motion compensation interpolation filter when the scaling factor is less than 1.75. In one example, the device, wherein the device includes a video decoder.

CROSS REFERENCE

This Nonprovisional application claims priority under 35 U.S.C. § 119 on provisional Application No. 62/865,295 on Jun. 23, 2019, No. 62/865,841 on Jun. 24, 2019, No. 62/893,791 on Aug. 29, 2019, No. 62/907,612 on Sep. 28, 2019, the entire contents of which are hereby incorporated by reference.

The invention claimed is:

1. A method of video decoding, the method comprising:
   determining a scaling factor based on a width of a reference picture and a width of a current picture; and
   determining which filter coefficients to use for an interpolation filter based on a value of the scaling factor being greater than a first threshold and less than or equal to a second threshold, wherein the interpolation filter is an 8-tap filter defined for 16 fractional sample positions, includes interpolation filter coefficients corresponding to each of the 16 fractional sample positions and includes the interpolation filter coefficients being equal to [−1, −5, 17, 42, 17, −5, −1, 0] for respective taps 0 to 7 at a fractional sample position 0.

2. A device for coding video data, the device comprising one or more processors configured to:
   determine a scaling factor based on a width of a reference picture and a width of a current picture; and
   determine which filter coefficients to use for an interpolation filter based on a value of the scaling factor being greater than a first threshold and less than or equal to a second threshold, wherein the interpolation filter is an 8-tap filter defined for 16 fractional sample positions, includes interpolation filter coefficients corresponding to each of the 16 fractional sample positions and includes the interpolation filter coefficients being equal to [−1, −5, 17, 42, 17, −5, −1, 0] for respective taps 0 to 7 at a fractional sample position 0.

3. A device for decoding video data, the device comprising one or more processors configured to:
   determine a scaling factor based on a width of a reference picture and a width of a current picture; and
   determine which filter coefficients to use for an interpolation filter based on a value of the scaling factor being greater than a first threshold and less than or equal to a second threshold, wherein the interpolation filter is an 8-tap filter defined for 16 fractional sample positions, includes interpolation filter coefficients corresponding to each of the 16 fractional sample positions, and includes the interpolation filter coefficients being equal to [−1, −5, 17, 42, 17, −5, −1, 0] for respective taps 0 to 7 at a fractional sample position 0.

* * * * *